United States Patent
Matsuda et al.

(10) Patent No.: US 9,600,164 B2
(45) Date of Patent: Mar. 21, 2017

(54) MEDIA-EDITING APPLICATION WITH ANCHORED TIMELINE

(71) Applicant: Apple Inc., Cupertino, CA (US)

(72) Inventors: Ken Matsuda, Sunnyvale, CA (US); Dave Cerf, San Francisco, CA (US); Itrat U. Khan, San Jose, CA (US); Matthew D. Diephouse, Columbus, OH (US); Brian Meaney, San Jose, CA (US); Vincenzo De Marco, San Jose, CA (US); Jordan P. McCommons, San Francisco, CA (US); Louis LaSalle, Sunnyvale, CA (US)

(73) Assignee: APPLE INC., Cupertino, CA (US)

( * ) Notice: Subject to any disclaimer, the term of this patent is extended or adjusted under 35 U.S.C. 154(b) by 214 days.

(21) Appl. No.: 14/503,351

(22) Filed: Sep. 30, 2014

(65) Prior Publication Data
US 2015/0019972 A1    Jan. 15, 2015

Related U.S. Application Data

(63) Continuation of application No. 13/151,175, filed on Jun. 1, 2011, now Pat. No. 8,910,046.
(Continued)

(51) Int. Cl.
*G06F 3/00* (2006.01)
*G06F 3/0484* (2013.01)
(Continued)

(52) U.S. Cl.
CPC .......... *G06F 3/04847* (2013.01); *G06F 3/048* (2013.01); *G06F 3/04842* (2013.01);
(Continued)

(58) Field of Classification Search
CPC .................................................. G06F 3/04847
See application file for complete search history.

(56) References Cited

U.S. PATENT DOCUMENTS

| 5,404,316 A | 4/1995 | Klingler et al. |
| 5,467,288 A | 11/1995 | Fasciano et al. |

(Continued)

FOREIGN PATENT DOCUMENTS

WO    WO 2010/106586    9/2010

OTHER PUBLICATIONS

Author Unknown, "Apple Announces Final Cut Pro 4," NAB, Apr. 6, 2003, 3 pages, Apple Inc., Las Vegas, NV, USA.
(Continued)

*Primary Examiner* — Omar Abdul-Ali
(74) *Attorney, Agent, or Firm* — Adeli LLP

(57) ABSTRACT

A media application of some embodiments includes a timeline, which is a composite display area for displaying media clips that are part of the composite media presentation. The timeline of some embodiments includes a primary lane called a spine as well as one or more anchor lanes. The spine represents a primary sequence of media, which, in some embodiments, does not have any gaps. When a clip is deleted or removed from the timeline, the media-editing applications automatically closes the gap created in place of the clip. The clips in the anchor lanes are anchored to a particular position along the spine. Anchor lanes may be used for compositing (e.g., removing portions of one video and showing a different video in those portions), B-roll cuts (i.e., cutting away from the primary video to a different video whose clip is in the anchor lane), audio clips, or other composite presentation techniques.

20 Claims, 51 Drawing Sheets

Related U.S. Application Data

(60) Provisional application No. 61/364,797, filed on Jul. 15, 2010, provisional application No. 61/443,702, filed on Feb. 16, 2011, provisional application No. 61/443,704, filed on Feb. 16, 2011, provisional application No. 61/443,707, filed on Feb. 16, 2011, provisional application No. 61/443,692, filed on Feb. 16, 2011.

(51) Int. Cl.
*G06F 3/048* (2013.01)
*G11B 27/034* (2006.01)
*G11B 27/34* (2006.01)
*H04N 5/262* (2006.01)

(52) U.S. Cl.
CPC ............ *G11B 27/034* (2013.01); *G11B 27/34* (2013.01); *H04N 5/2628* (2013.01)

(56) References Cited

U.S. PATENT DOCUMENTS

| | | | |
|---|---|---|---|
| 5,519,828 A | 5/1996 | Rayner | |
| 5,521,841 A | 5/1996 | Arman et al. | |
| 5,634,020 A | 5/1997 | Norton | |
| 5,659,539 A | 8/1997 | Porter et al. | |
| 5,659,792 A | 8/1997 | Walmsley | |
| 5,659,793 A | 8/1997 | Escobar et al. | |
| 5,664,216 A | 9/1997 | Blumenau | |
| 5,682,326 A | 10/1997 | Klingler et al. | |
| 5,732,184 A | 3/1998 | Chao et al. | |
| 5,781,188 A | 7/1998 | Amiot et al. | |
| 5,826,102 A | 10/1998 | Escobar et al. | |
| 5,892,507 A | 4/1999 | Moorby et al. | |
| 5,930,446 A | 7/1999 | Kanda | |
| 5,999,173 A | 12/1999 | Ubillos | |
| 6,061,062 A | 5/2000 | Venolia | |
| 6,134,380 A | 10/2000 | Kushizaki | |
| 6,144,375 A | 11/2000 | Jain et al. | |
| 6,154,600 A | 11/2000 | Newman et al. | |
| 6,154,601 A | 11/2000 | Yaegashi et al. | |
| 6,204,840 B1 | 3/2001 | Petelycky et al. | |
| 6,324,335 B1 | 11/2001 | Kanda | |
| 6,392,710 B1 | 5/2002 | Gonsalves et al. | |
| 6,400,378 B1 | 6/2002 | Snook | |
| 6,414,686 B1 | 7/2002 | Protheroe et al. | |
| 6,477,315 B1 | 11/2002 | Ohomori | |
| 6,486,896 B1 | 11/2002 | Ubillos | |
| 6,539,163 B1 | 3/2003 | Sheasby et al. | |
| 6,544,294 B1 | 4/2003 | Greenfield et al. | |
| 6,546,188 B1 | 4/2003 | Ishii et al. | |
| 6,628,303 B1 | 9/2003 | Foreman et al. | |
| 6,650,826 B1 | 11/2003 | Hatta | |
| 6,658,194 B1 | 12/2003 | Omori | |
| 6,714,216 B2 | 3/2004 | Abe | |
| 6,771,285 B1 | 8/2004 | McGrath et al. | |
| 6,928,613 B1 | 8/2005 | Ishii et al. | |
| 7,035,435 B2 | 4/2006 | Li et al. | |
| 7,043,137 B2 | 5/2006 | Slone | |
| 7,062,713 B2 | 6/2006 | Schriever et al. | |
| 7,073,127 B2 | 7/2006 | Zhao et al. | |
| 7,313,755 B2 | 12/2007 | Rahman et al. | |
| 7,325,199 B1 | 1/2008 | Reid | |
| 7,398,002 B2 | 7/2008 | Hsiao et al. | |
| 7,434,155 B2 | 10/2008 | Lee | |
| 7,437,674 B2 | 10/2008 | Chen | |
| 7,444,593 B1 | 10/2008 | Reid | |
| 7,480,864 B2 | 1/2009 | Brook et al. | |
| 7,518,611 B2 | 4/2009 | Boyd et al. | |
| 7,546,532 B1 | 6/2009 | Nichols et al. | |
| 7,623,755 B2 | 11/2009 | Kuspa | |
| 7,653,550 B2 | 1/2010 | Schulz | |
| 7,669,130 B2 | 2/2010 | Agarwal et al. | |
| 7,720,349 B2 | 5/2010 | Ogikubo | |
| 7,770,125 B1 | 8/2010 | Young et al. | |
| 7,805,678 B1 | 9/2010 | Niles et al. | |
| 7,823,056 B1* | 10/2010 | Davey | G11B 27/034 715/202 |
| 7,856,424 B2 | 12/2010 | Cisler et al. | |
| 7,890,867 B1 | 2/2011 | Margulis | |
| 7,954,065 B2 | 5/2011 | Ubillos | |
| 7,992,097 B2 | 8/2011 | Ubillos | |
| 8,020,100 B2 | 9/2011 | Ubillos et al. | |
| 8,265,300 B2 | 9/2012 | Reid et al. | |
| 8,307,287 B2 | 11/2012 | Bhatt | |
| 8,418,082 B2 | 4/2013 | Meaney et al. | |
| 8,473,846 B2 | 6/2013 | Ubillos et al. | |
| 8,533,598 B2 | 9/2013 | Meaney et al. | |
| 8,631,326 B2 | 1/2014 | Meaney et al. | |
| 8,769,421 B2 | 7/2014 | Meaney et al. | |
| 8,875,025 B2 | 10/2014 | Ubillos et al. | |
| 2001/0020953 A1 | 9/2001 | Moriwake et al. | |
| 2001/0036356 A1 | 11/2001 | Weaver et al. | |
| 2001/0040592 A1 | 11/2001 | Foreman et al. | |
| 2002/0023103 A1 | 2/2002 | Gagne | |
| 2002/0089540 A1 | 7/2002 | Geier et al. | |
| 2002/0154140 A1 | 10/2002 | Tazaki | |
| 2002/0154156 A1 | 10/2002 | Moriwake et al. | |
| 2002/0156805 A1 | 10/2002 | Schriever et al. | |
| 2003/0002851 A1 | 1/2003 | Hsiao et al. | |
| 2003/0016254 A1 | 1/2003 | Abe | |
| 2003/0090504 A1 | 5/2003 | Brook et al. | |
| 2003/0117431 A1 | 6/2003 | Moriwake et al. | |
| 2004/0001079 A1 | 1/2004 | Zhao et al. | |
| 2004/0066395 A1 | 4/2004 | Foreman et al. | |
| 2004/0090462 A1 | 5/2004 | Graham | |
| 2005/0132293 A1 | 6/2005 | Herberger et al. | |
| 2005/0201724 A1 | 9/2005 | Chu | |
| 2005/0216840 A1 | 9/2005 | Salvucci | |
| 2006/0008247 A1 | 1/2006 | Minami et al. | |
| 2006/0059426 A1 | 3/2006 | Ogikubo | |
| 2006/0136556 A1 | 6/2006 | Stevens et al. | |
| 2006/0150072 A1 | 7/2006 | Salvucci | |
| 2006/0155684 A1 | 7/2006 | Liu et al. | |
| 2006/0168521 A1 | 7/2006 | Shimizu et al. | |
| 2006/0184980 A1 | 8/2006 | Cole | |
| 2006/0224940 A1* | 10/2006 | Lee | G11B 27/34 715/203 |
| 2007/0016872 A1 | 1/2007 | Cummins et al. | |
| 2007/0168873 A1 | 7/2007 | Lentz | |
| 2007/0189708 A1 | 8/2007 | Lerman et al. | |
| 2007/0192729 A1 | 8/2007 | Downs | |
| 2007/0203945 A1 | 8/2007 | Louw | |
| 2008/0034013 A1 | 2/2008 | Cisler et al. | |
| 2008/0044155 A1 | 2/2008 | Kuspa | |
| 2008/0080721 A1 | 4/2008 | Reid et al. | |
| 2008/0104127 A1 | 5/2008 | Billmaier et al. | |
| 2008/0120328 A1 | 5/2008 | Delgo et al. | |
| 2008/0126191 A1 | 5/2008 | Schiavi | |
| 2008/0138034 A1 | 6/2008 | Hiroi et al. | |
| 2008/0152297 A1 | 6/2008 | Ubillos | |
| 2008/0152298 A1 | 6/2008 | Ubillos | |
| 2008/0155420 A1 | 6/2008 | Ubillos et al. | |
| 2008/0155421 A1 | 6/2008 | Ubillos et al. | |
| 2008/0155459 A1 | 6/2008 | Ubillos | |
| 2008/0253735 A1 | 10/2008 | Kuspa et al. | |
| 2008/0256449 A1 | 10/2008 | Bhatt | |
| 2009/0006475 A1 | 1/2009 | Udezue et al. | |
| 2009/0089690 A1 | 4/2009 | Chi et al. | |
| 2009/0100339 A1 | 4/2009 | Wharton-Ali et al. | |
| 2009/0172543 A1 | 7/2009 | Cronin et al. | |
| 2010/0050080 A1 | 2/2010 | Libert et al. | |
| 2010/0077289 A1 | 3/2010 | Das et al. | |
| 2010/0153395 A1 | 6/2010 | Hannuksela et al. | |
| 2010/0153520 A1 | 6/2010 | Daun et al. | |
| 2010/0158471 A1 | 6/2010 | Ogikubo | |
| 2010/0278504 A1 | 11/2010 | Lyons et al. | |
| 2011/0010624 A1 | 1/2011 | Vanslette et al. | |
| 2011/0103772 A1 | 5/2011 | Suzuki | |
| 2012/0210221 A1 | 8/2012 | Khan et al. | |
| 2012/0210222 A1 | 8/2012 | Matsuda et al. | |

(56) References Cited

U.S. PATENT DOCUMENTS

OTHER PUBLICATIONS

Author Unknown, "Adobe Director 11: User Guide," Month Unknown, 2008, 498 pages, Adobe Systems Incorporated, San Jose, California, USA.
Author Unknown, "Adobe Premiere Elements 7: Arranging clips in the Sceneline," Dec. 11, 2008, 3 pages, available at http://help.adobe.com/en_US/PremiereElements/7.0/WSB04491A8-859D-41e7-975F-0E26B9AECB9B.html.
Author Unknown, "Adobe Premiere Pro CS3: Classroom in a Book", Month Unknown, 2008, 27 pages, Chapters 9 and 10, Adobe Systems Incorporated, San Jose, California, USA.
Author Unknown, "Adobe Premiere Pro CS3: User Guide," Apr. 1, 2008, 455 pages, Adobe Systems Incorporated, San Jose, California, USA.
Author Unknown, "Adobe Premiere Pro CS4 Classroom in a Book", Dec. 17, 2008, 11 pages, Adobe Press, USA.
Author Unknown, "Frame-specific editing with snap—Premiere Pro CS4 Classroom in a Book," Dec. 17, 2008, 17 pages, Adobe Press, USA.
Author Unknown, "iMovie '08 Getting Started," Month Unknown, 2008, pp. 1-50, Apple Inc., USA.
Author Unknown, "Using Adobe Flash CS4 Professional," updated Mar. 5, 2009, 474 pages, Adobe Systems Incorporated, San Jose, California, USA.
Author Unknown, "Using Adobe Premiere Elements 8 Editor", last updated Aug. 12, 2010, 313 pages, Adobe Systems Incorporated, San Jose, California, USA.
Author Unknown, "Using Adobe Premiere Pro CS4," Updated Jan. 27, 2009, Part 1 of 2, pp. i to 256, Adobe Systems Inc., San Jose, California, USA.
Author Unknown, "Using Adobe Premiere Pro CS4," Updated Jan. 27, 2009, Part 2 of 2, pp. 257 to 482, Adobe Systems Inc., San Jose, California, USA.
Author Unknown, "Using Adobe Premiere Pro CS4", Apr. 24, 2009, 499 pages, Adobe Systems Incorporated, San Jose, California, USA.
Bolante, Anthony, "Premiere Pro CS3 for Windows and Macintosh: Visual QuickPro Guide", Dec. 4, 2007, 2 pages, Peachpit Press, USA.
Brenneis, Lisa, "Final Cut Pro 3 for Macintosh: Visual QuickPro Guide," Apr. 2002, 288 pages, Peachpit Press, Berkeley, California, USA.
Casares, Juan, et al., "Simplifying Video Editing Using Metadata," Proceedings of Designing Interactive Systems (DIS 2002), Jun. 2002, 10 pages, London, Great Britain.
Chisan, James, et al., "Video Bench—Final Report: SEng 480a/CSc 586a," Apr. 11, 2003, pp. 1-43, University of Victoria, Canada.
Kutics, Andrea, et al., "Use of Adaptive Still Image Descriptors for Annotation of Video Frames," Lecture Notes in Computer Science, Month Unknown, 2007, pp. 686-697, vol. 4633, Springer-Verlag, Berlin, Heidelberg.
Long, A. Chris, et al., "Video Editing Using Lenses and Semantic Zooming," Month Unknown, 2002, pp. 1-9, Human Computer Interaction Institute, Carnegie Mellon University, Pittsburgh, Pennsylvania, USA.
Martin, Steve, "Final Cut Express: System Requirements, OS 10.2 or higher," The Ripple Training, Jan. 13, 2003, pp. 1-8, USA.
Myers, Brad A., et al., "A Multi-View Intelligent Editor for Digital Video Libraries," The First ACM+IEEE Joint Conference on Digital Libraries (JCDL'01), Jun. 24-28, 2001, 10 pages, Roanoke, Virginia, USA.
Oetzmann, Anthony, et al., "Audacity—Editing for Beginners Part 2—Cut, Copy and Paste," Apr. 12, 2004, available at http://audacity.sourceforge.net/manual-1.2/tutorial_ed_beginner2.html.
Sauer, Jeff, "Review: Apple Final Cut Pro 4," Oct. 3, 2003, pp. 1-7.
Stone, Ken, "The Basics—Editing with Transitions in Final Cut Pro," The Ken Stone Index, Jun. 12, 2001, pp. 1-8.
Wang, Yijin, et al. "*MyVideos*—A System for Home Video Management," Proceedings of the 10th ACM International Conference on Multimedia, Dec. 1-6, 2002, pp. 412-413, Juan-les-Pins, France.

\* cited by examiner

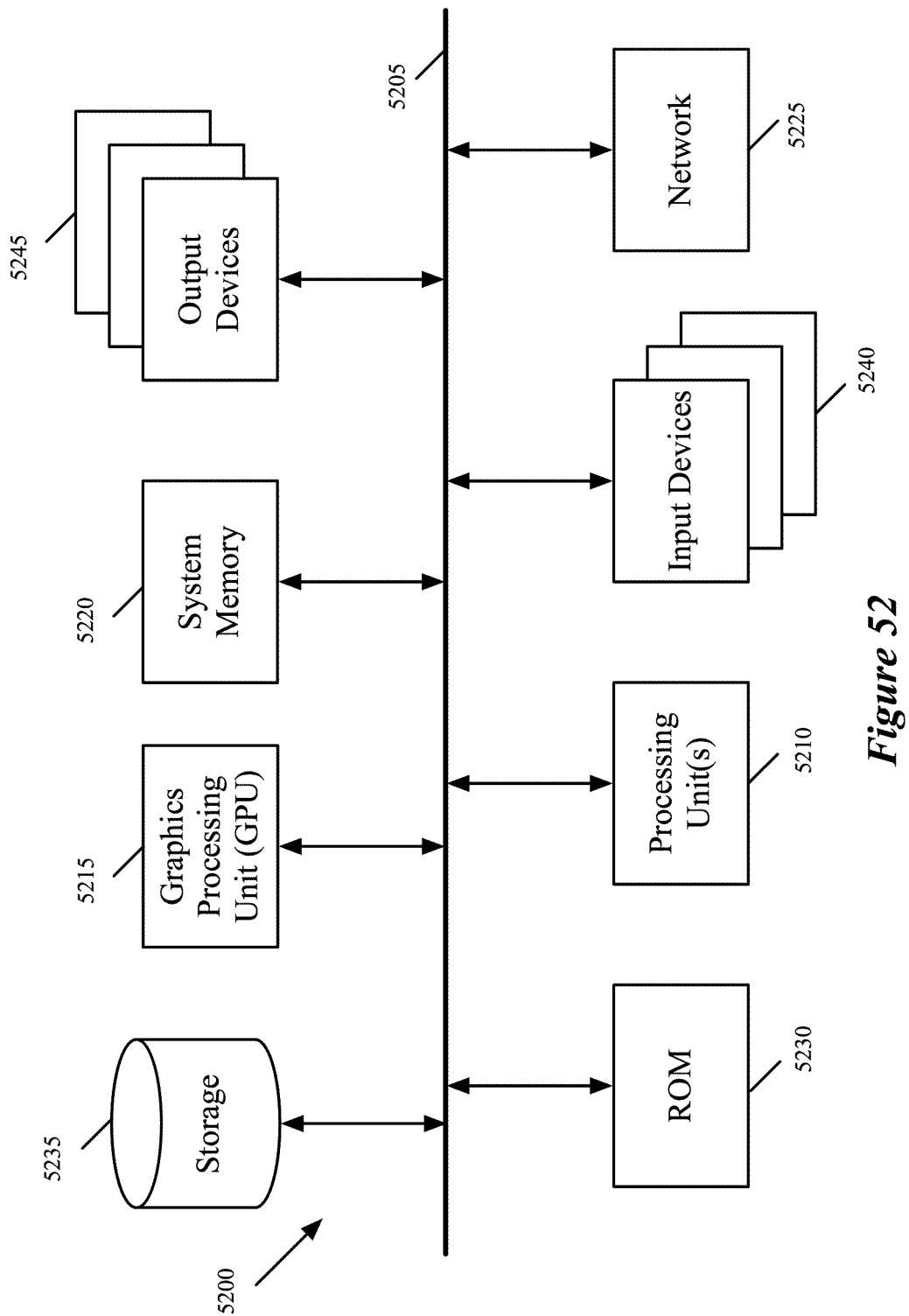

MEDIA-EDITING APPLICATION WITH ANCHORED TIMELINE

CLAIM OF BENEFIT TO PRIOR APPLICATIONS

This application is a continuation application of U.S. patent application Ser. No. 13/151,175 entitled "Media-Editing Application with Anchored Timeline" filed Jun. 1, 2011, now published as U.S. Patent Publication 2012/0210230. U.S. patent application Ser. No. 13/151,175 claims benefit to U.S. Provisional Patent Application 61/364,797, entitled "Media-Editing Application with a Free-Form Space for Organizing or Compositing Media Clips," filed Jul. 15, 2010; U.S. Provisional Patent Application 61/443,702, entitled "Media-Editing Application with Anchored Timeline," filed Feb. 16, 2011; U.S. Provisional Patent Application 61/443,704, entitled "Media-Editing Application with Novel Editing Tools," filed Feb. 16, 2011; U.S. Provisional Patent Application 61/443,707, entitled "Efficient Media Processing," filed Feb. 16, 2011; and U.S. Provisional Patent Application 61/443,692, entitled "Retiming Media Presentations," filed Feb. 16, 2011. The above-mentioned applications, namely U.S. patent application Ser. No. 13/151,175, now published as U.S. Patent Publication 2012/0210230 and U.S. Provisional Patent Applications 61/364,797, 61/443,702, 61/443,704, 61/443,707, and 61/443,692, are incorporated herein by reference.

BACKGROUND

Digital graphic design, image editing, audio editing, and video editing applications (hereafter collectively referred to as media content editing applications or media editing applications) provide graphical designers, media artists, and other users with the necessary tools to create a variety of media content. Examples of such applications include Final Cut Pro® and iMovie®, both sold by Apple, Inc. These applications give users the ability to edit, combine, transition, overlay, and piece together different media content in a variety of manners to create a resulting media project. The resulting media project specifies a particular sequenced composition of any number of text, audio, image, and/or video content elements that is used to create a media presentation.

Various media editing applications facilitate such composition through electronic means. Specifically, a computer or other electronic device with a processor and computer readable storage medium executes the media editing application. In so doing, the computer generates a graphical interface whereby designers digitally manipulate graphical representations of the media content to produce a desired result. However, in many cases, the designers experience inconvenience in manipulating graphical representations of the media content because of the shortcomings of the existing applications. Moreover, it is difficult to manage graphical representations of media content when there are too many graphical representations.

BRIEF SUMMARY

Some embodiments of the invention provide a media-editing application with a novel spine-based timeline. The media application of some embodiments includes a timeline, which is a composite display area for displaying media clips that are part of the composite media presentation. Specifically, the timeline in some embodiments displays one or more geometric shapes that represent one or more media clips that are part of the composite presentation. The timeline of some embodiments includes a primary lane (also called "spine") as well as one or more secondary lanes (also called "anchor lanes"). The spine represents a primary sequence of media, which, in some embodiments, does not have any gaps. When a clip is deleted or removed from the timeline, the media-editing applications automatically closes the gap created in place of the clip. The clips in the anchor lanes are anchored to a particular position along the spine (or along a different anchor lane). Anchor lanes may be used for compositing (e.g., removing portions of one video and showing a different video in those portions), B-roll cuts (i.e., cutting away from the primary video to a different video whose clip is in the anchor lane), audio clips, or other composite presentation techniques.

The media-editing application of some embodiments allows any types of clip (e.g., text clip, image clip, audio clip, video clip, audio and video clip, etc.) to be anchored clips. The spine can also be used to place any types of clips. In other words, the spine is not just for placing video clips in some embodiments. Also, anchored clips can be placed above or below the spine. The audio clips are generally placed below the spine, but can be moved above the spine near another clip in the spine.

The media-editing application of some embodiments uses two tones in the timeline, with one tone for the spine and another tone for the anchor lanes for placing anchored clips. The two tones help a user of the media-editing application to visually distinguish the spine and the anchor lanes of timeline. To further assist in this differentiation, the application shows the clips in the spine larger than the anchored clips in some embodiments.

In some embodiments, the media-editing application allows the user to customize the appearances of the clips in the timeline. The media-editing application in some cases provides the user with a list of icons representing customization options. By selecting an icon, the user can choose a customization option represented by the selected icon. In some embodiments, each icon in the list represents an appearance of a clip in the timeline after the customization option represented by the icon is applied to the timeline. Different icons show different appearances of the clips. For instance, the icons show gradual change of the ratio between the audio portion and video portion of the media clip. That is, an icon in the list shows that the clip's audio portion is occupying the entire clip while another icon in the list shows that the clip's video portion is occupying the entire clip. Yet another icon in the list shows each of the clip's video portion and the audio portion is occupying about half of the clip.

The media-editing application of some embodiments provides a zoom level control for the user of the media-editing application to change the zoom level of the timeline. The media-editing application of some embodiments allows the user to zoom out the timeline. When the timeline is zoomed out, the media-editing application displays less number of video frames for a media clip in the timeline. In some embodiments, the media-editing application displays the entire contents of the media presentation that are currently being composited and edited in the timeline when the user zooms out the timeline to a certain level using the zoom control. That is, all of the media clips that are part of the media presentation are displayed at that zoom level. The sizes of the media clip representations will shrink according to the zoom level.

When the user zooms in the timeline towards a certain level using the zoom level control, the media-editing application displays individual video frames of a media clip as a filmstrip. The media-editing application stretches each media clip representation such that more video frames are shown in the video portion of a media clip that has video content when the timeline is zoomed in. The media-editing application accordingly stretches a waveform that represents the volume level of the audio content of the clip over the duration of the clip. Some embodiments zooms in to a sub-frame level. At a sub-frame level zoom, the timeline displays a space between each frame of a media clip in order to indicate that the timeline has been zoomed into a sub-frame level. In some such embodiments, the media-editing application displays a visual indication to notify the user that the timeline is zoomed into a sub-frame level. This visual indication may take different forms in different embodiments. For instance, the media-editing application may change the color of the text that quantifies the zoom level as the timeline is zoomed into a sub-frame level.

In some embodiments, the media-editing application provides a volume level control for the user of the media-editing application to change the volume level of a clip displayed in the timeline. A media clip that contains audio content is represented as a geometric shape (e.g., a rectangular shape) with an audio portion, which in some embodiments displays a waveform representing the audio content. The volume control in some embodiments appears as a horizontal line above the waveform in the audio portion of the media clip. As the user drags the horizontal line upwards or downwards, the media-editing application changes the volume of the audio content of the media clip accordingly. Some embodiments provide fade handles at each end of the volume control line. For each fade handler, the media-editing application in these embodiments also provides the user with a list of predefined volume patterns, which the user can apply to the waveform using the fade handler. The user can select one of the volume patterns and apply the selected pattern by moving the fade handler along the volume control line.

The media-editing application also allows the user to select a range of one or more media clips displayed in the timeline and control the volume of the selected range. After selecting the range, the user can move the portion of the volume control line that falls within the selected range to control the volume. In this manner, the user can control the volume of the selected range only. In some embodiments, the media-editing application provides a fade handle at each end of the portion of the volume control line that falls within the selected range. These fade handlers are additional fade handlers other than the fade handlers at both ends of the volume control line.

In some embodiments, the media-editing application allows the user of the media-editing application to visually separate the audio portion of a clip from the clip representation. By default, a clip in the timeline shows the video portion and the audio portion right next to each other. In these embodiments, the media-editing application allows the user to place a gap between the video portion and the audio portion of a media clip displayed in the timeline. When the audio and video portions of the media clip are separated, the media-editing application allows the user to independently edit the audio content and the video content. That is, the user can edit only the audio content by manipulating the audio portion of the media clip without affecting the video content of the media clip and vice versa.

The media-editing application of some embodiments also allows the user to detach the audio portion of an audio and video clip displayed in the timeline from the media clip. In these embodiments, the media-editing application creates a separate audio-only clip out of the audio and video clip. The media-editing application turns the remaining clip into a video-only clip. The media-editing application of some embodiments allows for separating and/or detaching the audio portion of an audio and video clip when the clip is in the spine of the timeline or is an anchored clip.

The media-editing application of some embodiments displays two playheads, a primary playhead and a skimming playhead, in the timeline. A playhead in some embodiments appears as a vertical line in the timeline moving horizontally along the timeline as the media-editing application plays back the media presentation. The media-editing application displays in a preview area of the media-editing application a video frame of the media presentation that is represented by a position along the timeline at which the playhead is currently positioned. The media-editing application will also output a portion of audio content of the media presentation that corresponds to the frame to an audio output device. The skimming playhead in some embodiments is a playhead that moves with a cursor along the timeline as the cursor moves in the timeline. The primary playhead is a static playhead that scrolls across the timeline during playback or can be selected and moved across the timeline by the user of the media-editing application. The primary playhead specifies a current editing position in the timeline, while the skimming playhead specifies a skimming position in the time.

When the cursor enters the timeline, the skimming playhead appears in the timeline and becomes the editing position. The skimming playhead will override the primary playhead when the skimming playhead is present in the timeline. When the cursor leaves the timeline, the primary playhead becomes the current editing position of the media presentation. The primary playhead allows the user of the media editing application to move the cursor out of the timeline without losing the video frame of interest. Also, when the media presentation is previewed (i.e., when the media presentation is played back instead of being skimmed), the two playheads synch up and move together horizontally along the timeline in some embodiments. In some embodiments, different colors are used for displaying these two different playheads.

In some embodiments, the media-editing application displays a frame of the media presentation when the skimming playhead passes by a point along the timeline that represents the point in time at which the frame is located within the media presentation. When the skimming playhead passes by a position along the timeline and intersects with two or more media clips in the primary lane and the anchor lane(s), the media-editing applications displays in a preview display area a composite frame of the media presentation represented by the position of the skimming playhead along the timeline. A composite frame in some embodiments shows video content of one intersecting clip overlaying video content of another intersecting clip. The media-editing application in some embodiments can display a frame of one clip rather than the composite frame based on the position of the cursor that drives the skimming playhead. When the media-editing application is in a localized skimming mode, the media-editing application displays in the preview display area a frame of the clip on which the cursor is currently located. When the media-editing application is in a localized skimming mode but the cursor is not on any of the clips that the skimming playhead is currently intersecting, the media-editing application displays in the preview display area the composite frame.

In some embodiments, the media-editing application allows the user of the media-editing application to insert a clip between two adjacent clips displayed the timeline. The two adjacent media clips may be anchored clips or clips in the spine. Different embodiments provide different ways to insert a media clip between the two adjacent media clips. Some embodiments allow the user to drag a media clip from the clip browser of the media-editing application or another media clip in the timeline into the border between the two adjacent media clips. Some embodiments shift the clips away from a particular point along the timeline between the two media clips as another clip is being inserted to the point. In other embodiments, the media-editing application does not ripple the media clips in the timeline when a media clip is dragged into the particular point in the timeline. These embodiments overwrite any clips or portions of clips with the clip being added for the duration of the clip being added starting at the particular point along the timeline.

Some embodiments allow the user of the media-editing application to append a first media clip to a second media clip in the timeline. The second media may be an anchored clip or a clip in the spine. Different embodiments provide different ways to append a first media clip after a second media clip. Some embodiments allow the user to drag a media clip from the clip browser of the media-editing application or another media clip in the timeline to a right edge of another media clip which does not have a media clip appended to the right edge. The media-editing application of some embodiments allows for appending a selected media clip from the clip browser to the right edge of another media clip displayed in the timeline as a playhead is passing close to the right edge.

In some embodiments, the media-editing application allows the user of the media-editing application to anchor a media clip to another media clip displayed in the timeline by selecting a single media clip or a range of media clip(s) from the clip browser and drag the selected clip or a range above or below a media clip displayed in the timeline. As described above, the media-editing application in some embodiments anchors a media clip only to a media clip in the central compositing lane. In other embodiments, the media clip that is anchored to may be any clip displayed in any lanes in the timeline. That is, the media-editing application of these embodiments allows the user to anchor a media clip to a media clip that is in the spine or to a media clip that is anchored to another media clip.

The media-editing application of some embodiments provides several behaviors with respect to the anchored clips. For instance, in some embodiments, the user of the media-editing application can modify the position of the anchor with respect to the anchored clip, or modify the position of anchored clip with respect to the anchor. As described above, the media-editing application of some embodiments allows a user of the application to select a clip or a range of clip from a clip browser of the media-editing application and anchor the selected media clip or the range to another media clip displayed in a timeline. In some embodiments, the media-editing application attaches an anchor to the beginning (i.e., the in-point) of the media clip when the media clip is anchored to another media clip in the timeline. In some such embodiments, the media-editing application also allows the user to attach an anchor to a media clip other than to the beginning of the media clip when the media clip is anchored to another media clip in the timeline. For instance, the media-editing application allows the user to select and drag a media clip by placing a cursor on the media clip. The position of the cursor along the length of the media clip becomes the position of the anchor of the media clip when the media clip is anchored to another media clip.

In some embodiments, the media-editing application allows the user of the media-editing application to replace a first clip displayed in the timeline with a second clip. The media-editing application allows the user to select the second clip from a clip browser or from among the clips displayed in the timeline. Some embodiments replace the first clip with the second clip without preserving the duration of the first clip in the timeline. That is, the media clips that come after the first media clip in the timeline will shift towards the second clip in order fill up the gap created by the difference between the durations of the first clip and the second clip when the second clip is shorter in duration than the first clip. Conversely, the clips that come after the first clip in the timeline will shift away from the second clip to make room for the second media clip when the second clip is longer in duration than the first clip.

Some embodiments replace the first clip in the timeline with the second clip while preserving the duration of the first clip in the timeline. That is, when the second clip is longer in duration than the first clip, the first media clip is replaced with a range within the second media clip that has the same duration as the first media clip. In some such embodiments, the media-editing application provides the user with options to select the range within the second media clip. For instance, one option specifies the range to start from the beginning of the second media clip. Another option specifies the range to end at the out-point of the second media clip.

When the second clip is shorter in duration than the first clip, some embodiments place a position clip that has a duration that matches the difference in durations of the first media clip and the second clip in order not to leave a gap. A position clip is a clip that the media-editing application of some embodiments provides in order to create a placeholder. A position clip does not have any media content in some embodiments. Using a position clip, the media-editing application allows the clips that come after the first media clip in the timeline to keep its timing information within the timeline even when the second clip is shorter in duration than the first clip.

When the second media clip is shorter in duration than the first media clip, some embodiments replace the first clip by placing the second clip at the point that the first clip starts. This will cause a gap to close or to be filled with a position clip after the second clip. Some embodiments replace the first clip by placing the second clip such that the second clip ends at the point at which the first media clip ends. This will result in a gap to close or to be filled by a position clip before the second clip.

The media-editing application of some embodiments allows the user of the application to create a position clip within a timeline using a position clip tool. The media-editing application allows the user to manipulate a position clip just like any media clip. For instance, the media-editing application allows the user to replace, append, or anchor a position clip. Also, the media-editing application allows the user to trim or extend the audio clip. When the media-editing application trims a media clip within the timeline and the position clip tool is enabled, the media-editing application creates a position clip that has the same duration as the duration that is trimmed from the media clip.

Some embodiments allow the user of the media-editing application to trim a media clip displayed in the timeline. The media-editing application of these embodiments allows the user to trim any media clip in any lanes of the timeline. That is, an anchored clip as well as a clip in the spine can be trimmed by the media-editing application. Different embodiments provide different ways of trimming a media clip from either end of the media clip. For instance, the media-editing application allows the user to drag either side edge of a media clip to pull in or push out the in- or out-point of the media clip.

In some embodiments, the media-editing application allows the user of the application to trim frames off one end of a media clip while extending the same number of frames on the other end of the media clip. In this manner, some embodiments retain the clip's duration and position within the timeline while the frames of the media clip are trimmed off one end and extended on the other end of the clip. Each of clips in some embodiments has a source clip from which the clip is created. Depending on the in- and out-points of the clip, the source clip may include additional media content (e.g., frames) that can be added before an in-point and after an out-point of a media clip. The media-editing application of some embodiments allows the user to change both in- and out-points of a media clip at the same by moving both in- and out-points by the same number of frames in one direction along the source media clip.

The media-editing application of some embodiments allows the user of the media-editing application to create and use a secondary compositing lane (also called as a connected storyline). A secondary compositing lane is a lane in the timeline where media clips can be composited and edited the same way as in the spine. That is, the secondary compositing lane is capable of performing all the operations that a central compositing lane can perform. For instance, clips can be brought in, inserted, appended, trimmed, concatenated, taken out, etc. in the secondary compositing lane. Also, clips can be anchored to the media clips in the second compositing lane in some embodiments.

The secondary compositing lane, however, is not a spine (i.e., a central compositing lane). In the timeline of the media-editing application, the secondary compositing lane occupies one of anchor lanes for placing anchored media clips in some embodiments. Moreover, the secondary compositing lane in some embodiments does not span the entire timeline like a central compositing lane does. The secondary compositing lane spans only a necessary duration. Therefore, the media-editing application can include one ore more secondary compositing lanes in a single anchor lane of the timeline. The timeline can also include secondary compositing lanes in more than one anchor lanes. The secondary compositing lane can also be anchored to the central compositing lane the same way that an anchored clip can. Also, the secondary compositing lane can be inserted or appended to the central compositing lane.

Some embodiments allow the user of the media-editing application to move the position of an edit point in the timeline by using a hotkey command instead of a cursor controlling operation (e.g., dragging the edit point from one point along the timeline to another). In some embodiments, the media-editing application allows the user to select an edit point, specify the kind of edit (e.g., a roll edit, trim edit, etc.) to make, and specify the location to which to move the edit point. The media-editing application then moves the selected edit point to the specified location upon receiving a hotkey command.

The media-editing application of some embodiments allows a user to edit clips displayed in the timeline using a numeric editing tool. Numeric editing tool in some embodiments allows the user of the media-editing application to enter numerical inputs regarding the position of a clip, playhead, or other items in the timeline. In some embodiments, the media-editing application allows the user to perform numeric editing to precisely specify the duration of a clip, accurately specify the starting and/or ending point of a clip in the timeline, specify the location of a playhead, etc.

In some embodiments, the media-editing application allows the user to selectively take one type of media content from a clip when adding the clip to the timeline. In some such embodiments, the media-editing application provides several options each of which specifies the type of media content that the media-editing application will add to the timeline. For instance, when the user selects an option to bring in audio content of a media clip only, the media-editing application creates an audio-only clip in the timeline as the media clip is brought into the timeline from the clip browser of the media-editing application. Similarly, when the user selects an option to bring in video content only, the media-editing application creates a video-only clip in the timeline as the media clip is brought into the timeline from the clip browser of the media-editing application.

As mentioned above, the media-editing application in some embodiments provides a preview display area. The preview display area displays frames from clips that the user of the media-editing application is skimming through, playing back, or editing. In some embodiments, the media-editing application concurrently displays two frames in the preview display area to provide more details while the user is editing the media clips in the timeline. For instance, when the media-editing application performs a roll edit according to the user inputs (e.g., user's dragging the adjacent edges of two adjacent media clips at the same time), the media-editing application displays the current last frame of the outgoing media clip and the current first frame of the incoming media clip. Instead of displaying two frames in the same viewer, some embodiments provide another preview display area so that the two frames can be displayed in two different preview display areas of the media-editing application at the same time.

The media-editing application in some embodiments concurrently displays two frames in the preview display area for other types of editing as well. Some of different types of editing include a ripple edit, a slide edit, a slip edit, etc. A ripple edit is trimming or extending a media clip and the downstream media clips are affected. That is, the media clips (and the media clips anchored to these media clips) that come after the edited media clip in the timeline are pulled in or pushed out in the lane. For a ripple edit, the media-editing application of some embodiments displays two frames from both sides of the edit point. A slide edit is moving a media clip along the lane that the media clip is located while preserving the clip's duration. For a sliding edit, the media-editing application displays a frame that comes before the first frame of the clip moved and a frame that comes after the last frame of the clip in the viewer as the clip is being moved. A slip edit is taking a different portion of media content from the source media file while preserving the duration of the media clip and the location of the media clip within the media presentation. For a slipping edit, the media-editing application concurrently displays the current first frame of the media clip and the current last frame of the media clip in the preview display area.

In some embodiments, the media-editing application concurrently displays two frames in the preview display area to provide more details of editing to the user as an anchored clip displayed in the timeline is being edited. For instance, the media-editing application trims or extends an anchored clip by pulling in or pushing out the out-point of the anchored clip according to the user inputs (e.g., user's dragging the right side edge of the anchored media clip to the left or the right) in some cases. In such cases, the media-editing application concurrently displays the current last frame of the anchored clip and the frame of the media presentation that comes after the current last frame of the anchored clip being edited. Likewise, the media-editing application trims or extends an anchored clip by pulling in or pushing out the in-point of the anchored clip according to the user inputs (e.g., user's dragging the left side edge of the anchored media clip to the right or the left) in some cases. In such cases, the media-editing application concurrently displays in the preview display area the current first frame of the anchored clip and the frame of the media presentation that comes before the current first frame of the anchored clip being edited.

In some cases, the media-editing application moves an anchored clip along the timeline according to the user inputs (e.g., user's selection of the anchored clip and dragging to the right or the left). In such cases, the media-editing application concurrently displays in the preview display area a frame that comes before the first frame of the anchored clip and a frame that comes after the last frame of the anchored clip as the anchored clip is being moved. In some cases, the media-editing application performs a slip edit to an anchored clip. In such cases, the media-editing application concurrently displays the current first frame of the anchored clip and the current last frame of the anchored clip in the preview display area as the edit is being performed.

For some embodiments of the invention, a media-editing application allows a user of the application to combine the media clips displayed in the timeline into a single clip representation. The timeline often displays numerous clips at various instances in time and at various levels in the compositing hierarchy. To reduce the number of media clips in the timeline, the media-editing application of some embodiments allows the user to select several media clips and combine them into a one media clip representation. In this manner, the media-editing application reduces the congestion in the timeline. These single clip representations are referred to as "compound clips." Compound clips can be viewed as containers that can include several media clips of the same type in some embodiments, or that can include several media clips of several different types (e.g., audio clip, video clip, audio and video clip, text clip, image/picture clip, effect, transitions, etc.) in other embodiments.

In some embodiments, the media-editing application allows the user to select any combination of contiguous or noncontiguous clips, compound clips, clips in the spline, anchored clips, or clips in a secondary compositing lane and condense the selected clips into a compound clip. Some embodiments also allow the user to create a compound clip by first creating an empty compound clip and then adding other media clips to the compound clip. The media clips within a compound clip can be edited by opening the compound clip within the timeline, editing one or more media clips within it, and then closing the compound clip.

The media-editing application of some embodiments allows the user to manipulate a compound clip just like any other clip in the timeline. For instance, the user can drag a compound clip in and out of a spine or have it anchored to another media clip. Also, the media-editing application allows the user to edit a compound clip like any other media clip. For instance, the user can trim or extend a compound clip.

As mentioned above, the media-editing application of some embodiments allows the user to create a compound clip that contains one or more media clips including another compound clip. A compound clip thus can have several levels of hierarchy. For instance, a first compound clip may include a second compound clip, which itself includes a third compound clip. The first compound clip includes at least three levels of hierarchy.

Some embodiments allow the user to open up a compound clip in the timeline and edit the clips within the compound clip. When a compound clip is opened for editing, the media-editing application displays in the timeline no other media clips than the clips that the compound clip contains. Thus, the media-editing application displays in the timeline a new "page" that shows only the inside of the compound clip when the compound clip is opened. As such, the timeline will show different hierarchical levels of a compound clip as different pages showing different groups of media clips that correspond to the different hierarchical levels.

In some embodiments, the media-editing application provides a visual indication to show which level of the hierarchy the media-editing application currently shows in the timeline. For instance, the media-editing application provides a hierarchy display area that displays a name of a particular compound clip when the particular compound clip is opened for editing. This will aid the user to recognize that the timeline is displaying inside the compound clip. The hierarchy display area in some embodiments displays a name of the media project to show that the timeline is displaying the top level of the hierarchy (i.e., the media project). Other embodiments may display this hierarchical information differently. For instance, some embodiments may use a combination of color code and numeric values to show how far from the top level (i.e., the project level) is a hierarchical level that the timeline is currently displaying.

The media-editing application of some embodiments also provides tools to enable the user to navigate different pages for different hierarchical levels of a compound clip. For instance, the media-editing application may provide a back button and a forward button to move up or down the hierarchical levels of the compound clip. Some embodiments highlight these buttons when there are different hierarchies available to go up or down. Moreover, some embodiments display a drop-down list of hierarchies to go up or down when a user clicks and holds the back button or the forward button.

The media-editing application of some embodiments allows a user of the application to create a bookmark for a particular hierarchical level of a compound media clip. Through a bookmark, the media-editing application allows a direct access to the bookmarked hierarchical level of the compound clip. When the timeline displays the inside of a compound clip as the user navigates different hierarchical levels of the compound clip, the media-editing application in some embodiments allows the user to bookmark the compound clip so that a particular hierarchical level of the compound clip is directly accessible through the bookmark. When the timeline displays media clips at the project level or a lower hierarchical level of the compound clip, the timeline can switch to display the particular hierarchical level of the compound clip when the user selects (e.g., by a click operation) the bookmark displayed in a bookmark display area.

In some embodiments, the media-editing application provides a tool to change playback speed of a media clip or a selected range of one or more contiguous media clips. The media-editing application slows down the playback speed of a selected media clip or a selected range of media clip(s) by creating more video frames between the existing frames of the selected media clip or the selected range. The media-editing application speeds up the playback speed of a selected media clip or the selected range by removing some of the frames of the selected media clip or the selected range. The media-editing application changes the playback speed of the selected media clip or the selected range upon receiving the user inputs. In some embodiments, the media-editing application displays visual indications for the media clip or the range of which the playback speed has been changed. For instance, some embodiments use an orange color for the slowed down clip or a range, a blue color for the sped up clip or a range, and a green color for the clip or a range of which the playback speed is not changed.

As described above, the media-editing application of some embodiments allows the user to edit a compound clip just like any other non-compound media clip. The edit operations that the media-editing application can perform on a compound clip also include changing the playback speed of a compound clip. In some embodiments, the media-editing application changes the playback speed of the media clips inside a compound clip when the compound clip's playback speed has been changed. The media-editing application of other embodiments does not change the playback speed of the media clips inside a compound clip even if the compound clip's playback speed has been changed. In these embodiments, the media-editing application applies the changing of the playback speed to the compound clip only and preserves the playback speed of the media clips inside the compound clip. The media-editing application preserves the playback speed of the media clips inside the compound clip so that the media clips follow their respective playback speed in case when the media-editing application decomposes the compound clip back to the individual media clips.

The preceding Summary is intended to serve as a brief introduction to some embodiments of the invention. It is not meant to be an introduction or overview of all inventive subject matter disclosed in this document. The Detailed Description that follows and the Drawings that are referred to in the Detailed Description will further describe the embodiments described in the Summary as well as other embodiments. Accordingly, to understand all the embodiments described by this document, a full review of the Summary, Detailed Description and the Drawings is needed. Moreover, the claimed subject matters are not to be limited by the illustrative details in the Summary, Detailed Description and the Drawing, but rather are to be defined by the appended claims, because the claimed subject matters can be embodied in other specific forms without departing from the spirit of the subject matters.

BRIEF DESCRIPTION OF THE DRAWINGS

The novel features of the invention are set forth in the appended claims. However, for purposes of explanation, several embodiments of the invention are set forth in the following figures.

DETAILED DESCRIPTION

Figure 1:
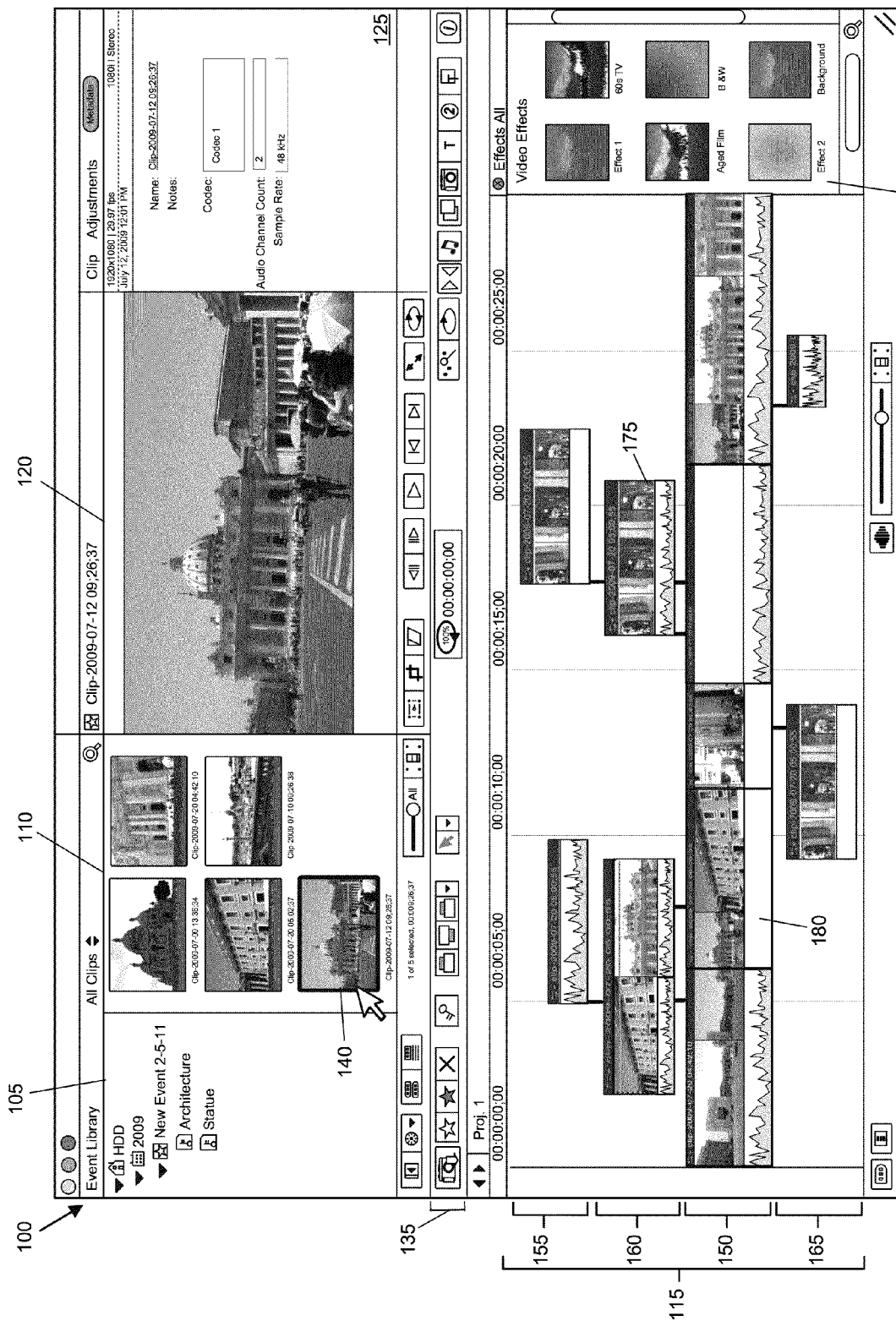
FIG. 1 illustrates a graphical user interface (GUI) of a media-editing application of some embodiments.

In the following detailed description of the invention, numerous details, examples, and embodiments of the invention are set forth and described. However, it will be clear and apparent to one skilled in the art that the invention is not limited to the embodiments set forth and that the invention may be practiced without some of the specific details and examples discussed.

For a media-editing application that creates a composite media presentation, some embodiments of the invention provide a novel compositing display area in which several media clips can be arranged for compositing. This novel compositing display area will be referred to as a "timeline" throughout this application unless specified otherwise. This timeline of some embodiments is capable of performing numerous novel features, some of which will be described in detail further below.

A media clip in some embodiments is a piece of media content. Examples of types of media content include audio data, video data, audio and video data, text data, image/picture data, and/or other media data. In some embodiments, a media clip can be a video clip or an audio clip. In other embodiments, a media clip can be a video clip, an audio clip, an audio and video clip, a sequence of media clips (also referred to as a media clip sequence), a text clip, a text overlay, a still image or picture, or any other type of media clip that can be used to create a composite presentation. In this application, a media clip may also refer to the graphical representation of the media clip in the GUI of a media-editing application of some embodiments.

A media clip that has a temporal component (e.g., audio media clips, video media clips, audio and video media clips, etc.) is further defined by an in-point and an out-point with respect to a source media file in some embodiments. In some such embodiments, the source media file is stored on the computing device on which the media-editing application executes or on a computing device to which the media-editing application has access. A media clip's in- and out-points define its start and end points with respect to the source media file.

The in- and out-points of a media clip can be defined as such to cover an entire source media file or a portion of the source media file in some embodiments. Several media clips can define different in- and out-points with respect to the same source media file such that each media clip has a different media content. For instance, the in- and out-points of a media clip can be defined to be the first half of a source media file while the in and out points of another media clip can be defined to be the second half of the same source media file.

In some embodiments, a media clip can serve as another media clip's source. For instance, the media-editing application allows the user to select a range (i.e., a length along the length of a graphical representation of a media clip that corresponds to a duration within the media clip) and use the selected range like a media clip.

Several detailed embodiments of the invention are described in the sections below. Section I describes various features of the spine-based timeline in some embodiments. Section II describes various edit operations that the media-editing application performs on the media clips displayed in the spine based timeline. Section III describes several editing tools that the media-editing application provides. Section IV then describes creation and manipulation of compound clips. Next, section V describes data structures of media clips used by some embodiments. Section VI describes the software architecture of a media-editing application of some embodiments. Finally, Section VII describes an electronic system that implements some embodiments of the invention.

I. Timeline

A. Introduction

FIG. 1 illustrates a graphical user interface (GUI) 100 of a media-editing application of some embodiments. One of ordinary skill will recognize that the graphical user interface 100 is only one of many possible GUIs for such a media-editing application. In fact, the GUI 100 includes several display areas which may be adjusted in size, opened or closed, replaced with other display areas, etc. The GUI 100 includes a clip library 105, a clip browser 110, a timeline 115, a preview display area 120, an inspector display area 125, an additional media display area 130, and a toolbar 135.

The clip library 105 includes a set of folders through which a user accesses media clips that have been imported into the media-editing application. Some embodiments organize the media clips according to the device (e.g., physical storage device such as an internal or external hard drive, virtual storage device such as a hard drive partition, etc.) on which the media represented by the clips are stored. Some embodiments also enable the user to organize the media clips based on the date the media represented by the clips was created (e.g., recorded by a camera). As shown, the clip library 105 includes media clips from both 2009 and 2011.

Within a storage device and/or date, users may group the media clips into "events", or organized folders of media clips. For instance, a user might give the events descriptive names that indicate what media is stored in the event (e.g., the "New Event 2-8-09" event shown in clip library 105 might be renamed "European Vacation" as a descriptor of the content). In some embodiments, the media files corresponding to these clips are stored in a file storage structure that mirrors the folders shown in the clip library.

Within the clip library, some embodiments enable a user to perform various clip management actions. These clip management actions may include moving clips between events, creating new events, merging two events together, duplicating events (which, in some embodiments, creates a duplicate copy of the media to which the clips in the event correspond), deleting events, etc. In addition, some embodiments allow a user to create sub-folders of an event. These sub-folders may include media clips filtered based on tags (e.g., keyword tags). For instance, in the "New Event 2-8-09" event, all media clips showing children might be tagged by the user with a "kids" keyword, and then these particular media clips could be displayed in a sub-folder of the event that filters clips in this event to only display media clips tagged with the "kids" keyword.

The clip browser 110 allows the user to view clips from a selected folder (e.g., an event, a sub-folder, etc.) of the clip library 105. As shown in this example, the folder "New Event 2-8-11 3" is selected in the clip library 105, and the clips belonging to that folder are displayed in the clip browser 110. Some embodiments display the clips as thumbnail filmstrips, as shown in this example. By moving a cursor (or a finger on a touchscreen) over one of the thumbnails (e.g., with a mouse, a touchpad, a touchscreen, etc.), the user can skim through the clip. That is, when the user places the cursor at a particular horizontal location within the thumbnail filmstrip, the media-editing application associates that horizontal location with a time in the associated media file, and displays the image from the media file for that time. In addition, the user can command the application to play back the media file in the thumbnail filmstrip.

In addition, the thumbnails for the clips in the browser display an audio waveform underneath the clip that represents the audio of the media file. In some embodiments, as a user skims through or plays back the thumbnail filmstrip, the audio plays as well. There are several types of clips. An audio and video clip is a clip that contains both audio and video content. An audio clip is a clip that contains only audio content. A video clip is a clip that contains only video content.

Many of the features of the clip browser are user-modifiable. For instance, in some embodiments, the user can modify one or more of the thumbnail size, the percentage of the thumbnail occupied by the audio waveform, whether audio plays back when the user skims through the media files, etc. In addition, some embodiments enable the user to view the clips in the clip browser in a list view. In this view, the clips are presented as a list (e.g., with clip name, duration, etc.). Some embodiments also display a selected clip from the list in a filmstrip view at the top of the browser so that the user can skim through or playback the selected clip.

The timeline 115 provides a visual representation of a composite presentation (or project) being created by the user of the media-editing application. Specifically, it displays one or more geometric shapes that represent one or more media clips that are part of the composite presentation. The timeline 115 of some embodiments includes a primary lane (also called a "spine", "primary compositing lane", or "central compositing lane") as well as one or more secondary lanes (also called "anchor lanes") above and/or below the primary lane. The spine represents a primary sequence of media which, in some embodiments, does not have any gaps. The clips in the anchor lanes are anchored to a particular position along the spine (or along a different anchor lane). Anchor lanes may be used for compositing (e.g., removing portions of one video and showing a different video in those portions), B-roll cuts (i.e., cutting away from the primary video to a different video whose clip is in the anchor lane), audio clips, or other composite presentation techniques.

Clips placed in the anchor lanes are referred to as "anchored clips." As an example, FIG. 1 shows a media clip 175 that is anchored off of another media clip 180 in the timeline 115. In some of these embodiments, media clips can be placed in these anchor lanes to anchor off of media clips in the central compositing lane 150. Instead of, or in conjunction with, having several levels of media clips that anchor off the central compositing lane 150, some embodiments allow media clips to be placed in these anchor lanes and to be anchored off of other anchored media clips placed in these anchor lanes. To help the user distinguish the central compositing lane 150 and the anchored lanes in the timeline 115, some embodiments use different tones for these lanes. For instance, the timeline 115 uses a darker tone for the central compositing lane 150 than the tone for the anchored lanes 155, 160, and 165.

As shown, the timeline 115 can place different types of media clips in the same lane (a central compositing lane or an anchored lane). Also, the timeline 115 can place different types of media clips in the anchor lanes above and below the central compositing lane. In other words, the timeline 115 can place a media clip of any type (e.g., audio clip, video clip, audio and video clip, etc.) in any lane of the timeline 115.

Also, when there are multiple anchored clips at a position along the timeline 115, the media content of an anchored clip in an upper anchor lane takes the priority over the media content of a media clip in a lower lane in some embodiments. For instance, the video content of the media clip in the uppermost anchor lane will be the content of the presentation for the period time along the timeline that the media clip spans.

As with the clips in the clip browser, the user can skim through the timeline or play back the timeline (either a portion of the timeline or the entire timeline). In some embodiments, the playback (or skimming) is not shown in the timeline clips, but rather in the preview display area 120.

The preview display area 120 (also referred to as a "viewer") displays images from media files that the user is skimming through, playing back, or editing. These images may be from a composite presentation in the timeline 115 or from a media clip in the clip browser 110. In this example, the user has been skimming through the beginning of clip 140, and therefore an image from the start of this media file is displayed in the preview display area 120. As shown, some embodiments will display the images as large as possible within the display area while maintaining the aspect ratio of the image.

The inspector display area 125 displays detailed properties about a selected item and allows a user to modify some or all of these properties. The selected item might be a clip, a composite presentation, an effect, etc. In this case, the clip that is shown in the preview display area 120 is also selected, and thus the inspector displays information about media clip 140. This information includes duration, file format, file location, frame rate, date created, audio information, etc. about the selected media clip. In some embodiments, different information is displayed depending on the type of item selected.

The additional media display area 130 displays various types of additional media, such as video effects, transitions, still images, titles, audio effects, standard audio clips, etc. In some embodiments, the set of effects is represented by a set of selectable UI items, each selectable UI item representing a particular effect. In some embodiments, each selectable UI item also includes a thumbnail image with the particular effect applied. The display area 130 is currently displaying a set of effects for the user to apply to a clip. In this example, only two effects are shown in the display area (the keyer effect and the luma keyer effect, because the user has typed the word "keyer" into a search box for the effects display area).

The toolbar 135 includes various selectable items for editing, modifying what is displayed in one or more display areas, etc. The right side of the toolbar includes various selectable items for modifying what type of media is displayed in the additional media display area 130. The illustrated toolbar 135 includes items for video effects, visual transitions between media clips, photos, titles, generators and backgrounds, etc. In addition, the toolbar 135 includes an inspector selectable item that causes the display of the inspector display area 125 as well as items for applying a retiming operation to a portion of the timeline, adjusting color, trimming, anchoring, creating position clips, and other functions.

The left side of the toolbar 135 includes selectable items for media management and editing. Selectable items are provided for adding clips from the clip browser 110 to the timeline 115. In some embodiments, different selectable items may be used to add a clip to the end of the spine, add a clip at a selected point in the spine (e.g., at the location of a playhead), add an anchored clip at the selected point, perform various trim operations on the media clips in the timeline, etc. The media management tools of some embodiments allow a user to mark selected clips as favorites, among other options.

One or ordinary skill will also recognize that the set of display areas shown in the GUI 100 is one of many possible configurations for the GUI of some embodiments. For instance, in some embodiments, the presence or absence of many of the display areas can be toggled through the GUI (e.g., the inspector display area 125, additional media display area 130, and clip library 105). In addition, some embodiments allow the user to modify the size of the various display areas within the UI. For instance, when the display area 130 is removed, the timeline 115 can increase in size to include that area. Similarly, the preview display area 120 increases in size when the inspector display area 125 is removed.

B. Volume Control

Figure 2:
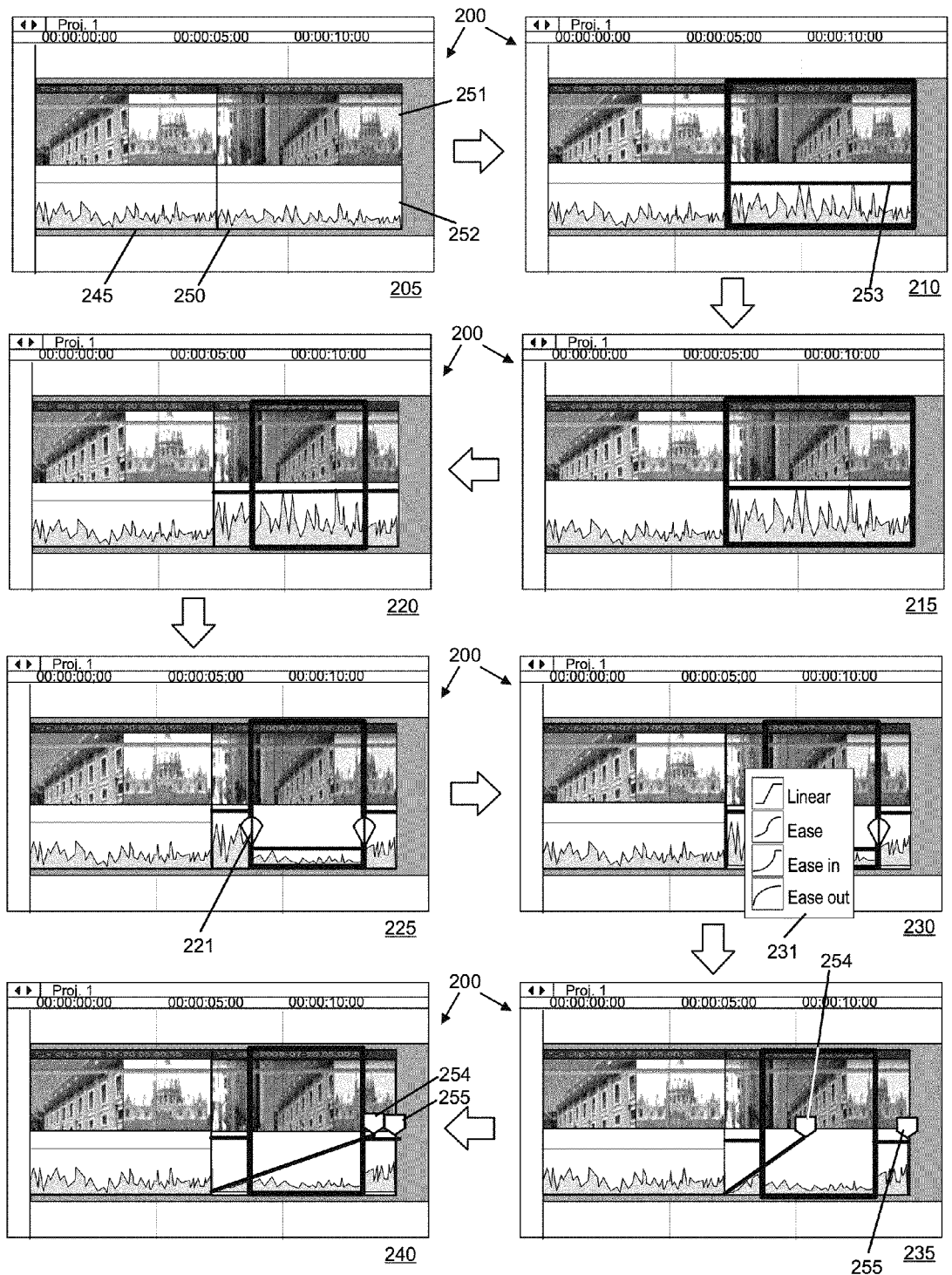
FIG. 2 illustrates an example of modifying the audio content of a media clip that includes both audio and video contents in a timeline of a media-editing application.

FIG. 2 illustrates an example of modifying the audio content of a media clip that includes both audio and video contents in a timeline of a media-editing application. Specifically, this figure illustrates a timeline 200 in eight different stages 205-260 to show changing volume level of the audio of a media clip 250 displayed in the timeline 200. FIG. 2 illustrates a media clip 245 and the media clip 250 displayed in the timeline 200. The timeline 200 is similar to the timeline 115 described above by reference to FIG. 1.

The media-editing application of some embodiments provides a volume control for a user of the application to control the volume of a media clip displayed in the timeline 200. The audio portion of a media clip displayed in the timeline 200 includes a volume control. The volume control in some embodiments appears as a horizontal line across the waveform in the audio portion as shown in the stage 215 of this figure. As the user drags the line upwards or downwards, the media-editing application changes the volume of the audio content of the media clip.

The media-editing application also allows the user to select a range of media clips displayed in the timeline 200 such that the user can selectively control the volume of the selected range. The audio portion in some embodiments includes fade handles 221 and 222, which appear near both ends of the waveform in the selected range as shown in the stage 225 of this figure. The user can control fading of the audio content by dragging the handles along the volume control line.

In some embodiments, the media-editing application provides a set of volume patterns for the user to select. By choosing a pattern and dragging volume control knobs 254 and 255 (shown in the stages 235 and 240), the user can apply the selected volume pattern to the audio content of the media clip. The volume control knob also moves along the volume level control line. Using the volume control knob 254, the user can apply a selected pattern from the beginning of a clip. The volume control knob 255 allows the user to apply a selected pattern from the end of a clip.

In the first stage 205, the timeline 200 displays a media clip 250, which includes both audio and media contents. Accordingly, the media clip 250 includes an audio portion 252 and a video portion 251 in its representation in the timeline 200. In the second stage 210, the timeline 200 highlights a volume control line 253 when the user selects the line 253 by a click operation.

In the third stage 215 the user drags the volume control line 253 upwards in order to increase the volume of the audio content of the media clip 250. In the fourth stage 220, the user selects (e.g., by a click operation) a range of the media clip 250. In the fifth stage 225, the user brings down a portion of the volume control line 253 that falls within the selected portion. As a result, the volume is leveled down for the duration of the media clip represented by the selected portion.

In the sixth stage 230, the timeline 200 displays a menu 231 for volume patterns when the user selects a volume control knob (behind the menu 231) by a click operation.

The user can then select a volume pattern from the menu 231. In this example, the user selects "Linear." In the seventh stage 235, the timeline 200 applies the selected volume pattern as the user drags the control knob 254 to the right. In the eighth stage 240, the timeline 200 shows the selected pattern more apparently as the user drags the control knob 254 to the right end of the media clip 250.

C. Splitting Audio and Video Portions

Figure 3:
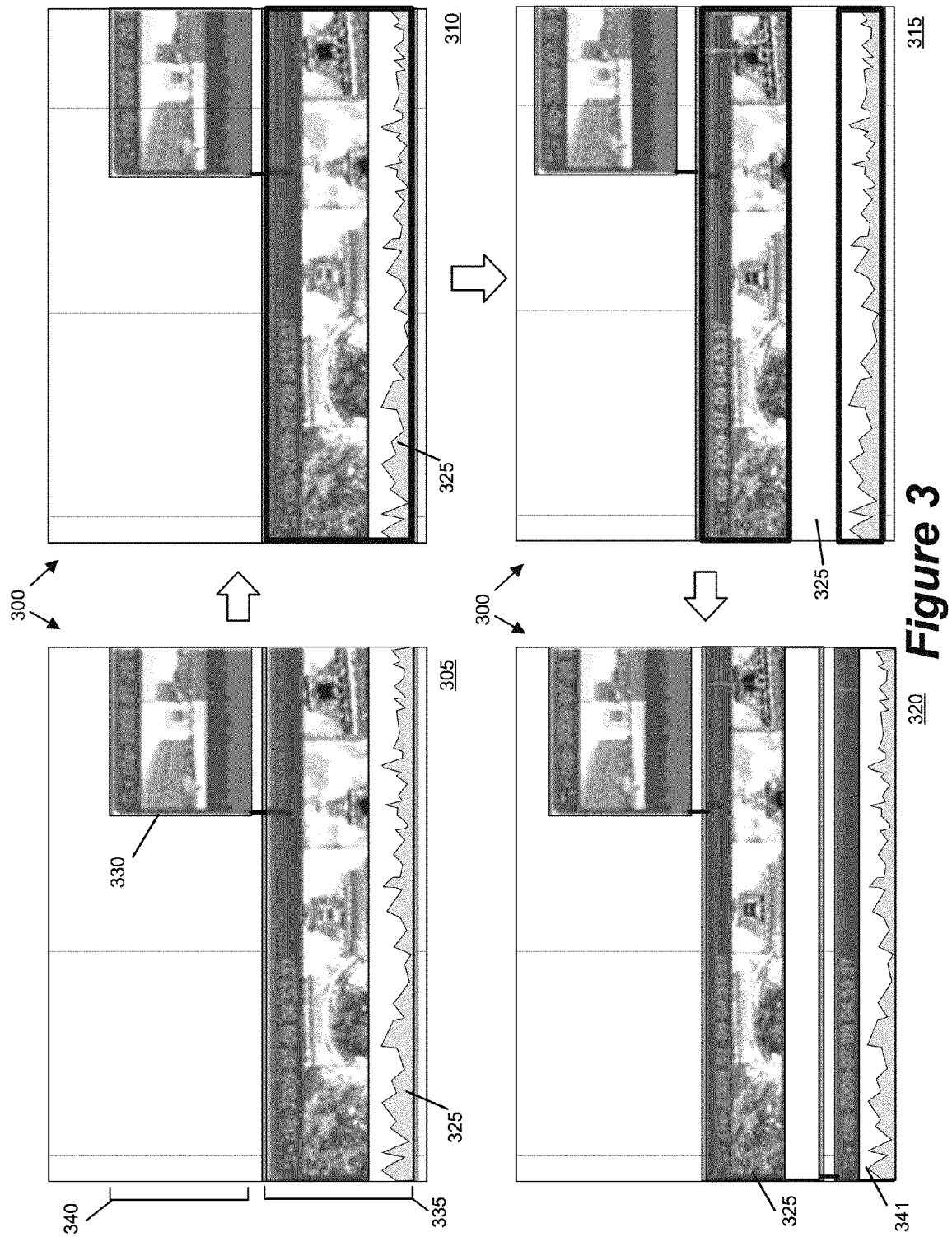
FIG. 3 illustrates an example of splitting an audio portion and a video portion of a media clip that includes both audio and video content in a timeline of a media-editing application.

FIG. 3 illustrates an example of splitting an audio portion and a video portion of a media clip that includes both audio and video content in a timeline of a media-editing application. Specifically, this figure illustrates a timeline 300 of a media-editing application in four different stages 305, 310, 315, and 320 to show that the media-editing application allows the user to decompose the video and audio portions of a media clip 325. FIG. 3 illustrates the media clips 325 and 330 in the timeline 300. The timeline 300 is similar to the timeline 115 described above by reference to FIG. 1.

The media-editing application of some embodiments allows a user of the application to visually or logically decompose the audio portion of a media clip from the media clip that has both audio and media content in the timeline 300. The media-editing application provides a variety of different ways for the user to invoke a command to decompose a media clip. For instance, the command may be received through a selection of an item in a drop-down menu, a selection of a UI button, or other user input. When receiving such a command, the media-editing application separates the audio portion of the selected media clip from the media clip in the timeline 300. In some embodiments, the media-editing application puts a gap between the audio portion and the video portion of the media clip such that the two portions are visually seemed further apart from each other as shown in the stage 315 of FIG. 3.

When the video portion and audio portion are visually separated for a media clip, the media editing application of some embodiments allows the user to independently edit audio content or video content of the media clip. That is, the user will be able to trim or extend audio content of the clip by trimming or extending the audio portion of the media clip. The video portion of the media clip is likewise editable. Being edited in this manner, the audio of the media clip can start before the video of the media clip or the video can start before the audio when the media clip is played back. In some embodiments, the manner of displaying the audio and video of the media clip separately in the timeline guarantees and maintains synchronization between the audio content and the video content of the media clip despite visually separating the audio and video portions of the media clip. This synchronization of the video and audio content of the media clip can be broken only when the audio and video contents are logically separated as different media clips as described below.

In some such embodiments, the media-editing application may remove the audio content from the original media clip and put it into a separate media clip that contains only the audio content. When initially removed from the media clip, the audio content is in synchronization with the video content of the original media clip. However, this synchronization can be broken when the user moves the original media clip with the video content or the separate media clip with the audio content.

In the first stage 305, the timeline 300 displays the media clips 325 and 330 in its central compositing lane 335 and anchor lane 340, respectively. These media clips have been brought into the timeline 300 from a clip browser (not shown) or by opening a media project file that contains data for the description of the media presentation that includes these media clips.

In the second stage the user selects (e.g., by a click operation) the media clip 325 and invokes a command (e.g., by clicking on the audio portion or by selecting an item from a drop down menu) to separate the audio portion and the video portion of the clip. In the third stage 315, the media-editing application after receiving the command, separates the audio portion visually further apart from the video portion of the media clip in the timeline 300.

The fourth stage 320 shows an alternative result of receiving the user input to separate the audio portion from the media clip 325 in some embodiments. Depending on the user command it receives, the media-editing application removes the audio portion out of the media clip 325 and places it as an anchored clip 341 underneath the media clip 325. As a separate media clip, the anchored audio clip 340 can be manipulated (e.g., moved to another position in the anchored lane, central compositing lane, etc.) just like another media clip.

Figure 4:
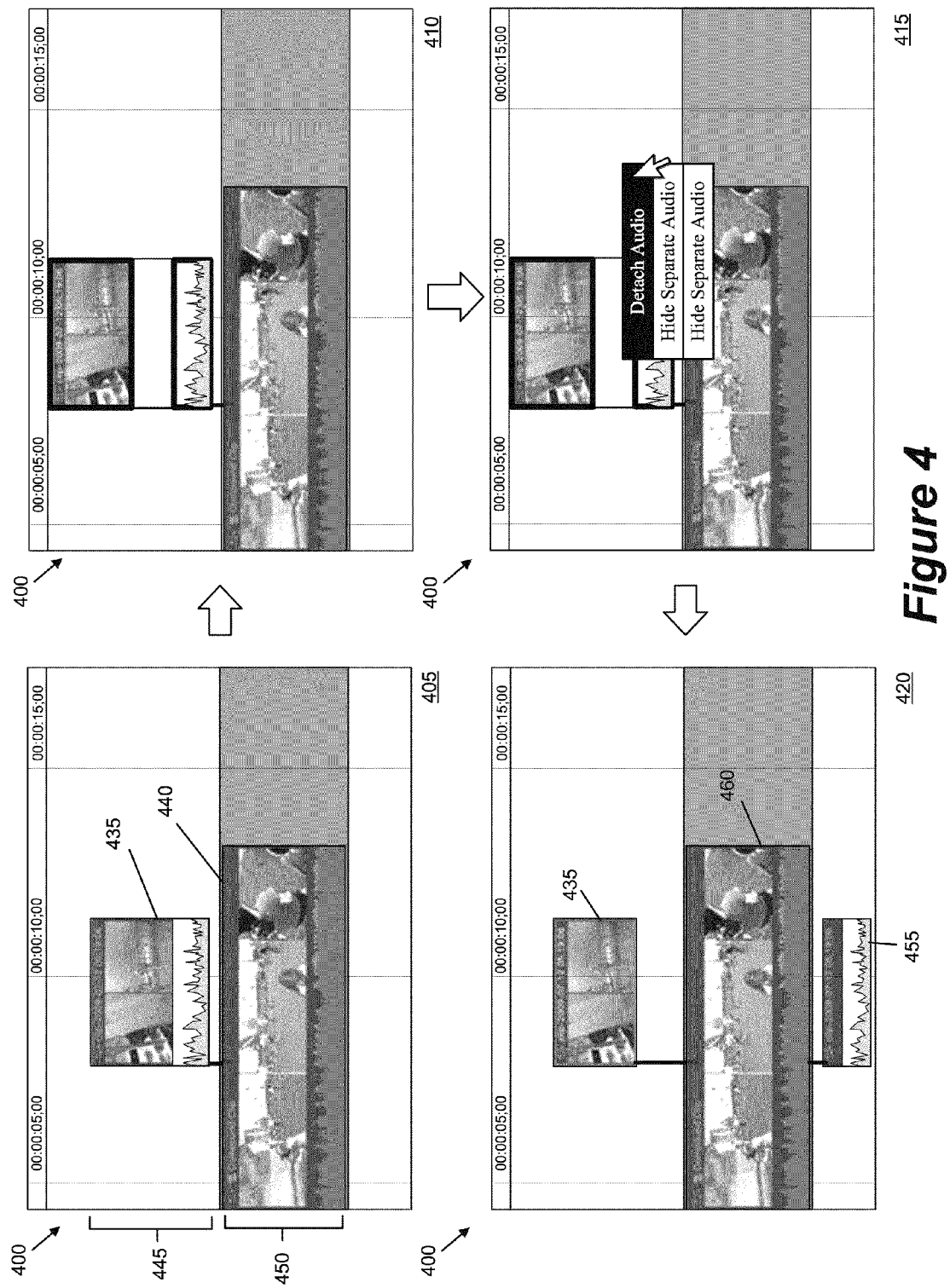
FIG. 4 illustrates an example of splitting an audio portion and a video portion of a media clip that includes both audio and video contents in a timeline of a media-editing application.

FIG. 4 illustrates an example of splitting an audio portion and a video portion of a media clip that includes both audio and video contents in a timeline of a media-editing application. Specifically, this figure illustrates the timeline 400 in four different stages 405-420 to show separating video and audio portions of an anchored media clip 435 or detaching the audio contents from anchored media clips in the timeline 400 and turning the contents into separate media clips.

In the first stage 405, the timeline 400 displays media clips 435 and 440 in its anchor lane 445 and central compositing lane 450, respectively. These media clips have been brought into the timeline 400 from a clip browser (not shown) or by opening a media project file that contains data for the description of the media presentation that includes these media clips. The media clip 435 is an anchored clip as it is anchored to the media clip 440 displayed in the central compositing lane 450. More details about creating and using an anchored clip in a timeline will be described further below.

In the second stage 410, the media-editing application separates the audio portion and the video portion of the anchored media clip 435 after it receives a user selection of the anchored media clip 435 and a user command (e.g., via a clicking operation on the audio portion) to separate the portions. As shown, the timeline 400 displays the audio portion visually further apart from the video portion of the anchored media clip 435.

In the third stage 415, the user wishes to turn the anchored media clip 435 into two different media clips that contain the video content and the audio content separately. The user selects a menu item provided by the media-editing application to detach the audio content of the anchored media clip 435 from the media clip 435.

In the fourth stage 420, the media-editing application has detached the audio content of the anchored media clip 435 and created a new anchored media clip 455. As it creates the anchored media clip 455, the media-editing application has kept the detached audio content (in the media clip 455) synchronized with the video content remaining in the media clip 430. Also, the media-editing application in some embodiment creates a new anchor lane 460 below the central compositing lane 450 as it creates the anchored media clip 455 in the timeline 400.

D. Customizing Timeline

Figure 5:
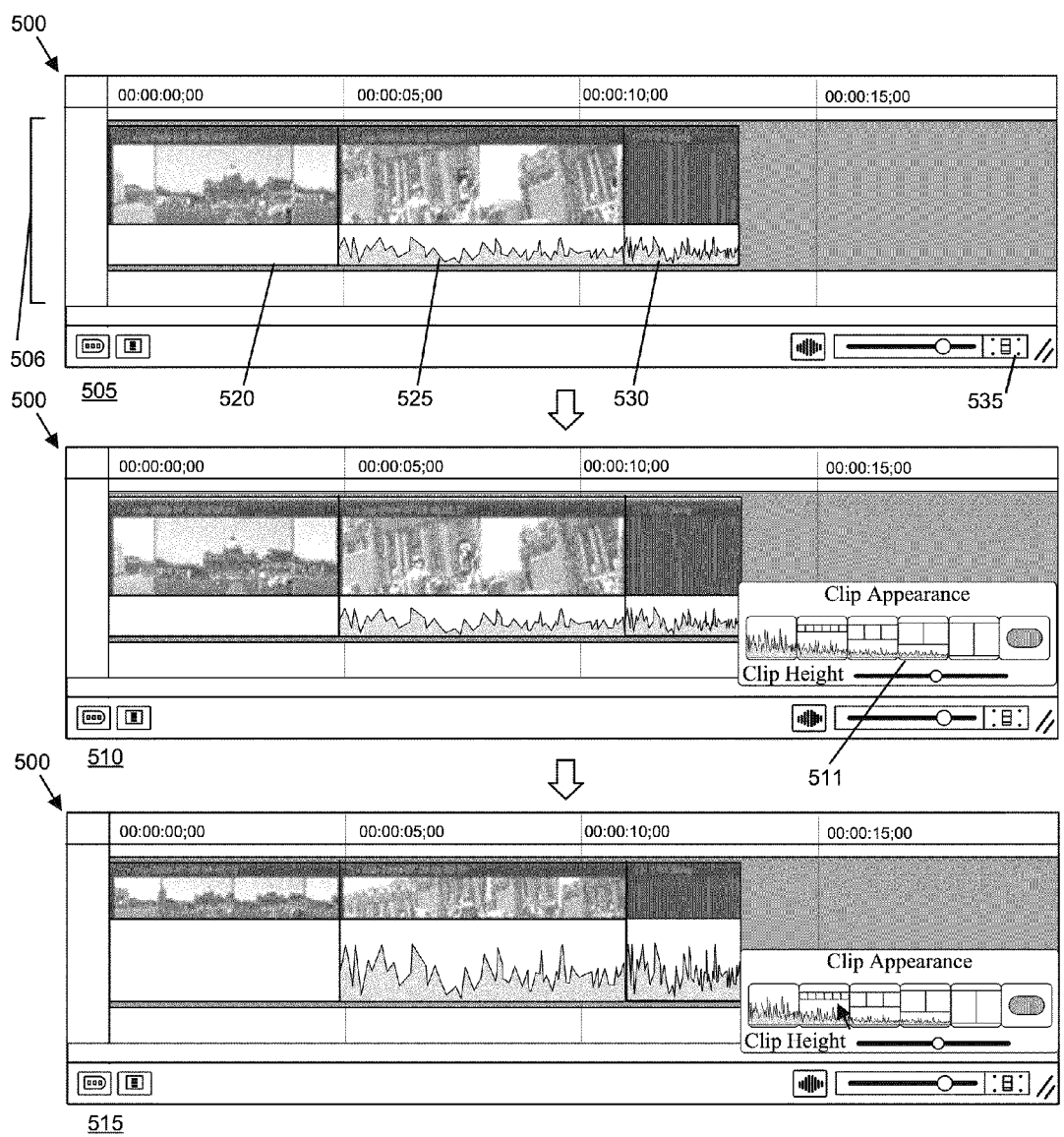
FIG. 5 illustrates an example of customizing the appearance of media clips displayed in a timeline of a media-editing application.

FIG. 5 illustrates an example of customizing the appearance of media clips displayed in a timeline 500 of a media-editing application. Specifically, this figure illustrates the timeline 500 in three different stages 505, 510, and 515 to show that the media-editing application changes the appearances of media clips 520-530 upon receiving user selections of different customizing layouts. FIG. 5 illustrates the media clips 530 and the customization options selection button 535. The timeline 500 is similar to the timeline 115 described above by reference to FIG. 1.

As described above, media clips of some embodiments include both audio and video contents. Each of these media clips includes a video portion and an audio portion in its representation in the timeline 500. Some embodiments allow the user to change the appearance (e.g., a ratio between the video portion and the audio portion) of the media clip displayed in the timeline 500. Different embodiments allow changing of the appearance differently. For instance, the media-editing application of some embodiments provides a list of pre-determined layouts of a media clip from which the user can choose.

As shown at stage 510 in this figure, the media-editing application provides a menu bar showing several different predetermined layouts represented as small icons. The user can choose an icon to change the appearance of the media clips to a layout represented by the icon. In some embodiments, the predetermined layouts may include a layout that shows only one type of media (e.g., audio, video, etc.). The user's selection input may be from a cursor controller (e.g., a click input), through a touchscreen (e.g., touching a menu option), from a keyboard, etc. Instead of, or in conjunction of, providing such a menu bar, some embodiments may also allow the user to directly manipulate the media clips (e.g., by expanding or contracting the audio or video portions using a cursor) to change the appearance. One of ordinary skill in the art will recognize that there are numerous other combinations of actions that the timeline 500 may allow the user to take, in order to change appearance of the media clips in the timeline 500.

In the first stage 505, the timeline 500 displays media clips 520-530 in its central compositing lane 506. These media clips have been brought into the timeline 500 from a clip browser (not shown) or by opening a media project file that contains data for the description of the media presentation that includes these media clips. The media clip 520 is a video clip. The media clip 525 is an audio and video clip that has audio and video portions. The media clip 530 is an audio clip. As shown, the video portion (i.e., filmstrip) of the media clip 525 is bigger than the audio portion of the media clip 525.

In the second stage 510, the user clicks on the customization options selection button 535 and the media-editing application displays a horizontal menu bar in a pop-up menu, showing different predetermined layouts of a media clip that the user can choose. As shown, the media-editing application has highlighted an icon 511 that represents the current layout for the individual media clips displayed in the timeline 500.

In the third stage 515, the user selects (e.g., by a click operation) an icon that represents a layout that is different than the current layout. As the media-editing application receives the user's selection of the different layout, the media-editing application changes the appearance of each media clip. As shown, the media clip 525 now has a video portion and an audio portion in about the same size.

E. Zooming Timeline

Figure 6:
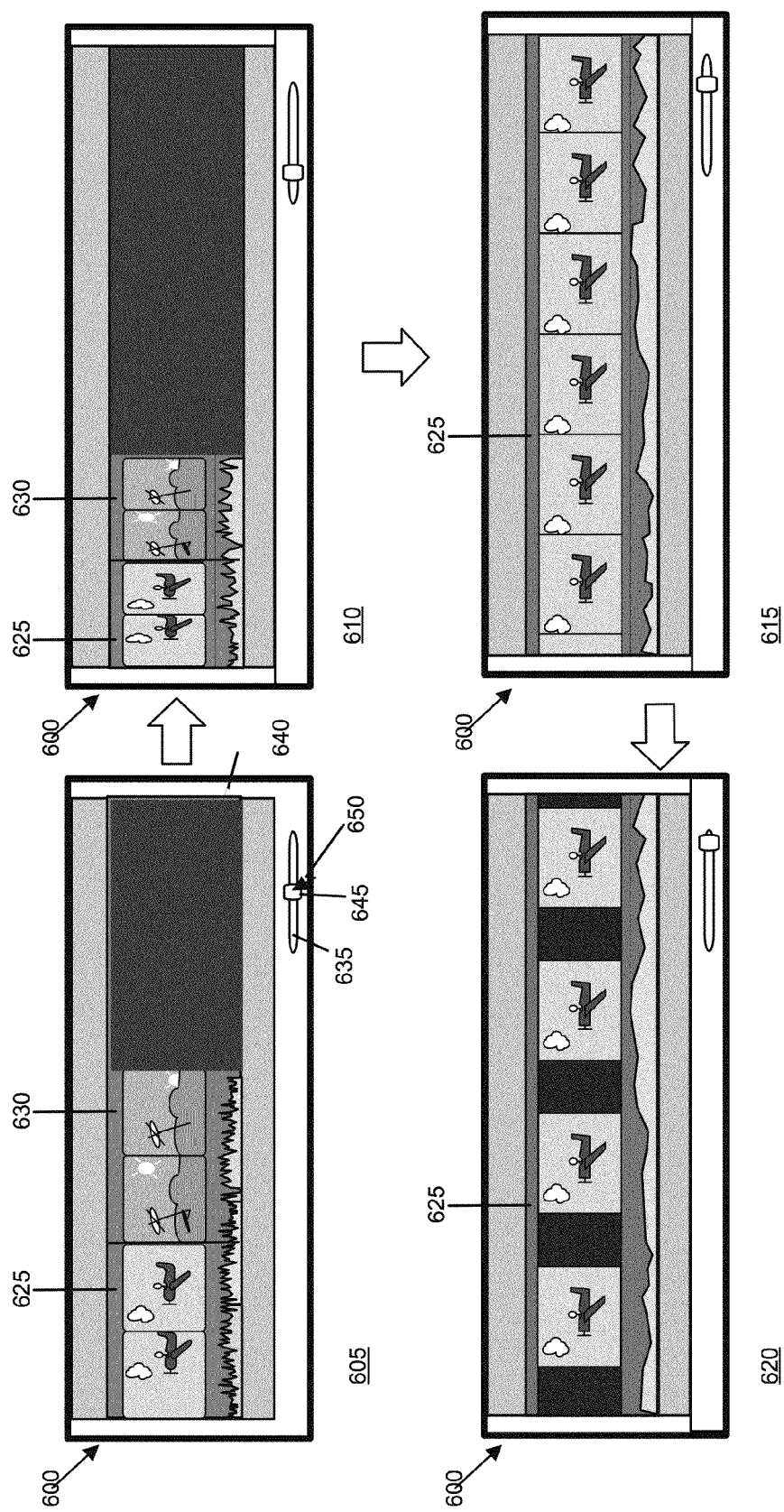
FIG. 6 illustrates an example of zooming in a timeline of a media-editing application.

FIG. 6 illustrates an example of zooming in a timeline 600 of a media-editing application. Specifically, this figure illustrates the timeline 600 in four different stages 605-620 to show that the timeline 600 zooms in and out to different levels. FIG. 6 illustrates the media clips 625 and 630 and the zoom level control 635. The timeline 600 is similar to the timeline 115 described above by reference to FIG. 1.

The media-editing application provides a zoom level control for the user to change the zoom level of the timeline 600. The media-editing application of different embodiments provides different zoom level controls. For instance, in some embodiments, a zoom level control is a slider like the zoom level control 630 shown in this figure. Other types of control in other embodiments include radio buttons, scroll bars, text entries, etc. Some other embodiment may provide menu commands or keyboard shortcuts, which the user can select or enter to change the zoom level differently. The media-editing application may also provide separate zoom controls for horizontal and vertical zooming in some embodiments.

In some embodiments, the media-editing application displays the entire contents of the media presentations that are currently being composited in the timeline 600 when the timeline is zoomed out to a certain level. All of the media clips that are part of the media presentation are displayed at that zoom level. The sizes of the media clip representations will shrink according to the zoom level.

When the timeline 600 is zoomed in towards a certain level, the media-editing application displays individual video frames of a media clip as a filmstrip. That is, the media-editing application stretches each media clip representation horizontally so that more video frames are shown in the video portion of a media clip with video content. Also, the media-editing application accordingly stretches a waveform that represents the volume level of the audio content of the clip over the duration of the clip.

The media-editing application of some embodiments can stretch to a sub-frame level. At a sub-frame level zoom, the timeline 600 displays a space between each frame of the media clip as shown in the stage 620 of this figure, in order to indicate that the timeline 600 has been zoomed into a sub-frame level. In some such embodiments, the media-editing application may display a visual indication to notify the user that the timeline 600 is zoomed into sub-frame level. This visual indication may take different forms in different embodiments. For instance, the media-editing application may change the color of the text that quantifies the zoom level as the timeline 600 is zoomed into a sub-frame level.

In the first stage 605, the timeline 600 displays media clips 625 and 630 in its central compositing lane 640. These media clips have been brought into the timeline 600 from a clip browser (not shown) or by opening a media project file that contains data for the description of the media presentation that includes these media clips. Each of the media clips 625 and 630 is an audio and video clip. As shown, the video portion of the media clip 625 includes several video frames and the video portion of the media clip 630 includes several video frames.

In the second stage 610, the user slides a knob 645 to the left to zoom out the timeline 600 using a cursor 650. The media-editing application zooms out the timeline accordingly. As shown, the media clips 625 and 630 became smaller than they were in the first stage 605. In some embodiments, the media-editing application shrinks the displayed media clips only horizontally as shown in this stage. Some embodiments do not change the number of thumbnails in each media clip as the timeline is zoomed out. Other embodiments keep the dimension of a thumbnail intact and adjust the number of thumbnails for each media clip in the timeline. In some such embodiments, the media-editing application displays some of the thumbnails in the media clip partially based on the adjusted zoom level and the duration of the media clip. That is, the number of thumbnails in the media clip is not always an integral number (e.g., the filmstrip may include 2.4 thumbnails of one dimension).

In the third stage 615, the user slides the knob 645 to the right to zoom in the timeline 600. The knob 645's position is further to the right from its position in the first stage 605. The media-editing application pauses the zooming-in of the timeline 600 when the number of frames per media clip can no longer increase (i.e., when the media clip is stretched to show every frame as a thumbnail). In this manner, the media-editing application indicates that the timeline 600 will be entering a sub-frame level when the timeline is zoomed in any further. The media-editing application may display additional visual cues (e.g., text) to indicate that further zooming in will cause the timeline 600 to zoom into a sub-frame level.

In the fourth stage 620, the user slides the knob 645 further to the right as shown. The media-editing application inserts gaps between the individual frames of the media clip 625 to indicate the timeline 600 has been zoomed into a sub-frame level.

F. Multiple Playheads

Figure 7:
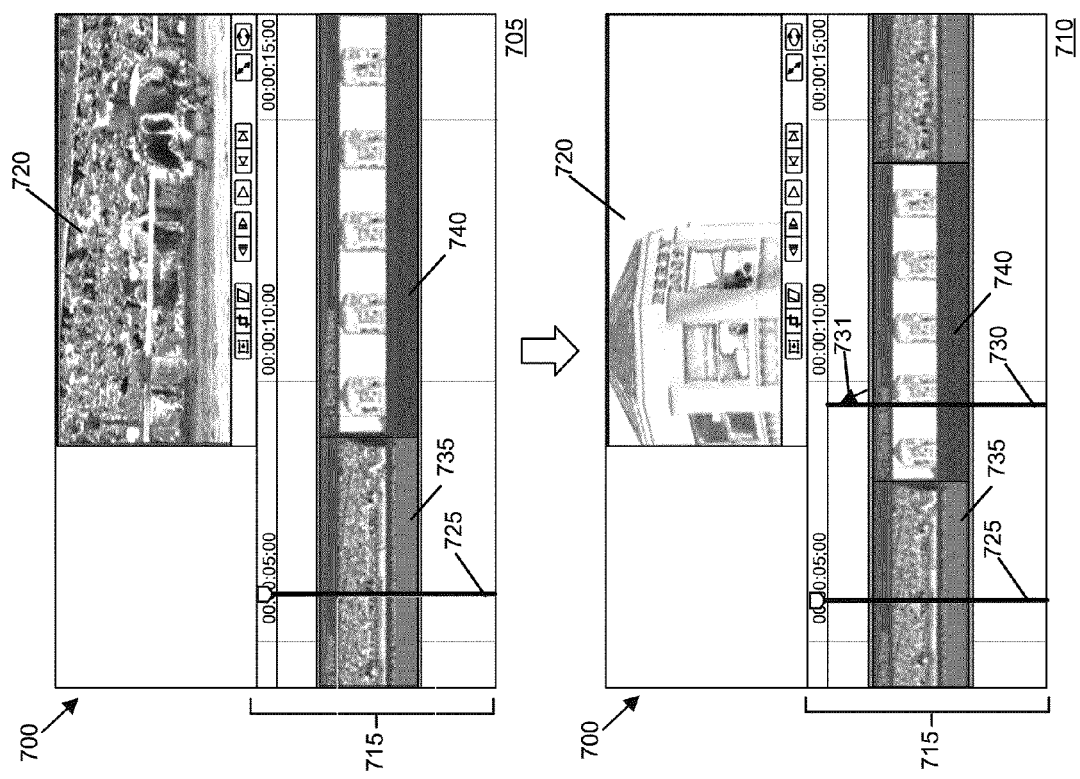
FIG. 7 illustrates a timeline of a media-editing application having two playheads.

FIG. 7 illustrates a timeline of a media-editing application having two playheads. Specifically, this figure illustrates a GUI 700 in two different stages 705 and 710 to show that a timeline 715 includes two playheads for editing and playing back a media presentation. The GUI 700 includes the timeline 715 and a viewer 720. The timeline 715 and the viewer 720 are similar to the timeline 115 and the viewer 120 described above by reference to FIG. 1.

The timeline 715 of some embodiments provides two playheads, a skimming playhead 730 and a primary playhead 725. A playhead in some embodiments appears as a vertical line in the timeline 715. A video frame of the media presentation that the playhead is positioned at is displayed in the viewer 720. A portion of audio content that corresponds to the frame will also be output to an audio output device by the media-editing application. The skimming playhead 730 is a playhead that matches the position of the cursor in the timeline 715. The primary playhead 725 is a static playhead that scrolls across the timeline 715 during playback or can be selected and moved across the timeline by the user of the media-editing application. The primary playhead specifies a current editing position in the timeline 715, while the skimming playhead specifies a skimming position in the time 715.

When the cursor (not shown) enters the timeline 715, the skimming playhead appears and becomes the editing position, since it is the point of focus. It will override the primary playhead 725 when it is present in the timeline 715. When the cursor leaves the timeline and enters another portion of the GUI 700, the primary playhead 725 is the current editing position. The primary playhead 725 allows the user to leave the timeline without losing the video frame of interest. As will be described further below, the primary playhead 725 also allows the user to use hotkey edits to add, remove or modify the content of the media presentation at the position of the primary playhead. Also, when the media presentation is previewed (i.e., when the media presentation is played back instead of being skimmed), the two playheads synch up and move together horizontally along the timeline 715 in some embodiments. Also, in some embodiments, different colors are used to represent the different playheads. For instance, a red color is used for the skimming playhead 730 and a gray color is used for the primary playhead 725 in some such embodiments.

In the first stage 705, the primary playhead 725 is placed at a position of the timeline 715 so that the playhead intersects with the media clip 735. In some embodiments, each point along the length of a media clip represents a video frame of the media clip. As shown, the media-editing application displays in the viewer 720 a frame of the media clip 735 represented by a point along the timeline 715 at which the primary playhead 725 is positioned currently.

In the second stage 710, the skimming playhead 730 appears as a cursor 731 enters into the timeline 715. The skimming playhead 730 is placed at a position of the timeline 715 such that the playhead intersects with the media clip 740. As shown, the media-editing application displays in the viewer 720 a frame of the media clip 740 represented by a point along the timeline 715 at which the skimming playhead 730 is positioned currently in some embodiments. When the cursor leaves the timeline 715, the skimming played 730 will disappear from the timeline 715 and the viewer 720 will display the video frame that it displayed in the first stage 705 because the primary playhead 725 has not been moved to another position in the timeline 715.

G. Placing Primary Playhead

Figure 8:
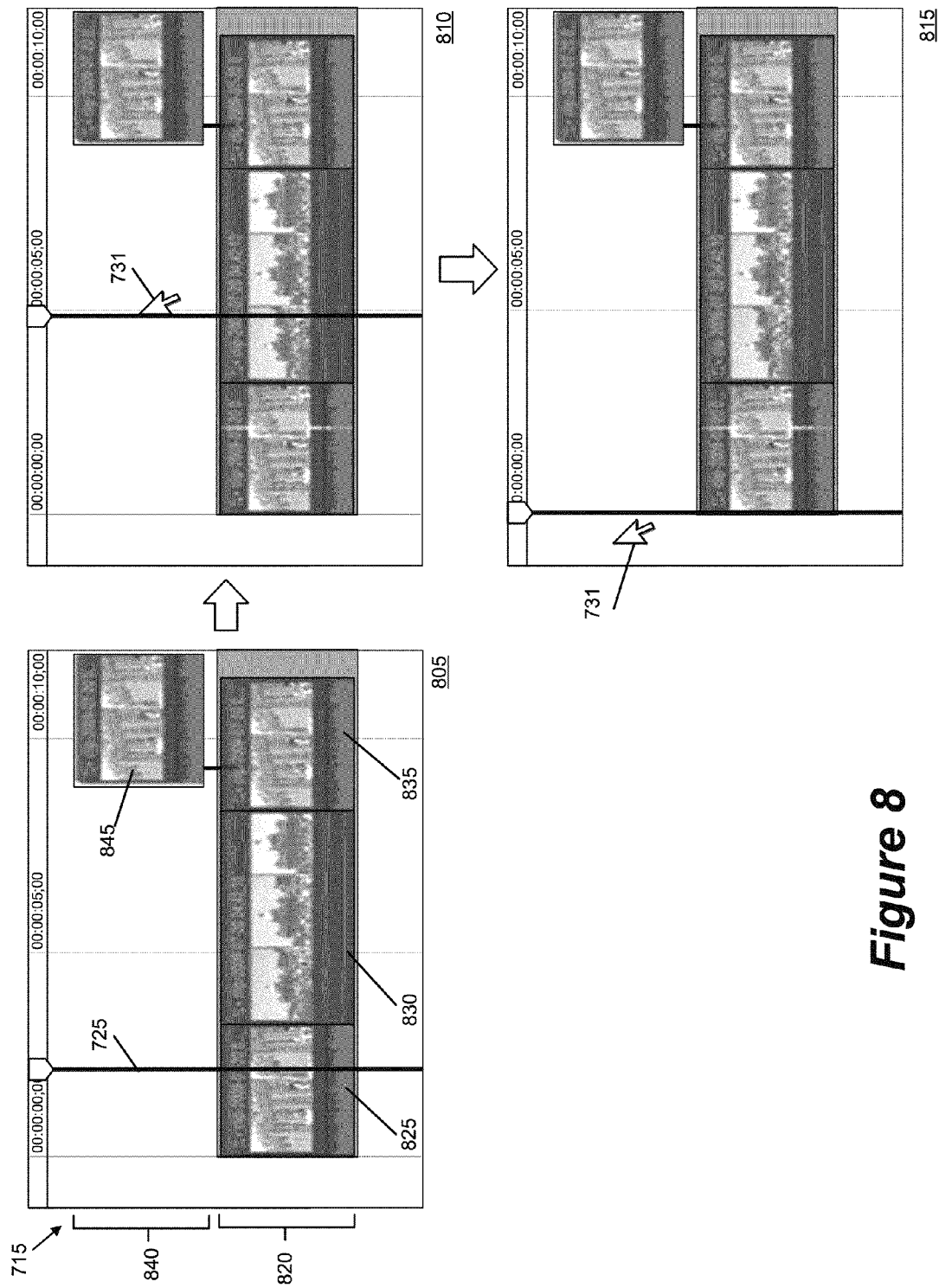
FIG. 8 illustrates an example of placing the primary playhead to a position in the timeline.

FIG. 8 illustrates an example of placing the primary playhead to a position in the timeline 715. Specifically, this figure illustrates the timeline 715 in three different stages 805-815 to show that the primary playhead 725 jumps to a position along the timeline 715 when the user clicks on the position.

As described above, the primary playhead 725 moves along the timeline 715 as the media-editing application plays back the media presentation. In some embodiments, when the user clicks in a region of the timeline 715 that is not occupied by a media clip, the timeline 715 brings the primary playhead 725 to the position along the timeline 715 on which the user performs a click operation using the cursor 731. When the user clicks on the space before the first media clip of the sequence of the media clips being edited in the timeline 715, the timeline 715 brings back the primary playhead 725 to the beginning (i.e., the in-point) of the first media clip.

In the first stage 805, the central compositing lane 820 displays media clips 825-835. The anchor lane 840 displays media clip 845. The primary playhead 725 is intersecting the media clip 825. In the second stage 810, the user clicks on a position that is further to the right from the position where the primary playhead was placed in the first stage 805 along the timeline 715. The timeline 715 of some embodiments moves the primary playhead to the position as shown in the second stage 810. In the third stage 815, the user clicks on a space before the media clip 825, which is the first media clip of the sequence of the media clips being edited in the timeline 715. As shown, the timeline brings back the primary playhead 725 (thick vertical line) to the beginning of the media clip 825.

Figure 9:
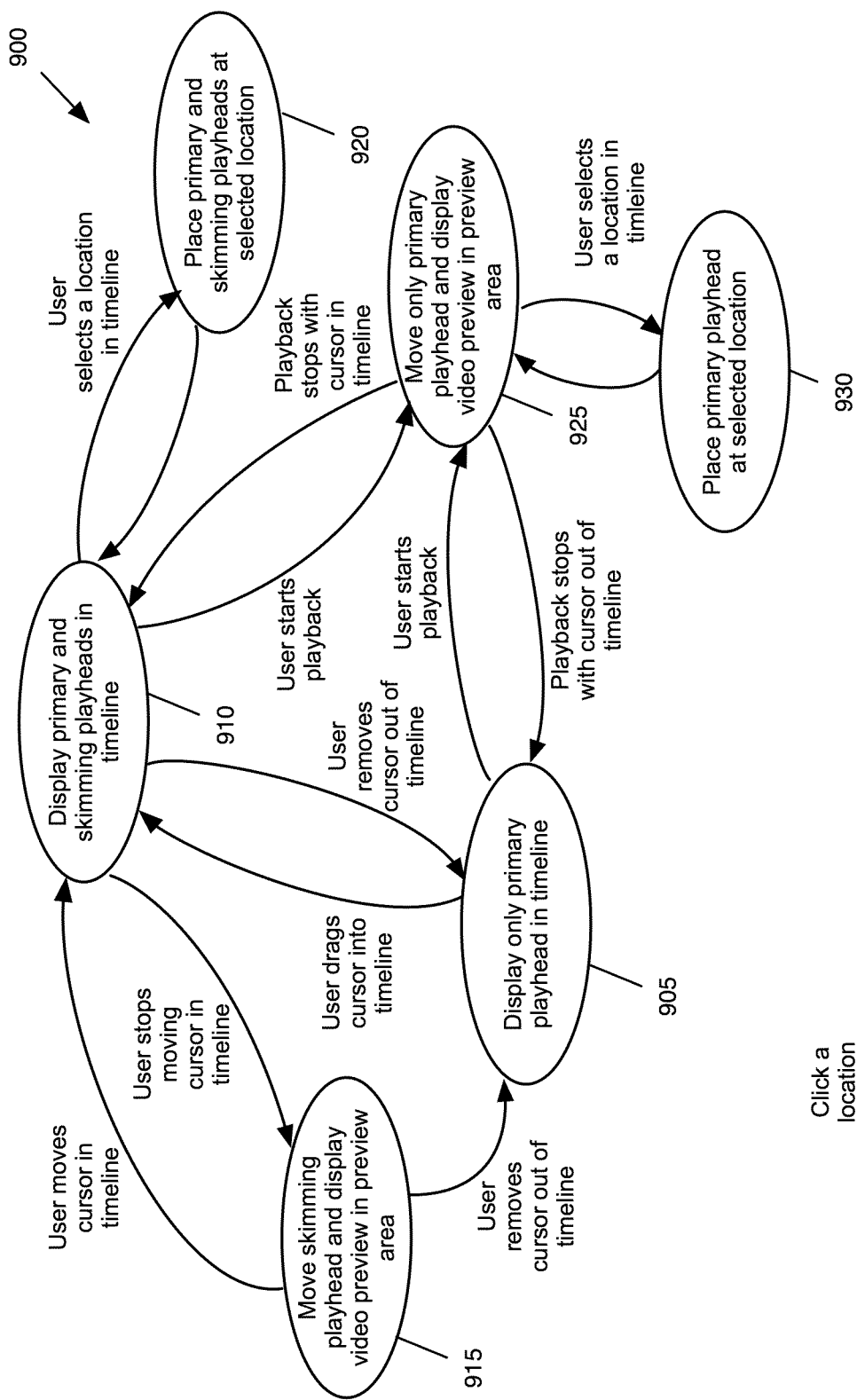
FIG. 9 conceptually illustrates a state diagram for a media-editing application of some embodiments.

FIG. 9 conceptually illustrates a state diagram 900 for a media-editing application of some embodiments. Specifically, state diagram 900 refers to the displaying and manipulation of primary and skimming playheads due to various user actions. As shown, when the application is not receiving any such actions, the application is in the state 905, in which the application displays in the timeline the primary playhead only. One of ordinary skill in the art will recognize that the application might be performing many other actions while in the state 905 with reference to this figure (e.g., importing a media file into the clip library).

When a user brings a cursor into the timeline, the application transitions to 910 to additionally display the skimming playhead in the timeline. A primary playhead and a skimming playhead are described above by reference to FIGS. 7 and 8. When the user brings the cursor out of the timeline, the application returns to the state 905 to display only the primary playhead in the timeline.

When the user starts a playback of the media presentation using playback control (e.g., by pressing "j" or "l" key) to play back the media presentation backward or forward when the application is in the state 905, the program transitions to 925 to move the primary playhead into either play direction (i.e., backward, forward) depending on the playback control and play back the media presentation as the primary playhead is moving along the timeline. The application returns to the state 905 to display the primary playhead when the playback stops while the cursor is out of the timeline. In some cases, the playback stops when the user stops the playback (e.g., by pressing "k" key). In other cases, the playback stops when the primary playhead reaches the end of the media presentation.

When the user moves the cursor (e.g., by dragging the cursor using a mouse, a keypad, or a finger, etc.) within the timeline when the application is in the state 910, the application transitions to 915 and moves the skimming playhead along the cursor. In addition, the application plays back the portion of the media presentation along which the skimming playhead is being moved. That is, the application displays the frames in the preview area as the cursor is moving in the timeline. The application returns to the state 910 to display the primary and skimming playheads in the timeline when the user stops moving the cursor in the timeline. However, when the user keeps moving the cursor and the cursor falls out of the timeline, the program transitions to the state 905 to display on the primary playhead in the timeline.

When the user selects a location within the timeline (e.g., by clicking or tapping) when the application is in the state 910, the application transitions to 920 to place the primary and the skimming playheads on the selected location. The selected location may fall in the area in the timeline that is occupied by a media clip. The selected location may not fall in the area occupied by media clips. In some cases, the selected location falls in a specific region of the timeline. In some embodiments, the program moves both playheads to a certain location different than the selected location when the clicked location falls in this specific region of the timeline. For instance, the program may place the playheads at the beginning of the media presentation (e.g., at the beginning of the first media clip of the media presentation) when the selected location falls in an area that is before the beginning of the media presentation. The application returns to the state 910 to display the primary and skimming playheads.

When the user starts a playback of the media presentation using playback control (e.g., by pressing "j" or "l" key) to play back the media presentation backward or forward when the application is in the state 910, the program transitions to 925 to move the primary playhead into either play direction (i.e., backward, forward) depending on the playback control and play back the media presentation as the primary playhead is moving along the timeline. In some embodiments, the application synchs up the primary and skimming playhead while playing back the media presentation. The application returns to the state 910 to display the primary and skimming playheads when the playback stops while the cursor is in the timeline.

When the user selects a location when the application is in the state 925 (i.e., when the application is moving the primary playhead and playing back the media presentation), the application transitions to 930 to place the primary playhead at the selected location (or at another location when the selected location falls in a certain specified area of the timeline). The application returns back to the state 925 to keep playing the media presentation and moving the primary playhead from the clicked location.

H. Localized Skimming

Figure 10:
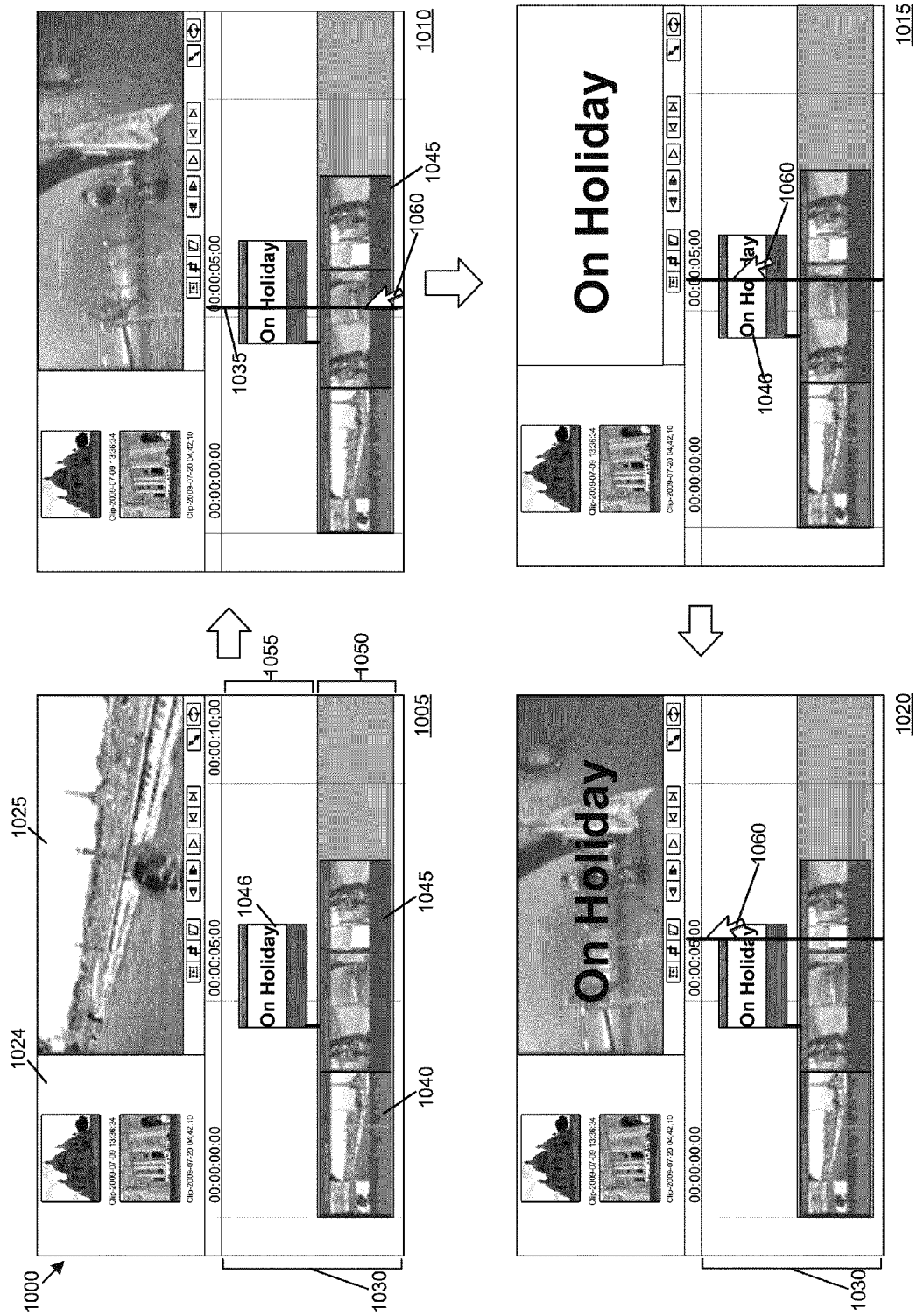
FIG. 10 illustrates a GUI of a media-editing application of some embodiments which performs localized skimming.

FIG. 10 illustrates a GUI 1000 of a media-editing application of some embodiments which plays back the media content of the media clips displayed in each of a central compositing lane or an anchor lane separately. Specifically, this figure illustrates the GUI 1000 in four different stages 1005-1020 to show that the media-editing application allows skimming individual lanes (e.g., central compositing lanes or anchor lanes) of a timeline 1030. The GUI 1000 is similar to the GUI 100 described above by reference to FIG. 1 in that the GUI 1000 includes a clip browser 1024, a viewer 1025, and the timeline 1030 which are similar to the clip browser 110, the timeline 115, and the viewer 120, respectively.

The timeline 1030 includes a skimming playhead 1035, which is similar to the skimming playhead 730 described above by reference to FIG. 7. The timeline 1030 displays media clips 1040, 1045, and 1046. As shown in the first stage 1005, the timeline 1030 displays the media clips 1040 and 1045 in a central compositing lane 1050 and the media clip 1046 in an anchor lane 1055.

In some embodiments, the viewer 1025 displays a frame of a composite media presentation when the playhead 1035 passes by a point along the timeline 1030 which represents the point in time at which the frame is located within the media presentation. For instance, the viewer 1025 displays frames of the media clip 1040 when the playhead 1035 passes by a horizontal range of the timeline 1030 that the media clip 1040 spans. When the playhead 1035 passes by a horizontal range of the timeline 1030 that both of the media clips 1045 and 1046 span, the viewer 1025 displays composite frames of the media presentation (i.e., frames showing the content of the media clip 1046 overlaying or superimposing the content of the media clip 1045).

However, in some such embodiments, the media presentation provides a different mode of previewing the media content of the media presentation. Instead of displaying the composite frames, the viewer 1025 in this mode of playing back displays the frames of the media clip in the individual lanes of the timeline 1030 separately. For instance, when the playhead 1035 passes by the horizontal range of the timeline 1030 that both of the media clips 1045 and 1046 span, the viewer 1025 in this mode plays back frames of one of the media clips depending on the position of a cursor 1060. That is, when the cursor 1060 is over the media clip 1045 in the central compositing lane 1050 while dragging the skimming playhead 1035 within the horizontal range, the viewer 1025 displays frames of the media clip 1045 only. Likewise, when the cursor 1060 is over the media clip 1046 in the anchor lane 1055 while dragging the skimming playhead 1035 within the horizontal range, the viewer 1025 displays frames of the media clip 1046 only. Moreover, some embodiments display composite frames of the media presentation in this mode when the cursor 1060 is over neither of the media clips 1045 or 1046 but it is within the horizontal range. In this manner, the media-editing application allows the user to 'locally skim' parts of the media presentation displayed in the timeline 1030.

Different embodiments enter the localized skimming mode differently. In some embodiments, the media-editing application enters the mode when the user selects to use certain editing tools (e.g., blade or trimming tools). Other embodiments may also enter this mode when the user selects a menu item or invokes hotkey commands.

In the first stage 1005, the user has selected a blade tool to divide a media clip into two media clips. As a result, the media-editing application enters the localized skimming mode. The user drags the skimming playhead 1035 over a position along the timeline 1030 such that the playhead 1035 intersects with the media clip 1040. Accordingly, the viewer 1025 displays a frame of the media clip 1040 that the playhead 1035 is on.

In the second stage 1010, the user drags the skimming playhead 1035 over a position along the timeline 1030 such that the playhead 1035 intersects with both of the media clips 1045 and 1046. The user drags the playhead over the position by placing the cursor 1060 over the media clip 1045. Because the cursor is over the media clip 1045 and the media-editing application is in the localized skimming mode, the viewer 1025 displays a frame of the media clip 1045 even though the skimming playhead intersects with both of the media clips 1045 and 1046.

In the third stage 1015, the user moves the cursor 1060 over the media clip 1046 while keeping the skimming playhead intersecting both of the media clips 1045 and 1046. The viewer 1025 displays a frame of the anchored media clip 1046 instead of displaying a frame resulted from compositing the two media clips.

In the fourth stage 1020, the user moves the cursor 1060 above the media clip 1046 but within the timeline 1030 as shown. The viewer 1025 displays a composite frame of the media presentation that is resulted from overlaying the media content of the media clip 1045 with the media content of the media clip 1046.

Figure 11:
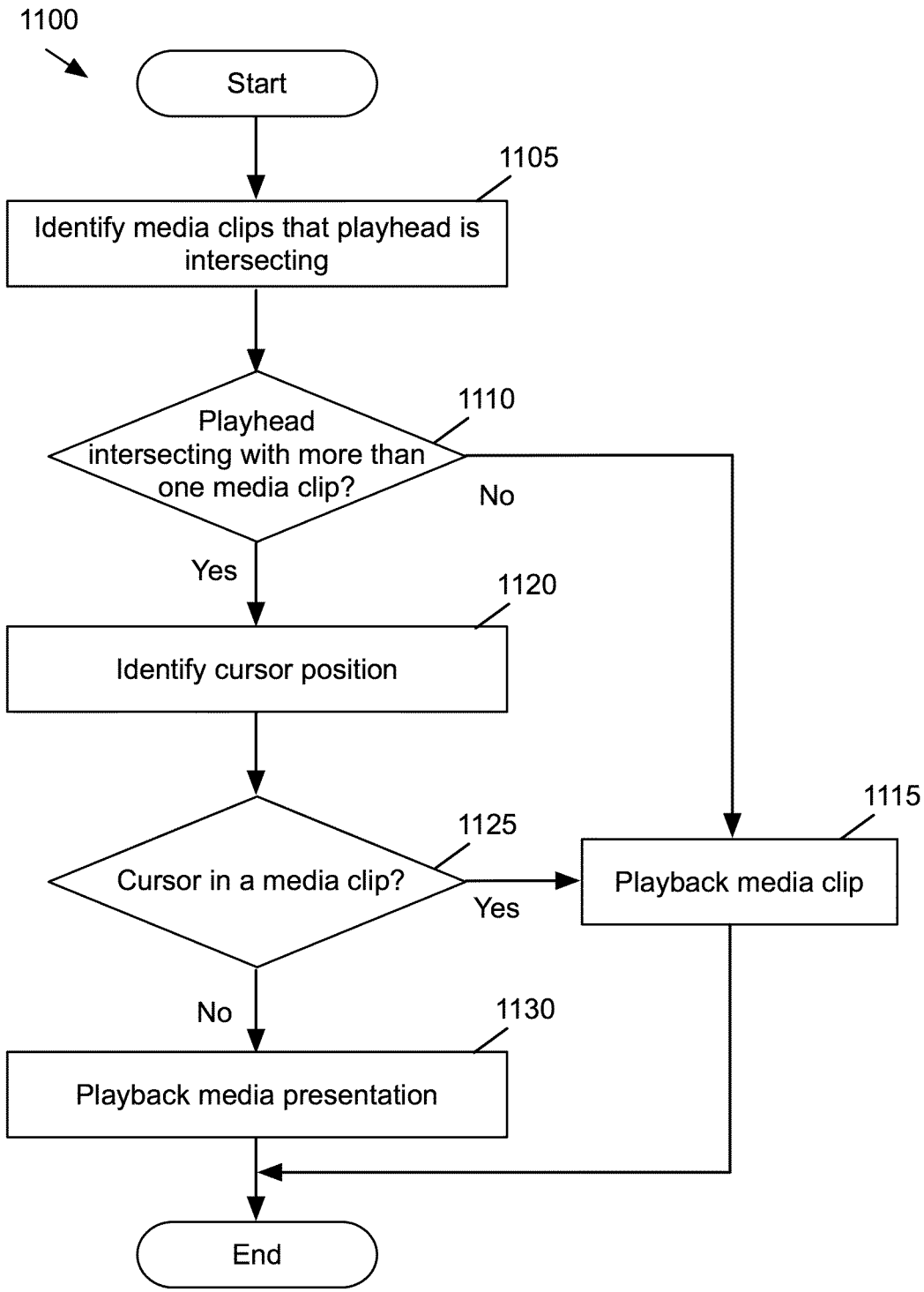
FIG. 11 illustrates a conceptual process that a media-editing application of some embodiments performs to playback a media presentation that is being composited in a timeline of the media-editing application.

FIG. 11 illustrates a conceptual process 1100 that a media-editing application of some embodiments performs to play back a media presentation that is being composited in a timeline of the media-editing application. Specifically, process 1100 is for localized skimming. The process starts when the media-editing application is in the localized skimming mode. As described above, the media-application of some embodiments allow the user of the application to playback the media presentation by moving a skimming playhead. Also as described above, the media-editing application plays back in a viewer of the media-editing application the media clip(s) with which the skimming playhead intersects. When the media-editing application is in the localized skimming mode, the media-editing application in some embodiments determines which media clip(s) to play back based on the position of the skimming playhead as well as the position of the cursor.

Process 1100 begins by identifying (at 1105) media clips with which a playhead is intersecting. The skimming playhead rather than the primary playhead is the relevant playhead of the media-editing application in some embodiments when the media-editing application is in the localized skimming mode. The process identifies the horizontal position of the skimming playhead within the timeline of the media-editing application. The process identifies all media-clips in all lanes of the timeline that span a period of time in which the horizontal position of the skimming playhead falls.

The process then determines (at 1110) whether the playhead is intersecting with more than one media clip. The process in some embodiments counts the number of the identified media clips that the skimming playhead is intersecting. When the process determines (at 1110) that the skimming playhead is intersecting with only one media clip, the process plays back (at 1115) the media clip. The process plays back the media clip based on the position of the skimming playhead on the media clip. As described above, a point along the length of a media clip represents a frame of the media clip when the media clip contains video content. The process displays the frame of the media clip that is represented by the position of the skimming playhead in the viewer of the media-editing application.

When process 1100 determines (at 1110) that the skimming playhead is intersecting with more than one media clips, the process identifies (at 1120) the cursor position. The process identifies the position of the cursor in the timeline of the media-editing application. As described above, the user of the media-editing application manipulates the skimming playhead by moving the cursor within the timeline in some embodiments. The cursor's position in these embodiments is therefore at a vertical position along the skimming playhead.

Process 1100 then determines (at 1125) whether the cursor is in a media clip. That is, the process determines whether the cursor is placed within one of the media clips with which the skimming playhead is currently intersecting. When the process determines (at 1125) that the cursor is in a media clip, the process proceeds to 1115 to playback the media clip.

When the process determines (at 1125) that the cursor is not in a media clip, the process plays back the media presentation. That is, the process plays back the media presentation by playing back the media clips with which the skimming playhead is intersecting. In some cases, the process plays back the composite media, which results from compositing (e.g., removing portions of one video and showing a different video in those portions) the media clips. In other cases, the process plays back the anchor clip in the top anchor lane.

II. Editing in Timeline

A. Inserting a Media Clip

Figure 12:
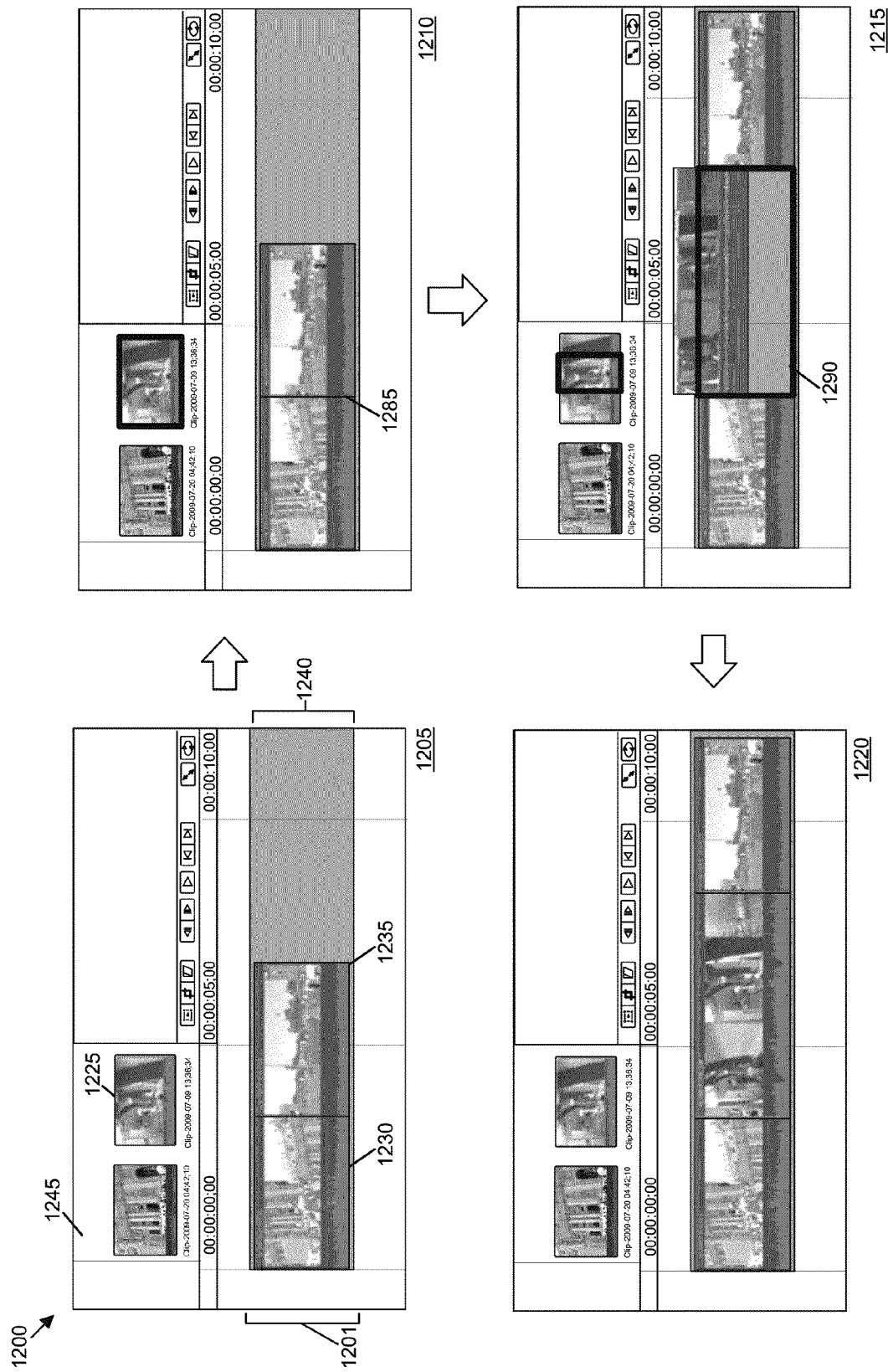
FIG. 12 illustrates an example of inserting a media clip between two adjacent media clips in a timeline of a media-editing application.

FIG. 12 illustrates an example of inserting a media clip between two adjacent media clips in a timeline 1201 of a media-editing application. Specifically, this figure illustrates a GUI 1200 in four different stages 1205-1220 that the media-editing application allows the user to add a media clip 1225 to the timeline 1201 by inserting it between two media clips 1230 and 1235 displayed the timeline 1201. The GUI 1200 is similar to the GUI 100 described above by reference to FIG. 1 in that the GUI 1200 includes a clip browser 1245 and the timeline 1201 which are similar to the clip browser 110 and the timeline 115, respectively. The timeline 1201 includes a central compositing lane 1240.

Some embodiments allow a user of the media-editing application to insert a media clip between two adjacent media clips within the timeline 1201. The two adjacent media clips may be anchored clips or clips in the central compositing lane 1240. Different embodiments provide different ways to insert a media clip between the two adjacent media clips. Some embodiments allow the user to drag a media clip from the clip browser 1245 or another media clip in the timeline 1201 into the border between the two media clips. The media-editing application of some embodiments allow to add a selected media clip from the clip browser 1245 between the two media clips as a playhead is passing close to the border between the two media clips.

Some embodiments shift the media clips (i.e., ripple the media clips in the timeline) away from a particular point along the timeline 1201 between the two media clips as a media clip is being inserted to the point. In other embodiments, the media-editing application does not ripple the media clips in the timeline when a media clip is dragged into the particular point in the timeline. These embodiments overwrite any clips or portions of clips with the clip being added for the duration of the clip being added starting at the particular point along the timeline.

As shown, the created space for the media clip 1225 is indicated by the highlighted boundary 1290 in this example. In some embodiments, the media-editing application performs this movement in an animated motion, thereby creating an animated effect of the sliding of the clips in the timeline away from the point of insertion to make room for the inserted clip(s).

In the first stage 1205, the timeline 1201 displays media clips 1230 and 1235 in the central compositing lane 1240. In the second stage 1210, the user selects (e.g., by a click operation, etc.) a media clip 1225 displayed in the clip browser 1245 to bring into the timeline 1201. In the third stage 1215, the user drag the selected media clip and hovers over the two media clips 1230 and 1235 in between of which the user wants to insert the media clip 1225. The media clip 1235 moves away from the particular point 1285 in between the two media clips 1230 and 1245 to make room for the media clip 1225.

The fourth stage 1220 illustrates the completion of the insertion of the media clip 1225 into the particular point 1285 of the timeline 1201. In some embodiments, the media-editing application snaps the media clip 1225 into the space 1290 that was created for the media clip 1280 in the third stage 1215.

B. Appending a Media Clip

Figure 13:
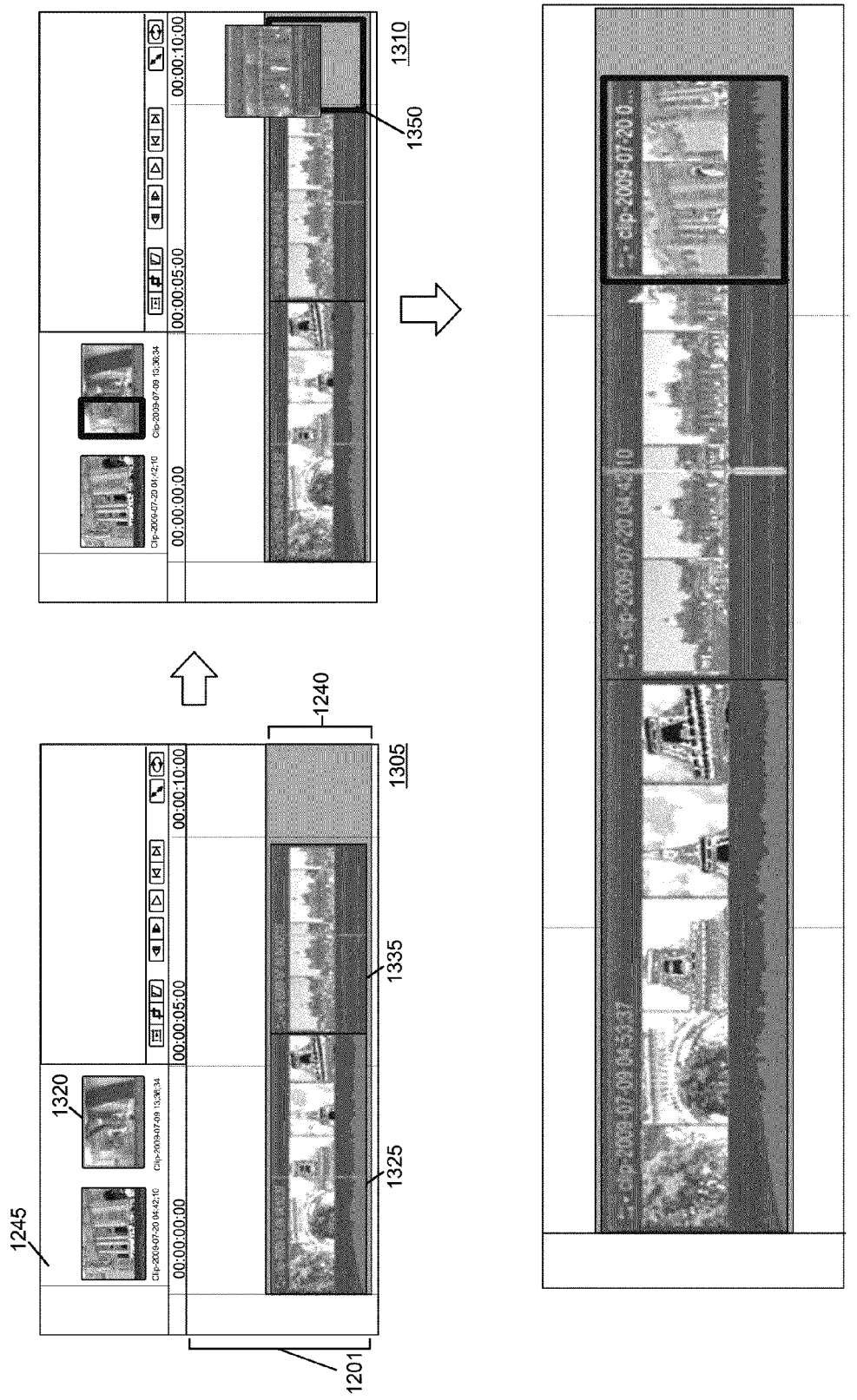
FIG. 13 illustrates an example of appending a media clip to another media clip displayed in a timeline of a media-editing application.

FIG. 13 illustrates an example of appending a media clip to another media clip displayed in the timeline 1201. Specifically, this figure illustrates the GUI 1200 in three different stages 1305-1315 to show that the media-editing application allows the user of the application to append a media clip 1320 to the end of the sequence of media clips 1325 and 1335 in the timeline 1201.

Some embodiments allow a user of the media-editing application to append a first media clip to a second media clip in the timeline 1201. The second media may be an anchored clip or a clip in the central compositing lane 1240. Different embodiments provide different ways to append a media clip after another media clip. Some embodiments allow the user to drag a media clip from the clip browser 1245 or another media clip in the timeline 1201 to a right-edge of another media clip which does not have a media clip appended to the right edge. The media-editing application of some embodiments allow to append a selected media clip from the clip browser 1245 to the right edge of another media clip as a playhead is passing close to the right edge. Yet other embodiments allow the user to append a selected media clip from the clip browser 1245 after the last media clip in the central compositing lane 1240 by invoking a hot key command.

In the first stage 1305, the timeline 1201 displays media clips 1325 and 1335 in the central compositing lane 1240. As shown, the media clip 1335 is the last media clip of the sequence of the two media clips. In the second stage 1310, the user selects a range of a media clip 1320 (e.g., selected via a cursor controller operation, selected from a keystroke, etc.) from the clip browser 1345 towards the right edge of the media clip 1335. The third stage 1315 illustrates the completion of appending the media clip 1320 to the media clip 1335. The selected range of the media clip 1320 appears at the end of the sequence in the timeline 1201. In some embodiments, the media-editing application snaps the media clip 1320 to the right edge of the media clip 1335.

C. Anchoring a Media Clip

Figure 14:
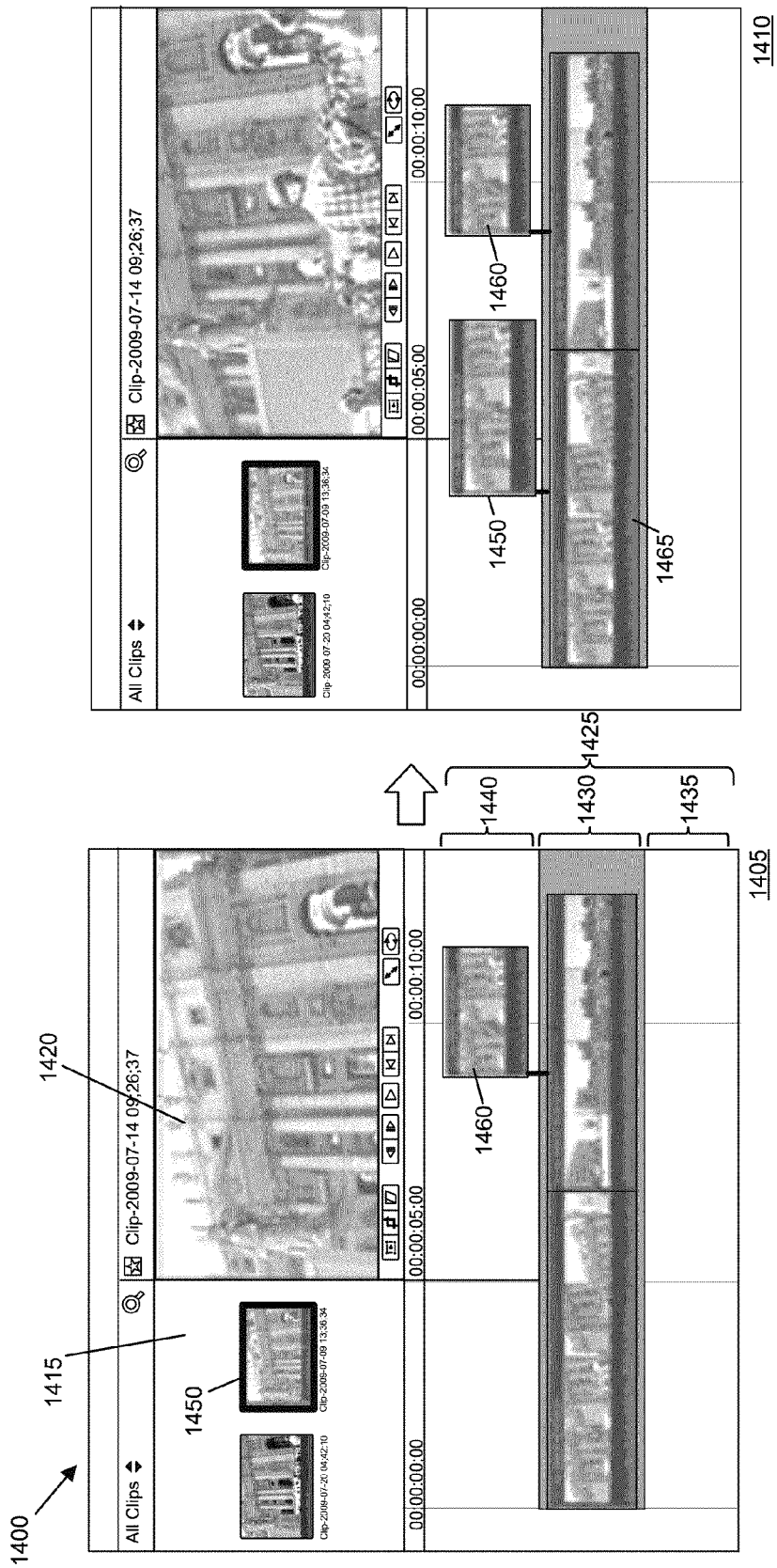
FIG. 14 illustrates an example of anchoring a media clip to another media clip displayed in a timeline of a media-editing application.

FIG. 14 illustrates an example of anchoring a media clip to another media clip displayed in a timeline of a media-editing application. Specifically, this figure illustrates a GUI 1400 in two different stages 1405 and 1410 to show the media-editing application allows a user of the application to select a media clip from a clip browser and anchor the clip to another clip in the timeline 1425. The GUI 1400 is similar to the GUI 100 described above by reference to FIG. 1 in that the GUI 1400 includes a clip browser 1415, a preview display area 1420, and a timeline 1425 which are similar to the clip browser 110, the preview display area 1410, and the timeline 115, respectively.

Some embodiments allow the user to anchor a media clip to another media clip in the timeline 1425 by selecting a single media clip or a range of media clip from the clip browser and drag it above or below a media clip in the timeline 1425. As described above, the media-editing application in some embodiments anchors a media clip only to a media clip in the central compositing lane 1430. In other embodiments, the media clip that is anchored to may be any clip displayed in any lanes in the timeline 1425. That is, the media-editing application of these embodiments allows the user to anchor a media clip to a media clip that is in the central compositing lane 1430 or to a media clip that is anchored to another media clip.

As described above, anchor lanes may be used for compositing (e.g., removing portions of one video and showing a different video in those portions), B-roll cuts (i.e., cutting away from the primary video to a different video whose clip is in the anchor lane), audio clips, or other composite presentation technique. In compositing cases, the anchored clips may overlay, be superimposed on, or be mixed with the portion of the media clip(s) in the spine, which the anchored clips span. In cases of B-roll cuts, the content of the anchored clips will be the content of the portion of the media presentation, which the anchored clips span. That is, the media clips in the spine that span the same portion of the media presentation will not be played back when the media presentation is played back.

In some embodiments, the media-editing application determines the point at which the content of the anchored media clip starts to affect the media presentation based on the position of the anchor relative to the anchored media clip and the media clip to which the anchored media clip is anchored. For instance, in cases of B-roll cuts, the content of the anchored media clip starts cut away from the media clips in the spine at the position of the anchor that connects the anchored media clip with the media clip to which the anchored media clip is anchored.

In the first stage 1405, a media clip 1450 has been selected from the clip browser 1415. The selection is received through a user selection input 1455 such as input received from a cursor controller (e.g., a mouse, touchpad, trackpad, etc.), from a touchscreen (e.g., a user touching a UI item on a touchscreen), etc.

In the second stage 1410, a user has dragged the media clip 1450 from the clip browser 1415 and dropped it (by releasing the mouse button, "tap" of a touchscreen, etc.) in the anchor lane 1440 above the central compositing lane 1430 and before the anchored media clip 1460 in the timeline 1425. The media-editing application anchors the media clip 1450 to the media clip 1465.

D. Replacing a Media Clip in Timeline

Figure 15:
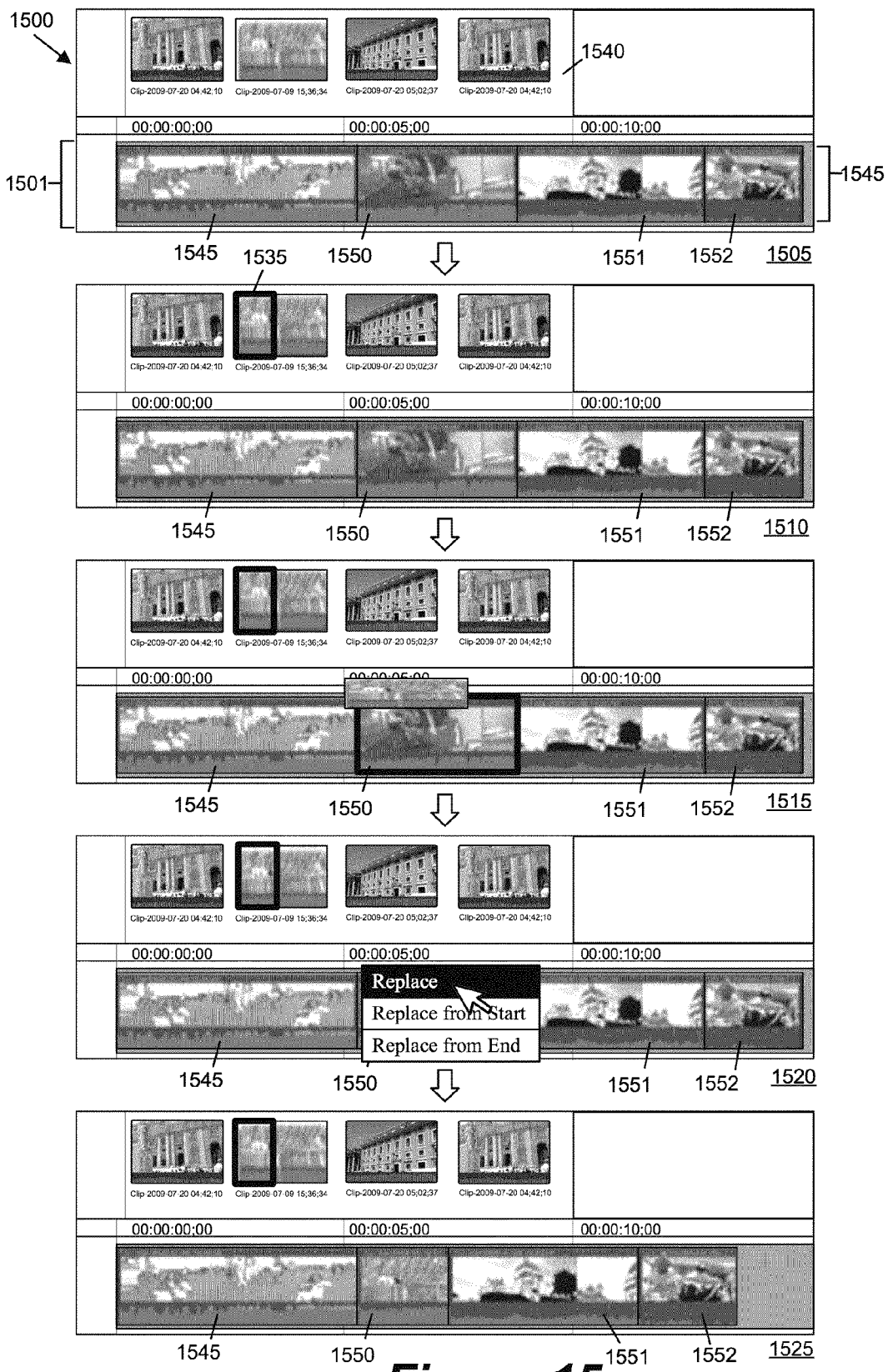
FIG. 15 illustrates an example of the replacement of a media clip in a timeline of a media-editing application with a media clip selected from a clip browser.

FIG. 15 illustrates an example of the replacement of a media clip in a timeline 1501 of a media-editing application with a media clip selected from a clip browser. Specifically, this figure illustrates a GUI 1500 in five different stages 1505-1525 to show the replacement of a media clip 1550 in the timeline 1501 with a media clip 1535 from the clip browser 1540. The GUI 1500 is similar to the GUI 100 described above by reference to FIG. 1 in that the GUI 1500 includes the clip browser 1540 and the timeline 1501 which are similar to the clip browser 110 and the timeline 115, respectively.

In some embodiments, the media-editing application allows a user of the application to replace a first media clip in the timeline 1501 with a second media clip. The media-editing application allows the user to select the second media clip from a clip browser or from among the media clips displayed in the timeline 1501.

Some embodiments replace the first media clip in the timeline 1501 with the second media clip without preserving the duration of the first media clip in the timeline 1501. That is, the media clips that came after the first media clip in the timeline 1501 will ripple to fill up the gap created by the difference between the durations of the first media clip and the second media clip when the second media clip is shorter in duration than the first media clip. Conversely, the media clips that come after the first media clip in the timeline 1501 will ripple to make room for the second media clip when the second media clip is longer in duration than the first media clip.

In the first stage 1505, the timeline 1501 displays media clips 1545, 1550, 1551, and 1552. The second stage 1510 illustrates the selection of a media clip 1535 from the clip browser 1540 (e.g., through a cursor controller operation, through a keyboard selection, through a drop-down menu, etc.). In this example, the user of the media-editing application has selected a range of the media clip 1535 as indicated by the highlighted border. For simplicity of description, the selected range of the media clip 1535 is referred to as the media clip 1535. The media-editing application of some embodiments treats this selected range as a media clip when it is brought into the timeline 1501.

The third stage 1515 illustrates a movement of the media clip 1535 from the clip browser 1540 towards the media clip 1550 in the timeline 1501. The user of the media-editing application may perform the movement by dragging (e.g., via a cursor controller operation) the selected source clip 1535 towards the media clip 1550 in the timeline 1501.

Some embodiments highlight a media clip in the timeline 1501 when a user of the media-editing application drags the source clip 1535 over the media clip in the timeline 1501. In this example, the media-editing application highlights the media clip 1550 (as indicated by the thick outline) as the media clip 1535 hovers over the media clip 1550 (e.g., via the user's cursor dragging action). In some embodiments, upon the user's releasing the source clip 1535 onto the media clip 1550 in the timeline 1501, the media-editing application identifies the media clip 1550 as the target clip (i.e., the media clip that is being replaced). In this example, the target clip is the media clip 1550.

The fourth stage 1520 illustrates the selection of a replace option from a selectable menu. The user of the media-editing application may select the replace option from a menu by rolling a cursor over the option in the menu, by a keystroke, etc. As shown, the media-editing application of some embodiments displays a pop-up menu upon the user's releasing the source clip 1535 onto the target clip 1550 in the third stage 1515. Different embodiments may display present a variety of options to the user differently. In this example, the pop-up menu presents a number of different options including a replace option.

The replace option allows the user to replace the target clip with the media clip 1535. In some embodiments, the media-editing application replaces the entire target clip with the media clip 1535. In this example, the user selects the replace option to initiate the replacement operation. The media-editing application then replaces the target clip 1550 with the media clip 1535. As shown in the fifth stage 1525, the media-editing application has replaced the target clip 1550 with the media clip 1535 and therefore the central compositing lane 1545 no longer displays the target clip 1550. Since the media clip 1535 is shorter than the target clip 1550 in duration, the central compositing lane 1545 displays the selected range as a media clip 1535 that is shorter than the previously displayed target clip 1550. This stage 1525 illustrates the completion of the replacement operation. The media clips 1551 and 1552 has pulled into the left along the timeline 1501 in order not to leave any gap that might have caused by the difference between the durations of the target clip 1550 and the media clip 1535.

Figure 16:
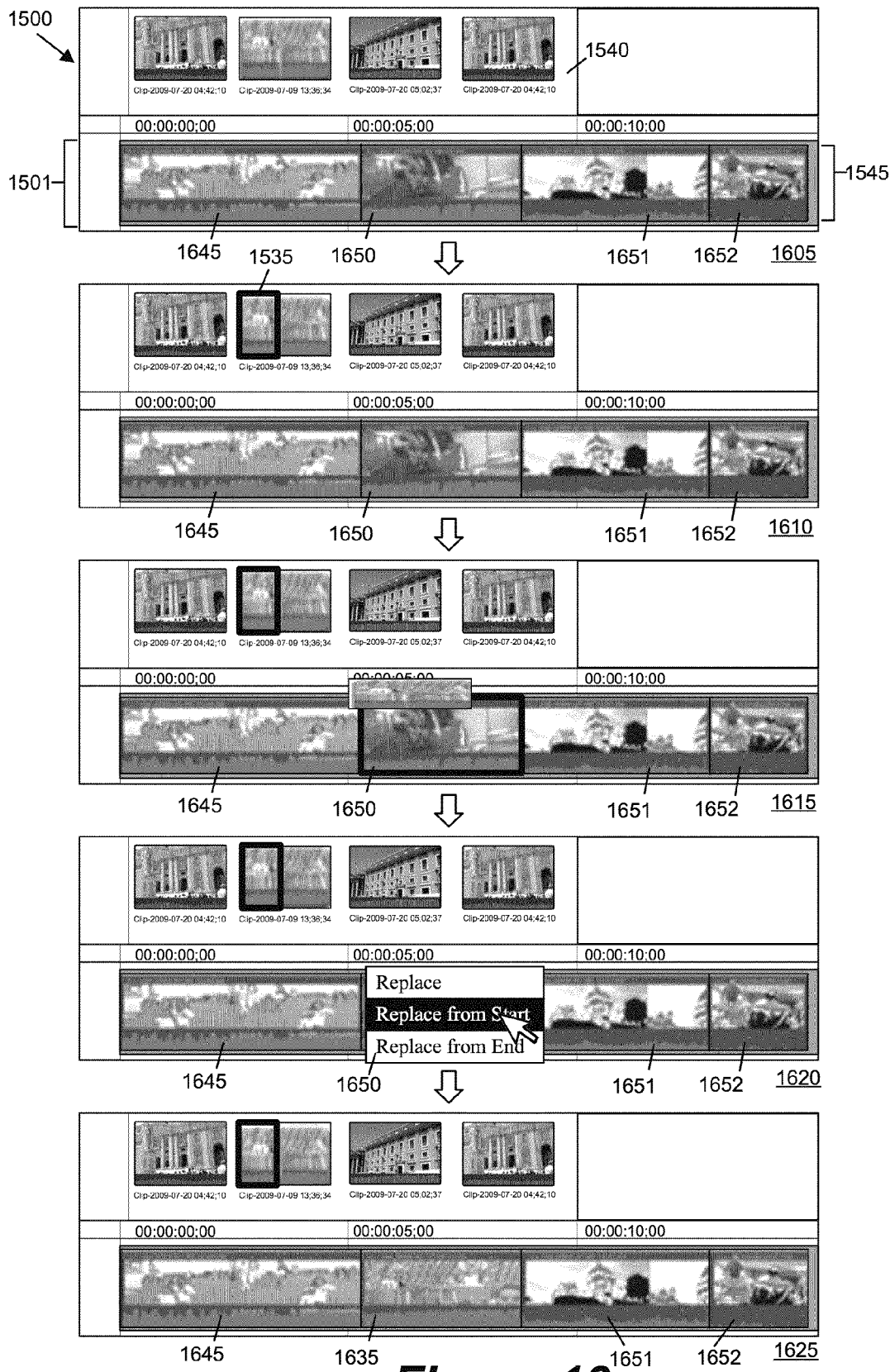
FIG. 16 illustrates another example of the replacement of a media clip in the timeline with a media clip selected from a clip browser.

FIG. 16 illustrates another example of the replacement of a media clip in the timeline 1501 with a media clip selected from a clip browser. Specifically, this figure illustrates the GUI 1500 at five different stages 1605-1625 to show replacement of a media clip 1650 in the timeline 1501 with a portion of a media clip 1635 from the clip browser 1540.

Some embodiments replace the first media clip in the timeline 1501 with the second media clip while preserving the duration of the first media clip in the timeline 1501. That is, when the second media clip is longer in duration than the first media clip, the first media clip is replaced with a range within the second media clip that has the same duration as the first media clip. In some such embodiments, the media-editing application provides options to select the range within the second media clip. For instance, one option specifies the range to start from the beginning of the second media clip. Another option specifies the range to end at the out-point of the second media clip.

When the second media clip is shorter in duration than the first media clip, some embodiments will pull in the media clips that come after the first media clip in order not to leave a gap caused by the difference in durations of the first and second media clips. Other embodiments place a position clip that has a duration that matches the difference in durations of the first media clip and the second media clip. In this manner, the media clips that come after the first media clip in the timeline 1501 do not have to lose its timing information within the timeline 1501. A position clip will be described further below.

When the second media clip is shorter in duration than the first media clip, some embodiments replace the first clip by placing the second clip at the point that the first clip starts. This will cause a gap to close or to be filled with a position clip after the second clip. Some embodiments replace the first clip by placing the second clip such that the second clip ends at the point at which the first media clip ends. This will result in a gap to close or to be filled by a position clip before the second clip.

In the first stage 1605, the timeline 1501 displays media clips 1645, 1650, 1651, and 1652. The second stage 1610 illustrates a selection of a media clip 1635 from the clip browser 1540. In this example, the user has selected the range of the media clip 1635 as indicated by the highlighted box in the media clip 1635. For simplicity of description, the selected range of the media clip 1635 is referred to as the media clip 1635.

Similar to the third stage 1515 described above in FIG. 15, the third stage 1615 illustrates a movement of the selected media clip 1635 from the clip browser 1540 towards the media clip 1650 in the timeline 1501. In this example, the user moves the selected media clip 1635 by dragging (e.g., via a cursor controller operation) it in the direction of the media clip 1650 in the timeline 1501.

Some embodiments highlight the media clip in the timeline 1501 when the user of the media-editing application drags the media clip 1635 over the media clip in the timeline 1501. In this example, the media-editing application highlights the media clip 1650 (as indicated by the thick outline) as the media clip 1635 hovers over the media clip 1650 (e.g., through a cursor controller operation). In some embodiments, the user identifies a target clip (i.e., the media clip that is being replaced) in the timeline 1501 by releasing the media clip 1635 onto the media clip 1650 in the timeline 1501. In this example, the user has selected the media clip 1650 as a target clip.

The fourth stage 1620 illustrates the selection of a replacement option (e.g., replace option, replace from start option, replace from end option, etc.) from a selectable menu. The user may select the replacement option from a menu by rolling a cursor over the option in the menu, by a keystroke, etc. As shown, the media-editing application of some embodiments displays a pop-up menu upon the user's releasing the selected range onto the target clip 1650 in the third stage 1615. In this example, the pop-up menu presents a number of different options including a replace from start option and a replace from end option. Different embodiments may display present a variety of options to the user differently.

In this example, the user of the media-editing application selects the replace from start option. The replace from start option allows the user to replace the target clip with a range of a selected media clip that has the same duration as the target clip. The range of the selected media clip is measured from the beginning of the selected media clip in some embodiments.

In this example, the media clip 1635 is longer than the target clip 1650 in duration. Therefore, the media-editing application selects a range of the media clip 1635 that has the same length as the target clip 1650 from the start of the media clip 1635 (e.g., the first 10 seconds of the source clip that is 30 seconds long if the target clip is only 10 seconds long).

The user of the media-editing application may select the replace from end option, which allows the user to replace the target clip with a range of the media clip 1635 that has the same duration as the target clip 1650 but is a range that ends at the out-point of the media clip 1635. For example, when the media clip 1635 is longer than the target clip, the media-editing application selects the portion of the source clip that has the same length as the target clip from the end of the source clip (e.g., the last 10 seconds of the source clip that is 30 seconds long if the target clip is only 10 seconds long).

The fifth stage 1625 illustrates that the replace from start operation 1665 is complete. As shown in the fifth stage 1625, the media-editing application has replaced the target clip 1650 with the initial range of the media clip 1635 that matches the duration of the target clip. As such, the total duration of the sequence of the media clips in the timeline 1501 has not changed after the performance of the replace from start operation. That is, the media clips 1651 and 1652 did not move with respect to the media clip 1645, which is the first media clip of the sequence. The central compositing lane 1645 now displays the portion the source clip 1635 (taken from the start of the source clip) in place of the target clip 1650.

Figure 17:
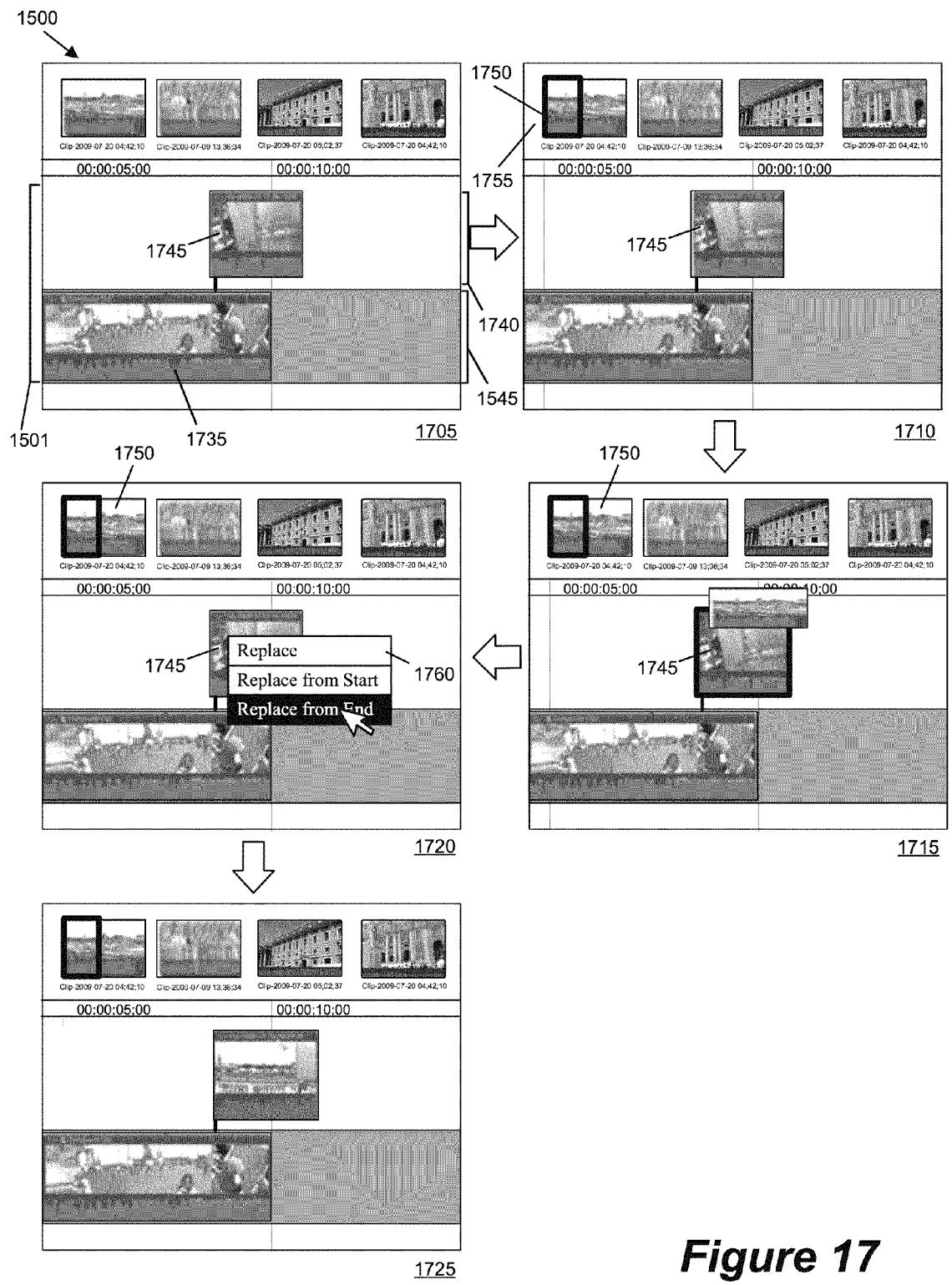
FIG. 17 illustrates an example of the replacement of an anchored clip in the timeline with another media clip.

FIG. 17 illustrates an example of the replacement of an anchored clip in the timeline 1501 with another media clip. Specifically, this figure illustrates the GUI 1501 in five different stages 1705-1725 to show the replacement of an anchored clip with another media clip.

The first stage 1705 shows the timeline 1501 before the replacement of a media clip in an anchor lane. As shown, the timeline 1501 displays a media clip 1735 and a media clip 1745. The media clip 1735 is anchored to the media clip 1745. The second stage 1710 illustrates the selection of a media clip 1750 from the clip browser 1755 (e.g., through a cursor controller operation, through a keyboard selection, through a drop-down menu, etc.). In this example, the user of the media-editing application has selected a range of a media clip 1750 as indicated by the highlighted border. For simplicity of description, the selected range of the media clip 1750 is referred to as the media clip 1750.

The third stage 1715 illustrates a movement of the media clip 1750 from the clip browser 1755 towards the anchored clip 1745 in the anchor lane 1740. The user of the media-editing application may perform the movement by dragging (e.g., via a cursor controller operation) the selected source clip 1750 towards the anchored clip 1745 in the anchor lane 1740.

In some embodiments, the media-editing application highlights the anchored clip (e.g., by outlining the border) in the anchor lane when the user of the media-editing application drags the source clip over the anchored clip. As shown, the media-editing application highlights the anchored clip 1745 (as indicated by the thick outline) as the media clip 1750 hovers over the anchored clip 1745 (e.g., via the user's cursor dragging action). In some embodiments, upon the user's releasing the media clip 1750 onto the anchored clip 1745 displayed in the anchor lane 1740, the media-editing application identifies the anchored clip 1745 as the target clip (i.e., the media clip that is being replaced). In this example, the target clip is the anchored clip 1745.

The fourth stage 1720 illustrates the selection of a replace option from a selectable menu. The user may select the replace option from a menu by rolling a cursor over the option in the menu, by a keystroke, etc. As shown, the media-editing application of some embodiments displays a pop-up menu 1760 upon the user's releasing the source clip 1750 onto the target clip 1745 in the third stage 1715. Different embodiments may display a set of options to the user differently. In this example, the pop-up menu presents a replace option, a replace from start option, a replace from end option among other options. These replace options allow the user to replace the target clip with another clip in different ways as described above.

In the fifth stage 1725, the media-editing application replaced the target clip 1745 with the media clip 1750. Therefore, the timeline 1501 no longer displays the target clip 1745. Since the selected source clip 1750 is longer than the target clip 1745 in duration, the anchor lane 1740 now displays a media clip 1750 that is longer than the previously displayed target clip 1745.

Figure 18:
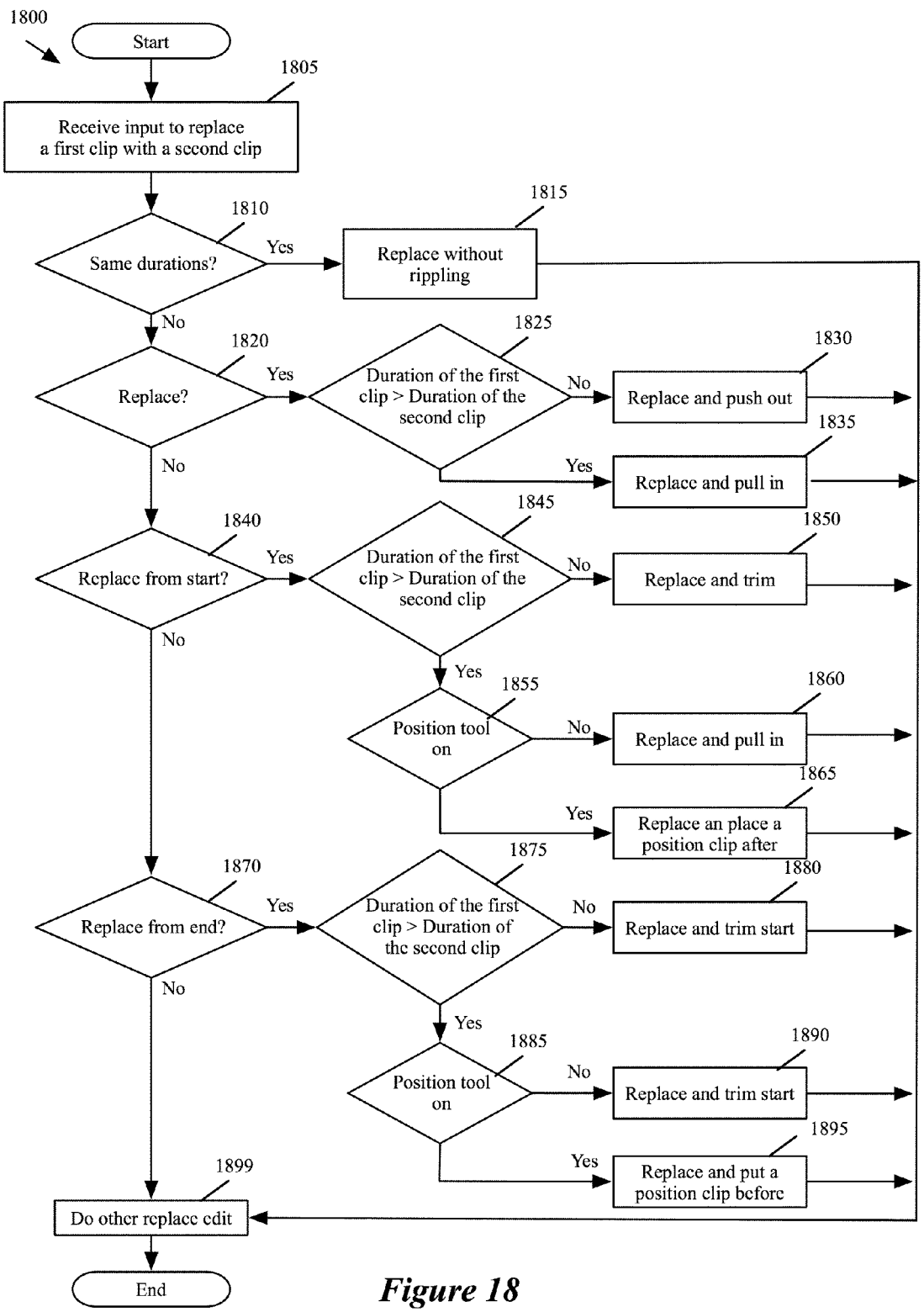
FIG. 18 conceptually illustrates a process of some embodiments for replacing a media clip in a timeline of a media-editing application with another media clip.

FIG. 18 conceptually illustrates a process 1800 of some embodiments for replacing a media clip in a timeline of a media-editing application with another media clip. The process 1800 begins by receiving (at 1805) an input to replace a first media clip with a second media clip. This input may be received from a selection of a drop-down menu in some embodiments. The selection input may be from a cursor controller (e.g., a click input), through a touchscreen (e.g., touching a menu option), from a keyboard, etc. Some embodiments receive the input from a pop-up menu that appears automatically when a media clip or an effect is dragged and dropped (e.g., with a cursor controller, through a touchscreen, etc.) onto another media clip, as shown in FIGS. 15-17.

The process then determines (at 1810) whether the first media clip and the second media clip have the same durations. In some embodiments, the process finds out the duration of each clip by looking at the metadata included in the data structure for a media clip. The metadata may include information regarding the media clip, including the duration. As described above, the length of a media clip's representation in the timeline in some embodiments corresponds to the duration of the media clip. Thus, when the first and second media clips have the same duration, the clip representations of the first and media clips will have the same length in the timeline.

When the process determines (at 1810) that the first and second media clips have the same duration, the process replaces (at 1815) the first media clip with the second media clip without rippling any downstream media clips (e.g., any contiguous media clips that were adjacent to the first media clip in the same lane). As described above, rippling is pushing out the downstream media clips of a media clip when the media clip's duration is extended. Rippling can also mean pulling in the downstream media clips of a media clip when the media clip's duration is shortened in order to close out a gap resulted from shortening the media clip in some embodiments. When the first and the second media clips have the same duration, rippling is unnecessary because there is no gap to close out nor is there a need for pushing out the downstream media clips.

When the process determines (at 1810) that the first and second media clips have different durations, the process then determines (at 1820) whether the received input is a request for a plain replace. In some embodiments, a plain replace is replacing the first media clip with the second media clip regardless of the second media clip's duration.

When the process determines (at 1820) that the received input is a request for a plain replace, the process then determines (at 1825) whether the first media clip's duration is longer than the second media clip's. When the process determines (at 1825) the first media clip's duration is not longer than the second media clip's duration, the process replaces (at 1830) the first media clip with the second media clip and ripples (i.e., pushes out) any downstream media clips of the first media clip. Rippling is necessary in this case because the second media clip would occupy a longer length along the timeline than the first media clip did.

When the process determines (at 1825) that the first media clip's duration is longer than the second media clip's, the process replaces (at 1835) the first media clip with the second media clip and ripples (i.e., pulls in) any downstream media clips of the first media clip. Rippling is necessary in this case because the second media clip would occupy a shorter length along the timeline than the first media clip did, causing a gap to be closed out between the second media clip and the first media clip of the downstream media clips.

When the process determines (at 1820) that the received input is not a request for a plain replace, the process then determines (at 1840) whether the received input is a request for a replace from start. A replace from start is replacing the first media clip with the start of the second media clip. The process will not ripple the downstream media clips when it performs a replace from start, unless the second media clip's duration is shorter than the first media clip's in some embodiments. That is, the second media clip will not occupy a longer duration in the timeline than the first media clip did.

When the process determines (at 1840) that the received input is a request for a replace from start, process 1800 determines (at 1845) whether the first media clip's duration is longer than the second media clip's. When the process determines (at 1845) that the first media clip's duration is not longer than the second media clip's, the process replaces (at 1850) the first media clip with the second media clip and trims the end of the second media clip. Trimming the second media clip is necessary in this case in order to avoid rippling (i.e., pushing out) the downstream media clips. The duration by which to trim the end of the second media clip is the difference between the durations of the first and second media clips.

When the process determines (at 1845) that the first media clip's duration is longer than the second media clip's, the process determines (at 1855) whether the position tool (also called as a position clip tool) is activated. The process determines that the position tool is activated when the process has received an input to activate a position tool. Such input may be received through a drop-down menu as will be shown in FIG. 19. The position tool allows creating a position clip to fill any gap so as to prevent rippling or to serve as a placeholder. More details about the position tool and position clips will be further described further below.

When the process determines (at 1855) that the position tool is not activated, the process replaces (at 1860) the first media clip with the start of the second media clip and ripples any downstream media clips of the first media clip. Rippling is necessary in this case because the second media clip would occupy a shorter length along the timeline than the first media clip did, causing a gap to be closed out between the second media clip and the first media clip of the downstream media clips.

When the process determines (at 1855) that the position tool is activated, the process replaces (at 1865) the first media clip with the start of the second media clip and places a position clip after the second media clip. The duration of the position clip will be the difference between the durations of the first and second clips. In this manner, the process avoids rippling the downstream media clips of the first media clip.

When the process determines (at 1840) that the received input is not a request for a replace from start, the process then determines (at 1870) whether the received input is a request for a replace from end. A replace from end is replacing the first media clip with the end of the second media clip. The process will not ripple the downstream media clips when it performs a replace from end, unless the second media clip's duration is shorter than the first media clip's in some embodiments. That is, the second media clip will not occupy a longer duration in the timeline than the first media clip did.

When the process determines (at 1870) that the received input is a request for a replace from end, the process determines (at 1875) whether the first media clip's duration is longer than the second media clip's. When the process determines (at 1875) that the first media clip's duration is not longer than the second media clip's, the process replaces (at 1880) the first media clip with the second media clip and trims the start of the second media clip. Trimming the second media clip is necessary in this case in order to avoid rippling the downstream media clips. The duration by which to trim the start of the second media clip is the difference between the durations of the first and second media clips.

When the process determines (at 1875) that the first media clip's duration is longer than the second media clip's, the process determines (at 1885) whether the position tool is activated. When the process determines (at 1885) that the position tool is not activated, the process replaces (at 1890) the first media clip with the end of the second media clip and ripples any downstream media clips of the first media clip. Rippling is necessary in this case because the second media clip would occupy a shorter length along the timeline than the first media clip did, causing a gap to be closed out before the end of the second media clip and after any media clip that was before the first media clip along the timeline.

When the process determines (at 1885) that the position tool is activated, the process replaces (at 1895) the first media clip with the end of the second media clip and places a position clip before the second media clip. The duration of the position clip will be the difference between the durations of the first and second clip. In this manner, the process avoids rippling the downstream media clips of the first media clip. When the process determines (at 1870) that the received input is not a replace from start, the process performs (at 1899) other replace edit such as a replace with a position clip, etc. based on the received input. Process 1800 then ends.

One of ordinary skill in the art will recognize that process 1800 is a conceptual representation of the operations used to replace a media clip with another media clip in a timeline of a media-editing application. The specific operations of process 1800 may not be performed in the exact order shown and described. The specific operations may not be performed in one continuous series of operations, and different specific operations may be performed in different embodiments. Furthermore, the process could be implemented using several sub-processes, or as part of a larger macro process. For instance, the operations the process 1800 performs are described in the context of replacing one media clip with another media clip. However, the process may perform these operations for other combinations of media clips. For example, the second media clip that replaces the first media clip could be a selected range over one or media clips.

E. Position Clip

Figure 19:
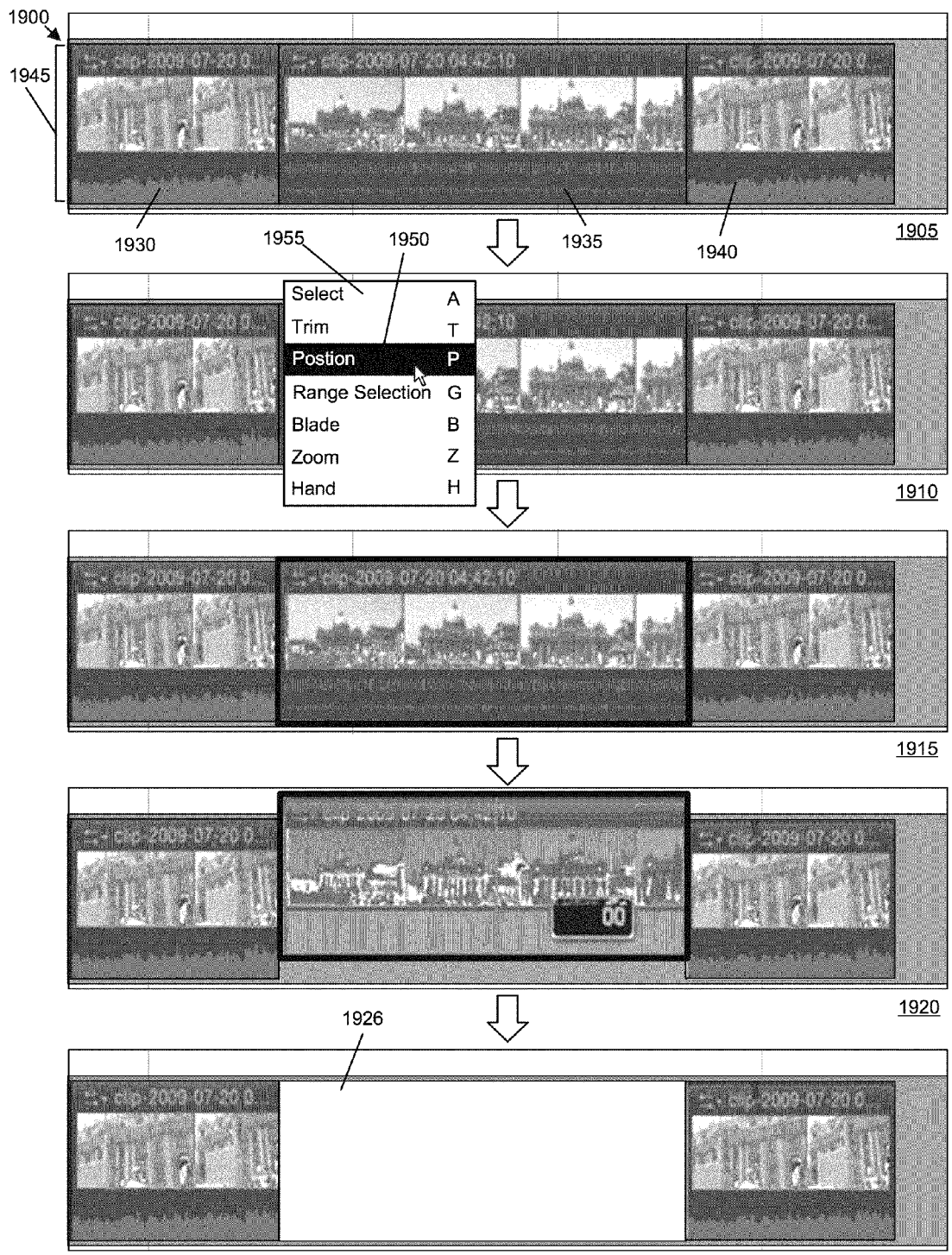
FIG. 19 illustrates an example of the creation of a position clip within a central compositing lane of a timeline.

FIG. 19 illustrates an example of the creation of a position clip within a central compositing lane of a timeline 1900. Specifically, this figure illustrates the creation of a position clip between two media clips in the timeline by reference to five different stages 1905-1925. The timeline 1900 is similar to the timeline 115 described above by reference to FIG. 1.

The media-editing application of some embodiments allows a user of the application to create a position clip within a timeline using a position clip tool. A position clip is a clip that does not contain media content but has duration. As such, a position clip can serve as a placeholder between media clips in the timeline 1900 in some embodiments. The media-editing application allows the user to manipulate a position clip just like any media clip. For instance, the media-editing application allows the user to replace, append, or anchor a position clip. Also, the media-editing application allows the user to trim or extend the audio clip.

The first stage 1905 shows the timeline 1900 before the user of the media-editing application creates a position clip within the timeline 1900 using a position clip tool. The timeline 1900 displays the media clips 1930-1940 in the central compositing lane 1945. The second stage 1910 illustrates the initiation of a position clip creation operation through the selection of a selectable item (e.g., a position clip tool). As shown in this example, the user of the media-editing application selects selectable item 1950 (i.e., the position clip tool option 1950) from a drop-down menu 1955.

The third stage 1915 illustrates the selection of the media clip within the timeline 1900 that has a location within the timeline 1900 where the user wants to create a position clip. Here, the user wants to create a position clip at the portion of the timeline 1900 where the media clip 1935 is occupying. A user of the media-editing application may select the media clip 1935 through a cursor controller operation, a keystroke, etc.

The fourth stage 1920 illustrates the movement of the media clip 1935 towards another location in the timeline 1900. As shown in this example, the user has started to drag (e.g., via a select-and-hold cursor controller operation) the media clip 1935 away from its location within the timeline 1900. This example illustrates that an outline around the media clip's 1935 original location in the timeline 1900 appears as the media clip 1935 moves away from its location. This outline indicates that a position clip is being created at the media clip's 1935 original location in the timeline 1900.

In the fifth stage 1925, the media clip 1935 is moved to another position (not shown in this figure) in the timeline 1900. The media-editing application has created a position clip 1926 that occupies a horizontal range of the central compositing lane 1945.

In the example above, the media-editing application creates a single position clip in the central compositing lane. Some embodiments create more than one position clip in the timeline 1900 at the same time when multiple media clips at different locations in the timeline 1900 are removed from their respective locations.

Figure 20:
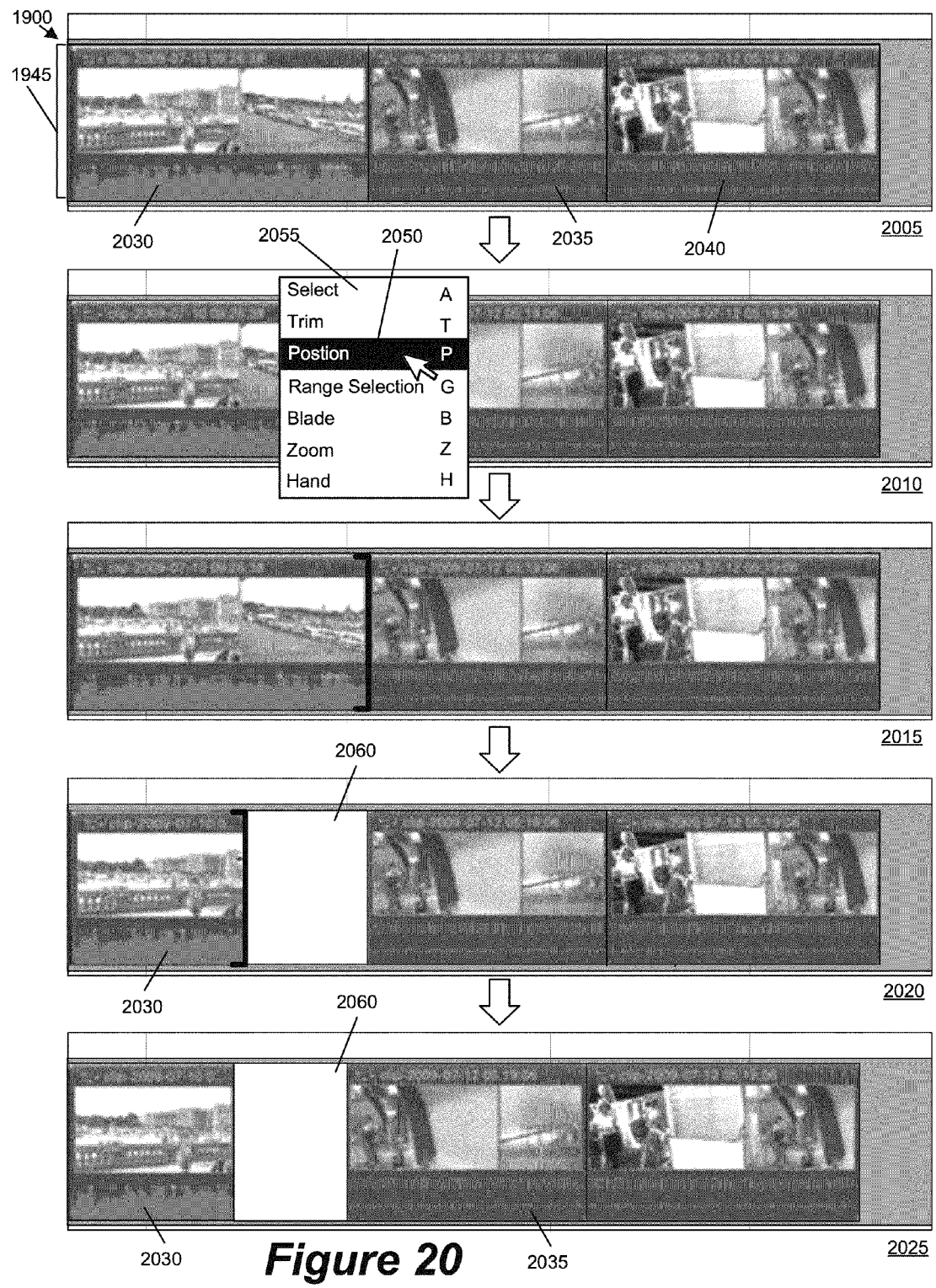
FIG. 20 illustrates another example of the creation of a position clip.

FIG. 20 illustrates another example of the creation of a position clip. Specifically, this figure illustrates the timeline 1900 in five different stages 2005-2025 to show the creation of a position clip (e.g., using a position clip tool) as the media-editing application trims a media clip in the timeline 1900.

The media-editing application of some embodiments allows a user to create a position clip (e.g., using a position clip tool) when a trimming operation is performed on a media clip in the timeline 1900. When the media-editing application trims a media clip within the timeline 1900, the application creates a position clip that has the same duration as the duration that is trimmed from the media clip. This allows the user to retain the same total duration of the composite presentation specified in the timeline 1900.

The first stage 2005 shows the timeline 2000 before the media-editing application creates a position clip (e.g., using the position clip tool) in the timeline 2000 while performing a trimming operation. As shown, the central compositing lane 1945 of the timeline 2000 displays a composite presentation of media clips 2030-2040.

The second stage 2010 illustrates the selection of a position clip tool. In this example, the user selects a selectable item 2050 from a pull-down menu 2055 to activate the position clip tool. The user of the media-editing application may perform the selection through a cursor controller operation, through a keystroke, etc. By activating the position clip tool, the user may create a position clip when he trims a media clip in the timeline in some embodiments.

The third stage 2015 illustrates the selection of an edge of a media clip in the timeline 2000. In some embodiments, the user selects an edge of a media clip to make adjustments (e.g., trim, extend, etc.) to the media clip. The user may perform the selection through a cursor click, a keyboard operation, numerical entry selection, etc.

The fourth stage 2020 illustrates the movement of the selected edge of the media clip and the creation of the position clip. As described above, the media clips in the timeline ripple as the user performs a trim operation. The media-editing application trim the media clip as the user of the media-editing application moves the selected edge towards the center of the media clip. At the same time, the media-editing application creates and displays a position clip 2060 so as not to leave any gap or prevent the media clip 2040 from rippling (i.e., moving together with the right edge of the media clip 2030.

The fifth stage 2025 illustrates that the media-editing application has completed the trimming operation and the creation of the position clip. As shown, the central compositing lane 1945 now displays the created position clip 2060 in between the media clips 2030 and 2035.

The two examples above illustrate creation of a position clip in the central compositing lane. However, the media-editing application allows the user to create a position clip in any anchor lane for any anchored clips as well.

F. Editing an Anchored Media Clip

Figure 21:
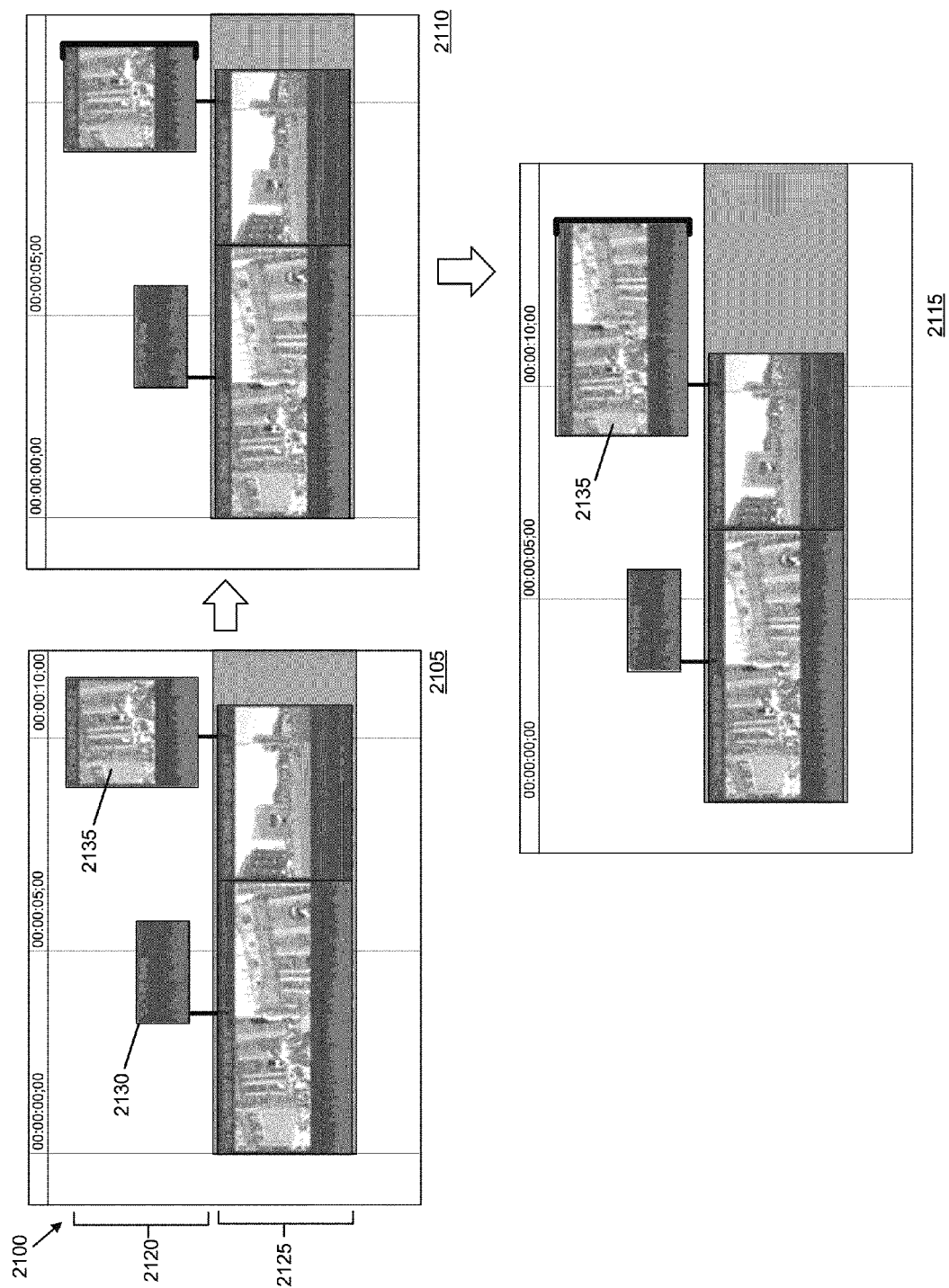
FIG. 21 illustrates an example of trimming an anchored clip in a timeline of a media-editing application.

FIG. 21 illustrates an example of trimming an anchored clip in a timeline 2100 of a media-editing application. Specifically, this figure illustrates the timeline 2100 in three different stages 2105, 2110, and 2115 to show trimming an anchored clip 2135 by pulling in the out-point of the anchored clip 2135. The timeline 2100 is similar to the timeline 115 described above by reference to FIG. 1.

Some embodiments allow the user of the application to trim a media clip in the timeline 2100. The media-editing application of these embodiments allows the user to trim any media clip in any lanes of the timeline 2100. That is, an anchored clip as well as a media clip in the central compositing lane 2125 can be trimmed by the media-editing application. Different embodiments provide different ways of trimming a media clip from either end of the media clip. For instance, the media-editing application allows the user to drag either side edge of a media clip to pull in or push out the in- or out-point of the media clip.

In some embodiments, the media-editing application allows for sample accurate editing on anchored clips that are audio-only clips. That is, an audio-only clip in an anchor lane can be edited in single-sample precision. The media editing application in these embodiments allows for trimming or extending the audio-only clip in number of audio samples (e.g., trim the end of the clip by 100 audio samples of audio content sampled at 44.1 kilohertz). The media-editing application allows for sample accurate editing for a connected storyline (also referred to as a secondary compositing lane) and a compound clip when the connected storyline and the compound clip are anchored to media clips in the spine. Connected storylines and compound clips are described in detail further below.

In the first stage 2105, the timeline 2100 displays several media clips including a media clip 2135. As shown, the media clip 2135 is anchored to another media clip in the central compositing lane 2125. In the second stage 2110, the user has selected the right edge of the anchored media clip 2135 in the anchor lane 2120 by using a cursor (e.g., by clicking a mouse button, tapping a touchpad, or touching a touchscreen). The selection is illustrated in some embodiments by a bolding of the right border of the anchored media clip 2135. In this example, the user selects the anchored media clip 2135 that the user wishes to expand.

The third stage 2115 illustrates that the user has dragged the right edge of the anchored media clips 2135 to the right and released it (by releasing the mouse button, "tap" of a touchscreen, etc.).

G. Slipping a Media Clip

Figure 22:
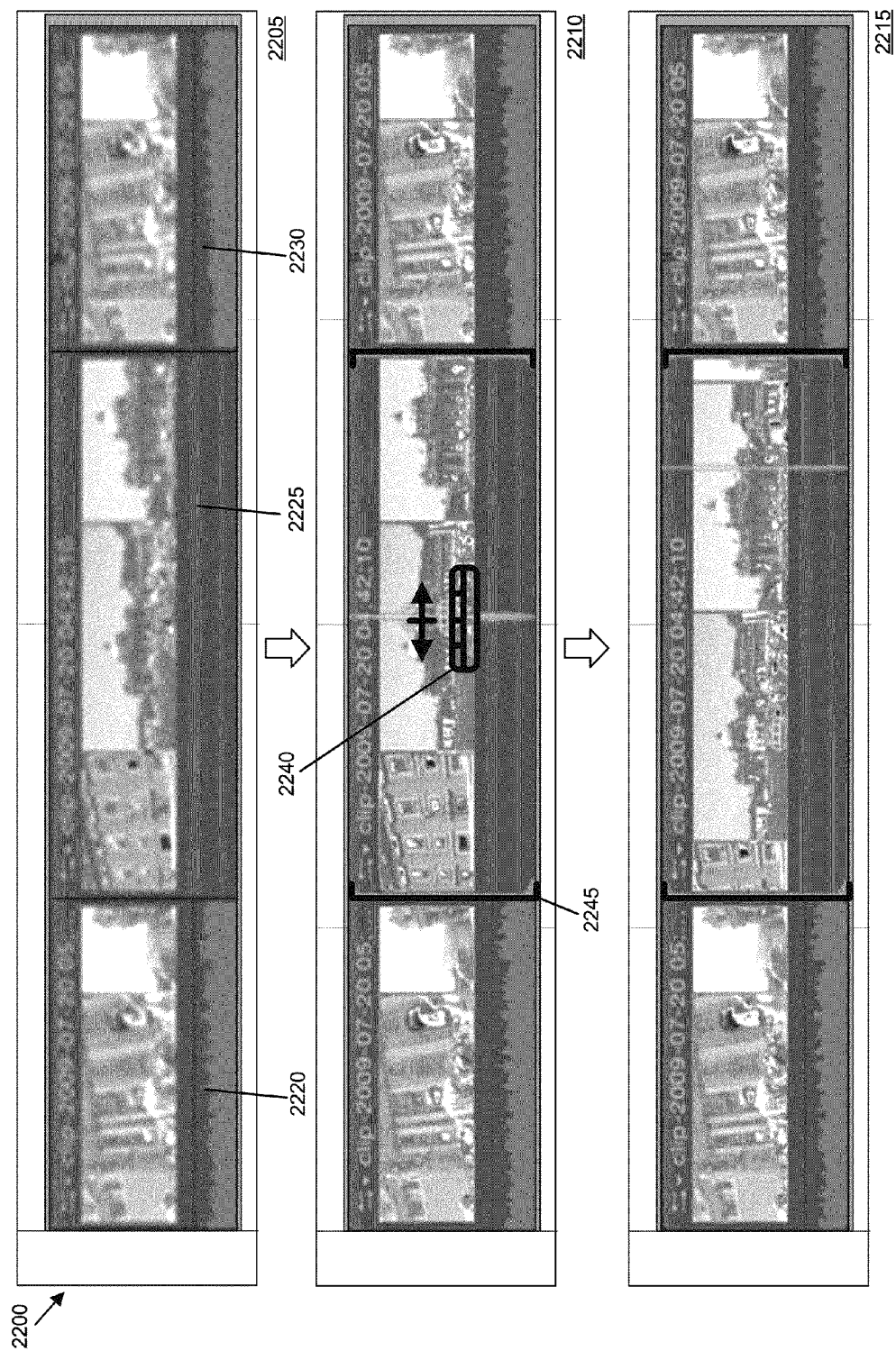
FIG. 22 illustrates an example of a slip operation performed on a media clip in a timeline of a media-editing application.

FIG. 22 illustrates an example of a slip operation performed on a media clip in a timeline 2200 of a media-editing application. Specifically, this figure illustrates the timeline 2200 in three different stages 2205-2215 to show the trimming and extending of the frames within a media clip 2225 by scrolling thumbnails inside the media clip 2225. The timeline 2200 is similar to the timeline 115 described above by reference to FIG. 1.

In some embodiments, the media-editing application allows a user of the application to trim frames off one end of a media clip while extending the same number of frames on the other end of the media clip. In this manner, some embodiments retain the media clip's duration and position within the timeline 2200 while the frames of the media clip are trimmed off one end and extended on the other end of the clip.

As mentioned above, each of media clips in some embodiments has a source media clip from which the media clip is taken. The source media clip may include additional media content (e.g., frames) before an in-point and after an out-point of a media clip. The media-editing application of some embodiments allows the user to change both in- and out-points of a media clip at the same by moving both in- and out-points by the same number of frames in one direction along the source media clip. Such change of both in- and out-points is referred to as a slip edit or a slip operation. Some embodiments allow the user to perform slip edit on a media clip displayed in the timeline 2200.

The first stage 2205 shows the timeline 2200 before the user performs the slip operation on the media clip 2225. As shown, the timeline 2200 displays the three clips 2220-2230 in the central compositing lane 2235. The second stage 2210 illustrates the initiation of the slip operation on the media clip 2225 in the timeline 2200. The user of the media-editing application may initiate the slip operation by making a selection from a pull-down menu, by performing a keystroke, by performing a cursor controller operation (e.g., through a click operation), by selecting an item on the screen, etc. In some embodiments, the appearance of the slip symbol 2240 indicates the initiation of the slip operation. Some embodiments indicate the initiation of the slip operation by displaying the slip symbol, the playhead in the same location as the slip symbol, and the highlighted brackets around the media clip.

The third stage 2215 illustrates frames trimmed off one edge of the media clip and extended on the other edge as the user of the media-editing application scrolls the thumbnails by dragging the slip symbol 2240. As shown, the middle thumbnail has moved slightly to the left to show that the in-point of the media clip 2225 is pulled in while the out-point of the clip is pushed out. The third thumbnail is showing a full frame to indicate that more frames are added to the end of the media clip 2225.

In some embodiments, the user of the media-editing application may move the slip symbol 2240 to the left to trim frames off the left edge of the media clip while extending frames on the right edge of the media clip. The user may determine the number of frames to trim/extend for one media clip by sliding the slip symbol to the left and/or right, by inputting a numerical value (e.g., +5 or −5), by keystroke, by selecting selectable items on the screen, etc.

H. Anchor Position

As described above, the media content of an anchored media clip in some cases is composited with (e.g., overlay, superimpose, mix, etc.) with the content of the media clip that the anchored media clip is anchored to. The content of the anchored clip that is composited starts at the position of the anchor. Some embodiments place an anchor at the beginning (i.e., the in-point) of the anchored clip. Some such embodiments allow the user of a media-editing application to change the anchor's position with respect to the anchored clip that it is attached to.

Figure 23:
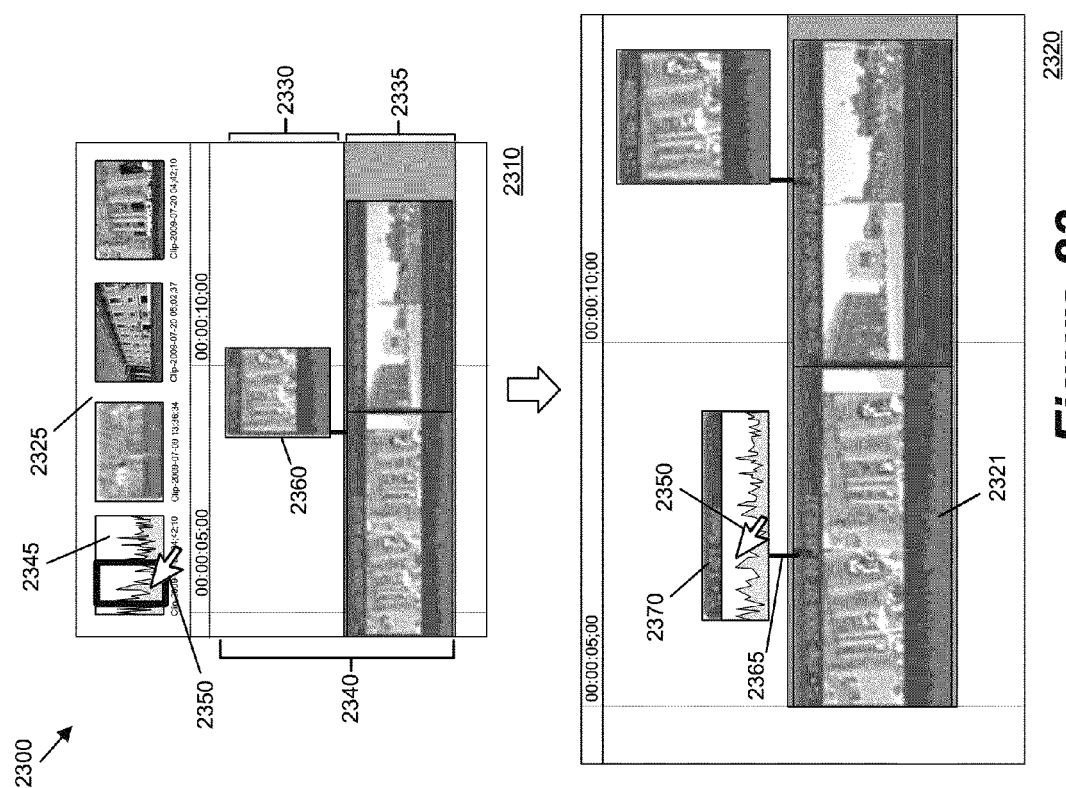
FIG. 23 illustrates an example of adding a portion of a media clip from a clip browser to a timeline of a media-editing application.

FIG. 23 illustrates an example of adding a portion of a media clip from a clip browser to a timeline of a media-editing application. Specifically, this figure illustrates a GUI 2300 in two different stages 2310 and 2320 to show that the cursor position along the length of a media clip selected from a clip browser 2325 becomes the position of anchor of the media clip when the media clip is brought into a timeline 2300 and anchored to a media clip. The GUI 2300 is similar to the GUI 100 described above by reference to FIG. 1.

As described above, the media-editing application of some embodiments allows a user of the application to select a media clip or a range within a media clip from a clip browser and anchor the selected media clip or the range to another media clip displayed in a timeline. In some embodiments, the media-editing application attaches an anchor to the beginning (i.e., the in-point) of the media clip when the media clip is anchored to another media clip in the timeline 2300. In some such embodiments, the media-editing application also allows the user to attach an anchor to a media clip other than to the beginning of the media clip when the media clip is anchored to another media clip in the timeline 2300. For instance, the media-editing application allows the user to select and drag a media clip by placing a cursor on the media clip. The position of the cursor along the length of the media clip becomes the position of the anchor of the media clip when the media clip is anchored to another media clip.

The operation of the GUI 2300 will now be described by reference to the two stages 2310 and 2320 that are illustrated in FIG. 23. In the first stage 2310, the user selects a range of the audio clip 2345 from the clip browser 2325. The selection is illustrated by a bolding of the border of that particular range of the media clip 2345. The user selects the particular range of the media clip 2345 as the range of the media clip that the user wishes to move to the anchor lane as an anchored media clip. The user places a cursor 2350 to a particular position along the length of the range.

At stage 2320, the user has dragged the media clip 2345 from the clip browser 2325 and dropped it (e.g., by releasing the mouse button, by tapping a touchscreen, etc.) in the anchor lane 2340 above the central compositing lane 2335 and before the anchored media clip 2360 in the timeline 2330. As the selected range is brought into the timeline, its length scales appropriately depending on the zoom level of the timeline. The media-editing application keeps the cursor's relative position within the range along the scaled length. As the selected range is anchored to the media clip 2321 as a media clip 2322, the media-editing application adds the anchor 2365 to the media clip 2322 at the position along the length of the media clip 2322 where the cursor 2350 is positioned.

Figure 24:
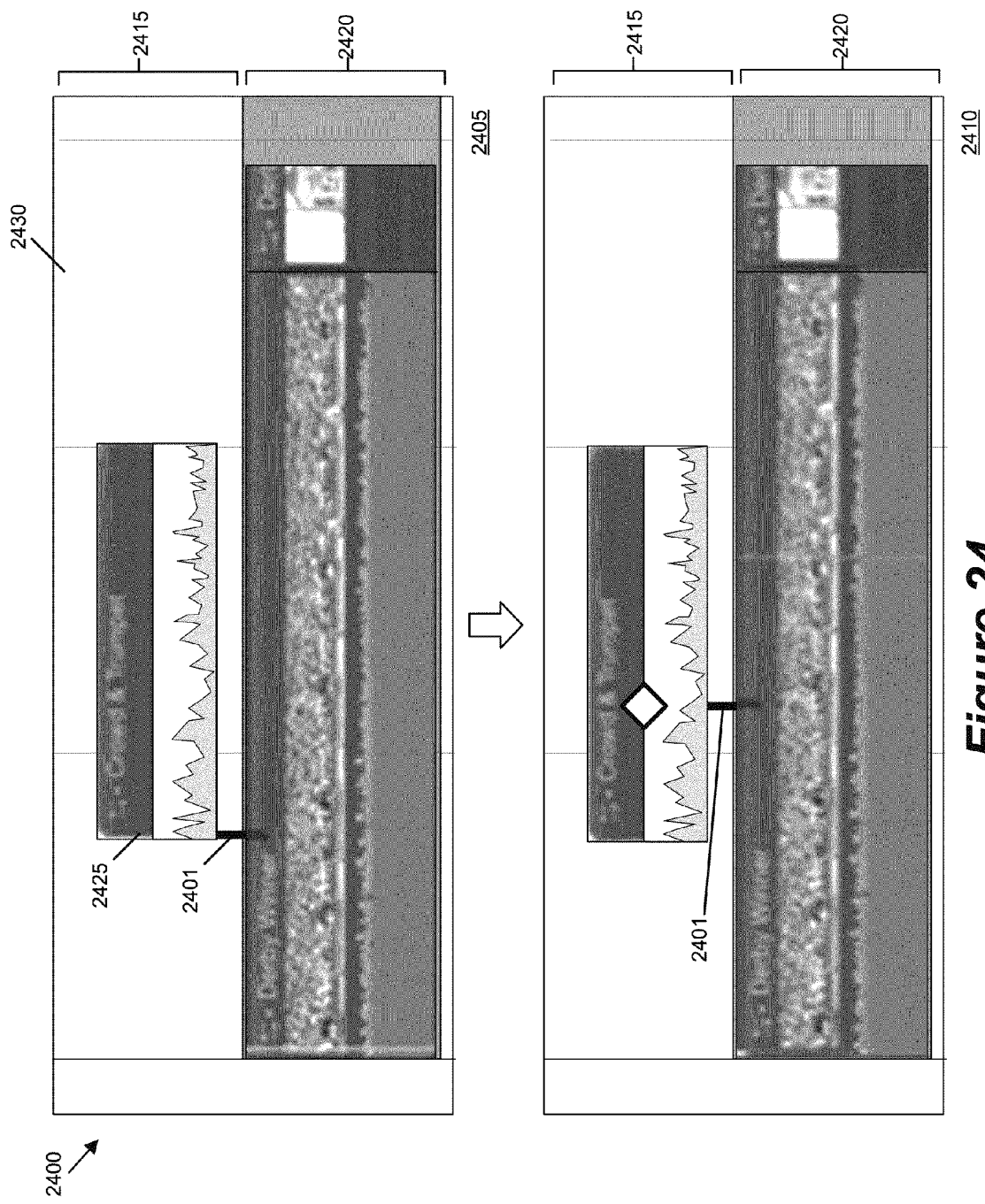
FIG. 24 illustrates an example of moving the anchor with respect to the anchored clip that it is attached to in a timeline of a media-editing application.

FIG. 24 illustrates an example of moving the anchor with respect to the anchored clip that it is attached to in a timeline of a media-editing application. Specifically, this figure illustrates the timeline 2400 in two different stages 2405 and 2410 to show changing the position of an anchor with respect to the anchored clip, to which the anchor is attached. The timeline 2400 is similar to the timeline 115 described above by reference to FIG. 1.

As described above, the position of the anchor along the length of the anchored clip specifies the start of the clip's media content that will be composited into the media content of the media clip to which the anchored clip is anchored. The media-editing application of some embodiments allows the user to change the position of an anchor with respect to an anchored clip, to which the anchor is attached.

The operation of the timeline 2400 will now be described by reference to the two stages 2405 and 2410 that are illustrated in FIG. 24. In the first stage 2405, the media-editing application displays the anchored media clip 2425 in the anchor lane 2415 with its anchor 2430 positioned at the beginning (i.e., the in-point) of it.

In the second stage 2410, the user has selected the anchor 2401 by using a cursor (e.g., by clicking a mouse button, tapping a touchpad, or touching a touchscreen) and dragged and released (by releasing the mouse button, "tap" of a touchscreen, etc.) the anchor towards right and closer to the middle of the anchored media clip. As illustrated in FIG. 24, the anchored media clip in the anchor lane and the clips in the central compositing lane are at the same position in both stages 2405 and 2410 and only the anchor 2401 has been moved by a user with respect to its corresponding anchored media clip.

I. Connected Storyline

Figure 25:
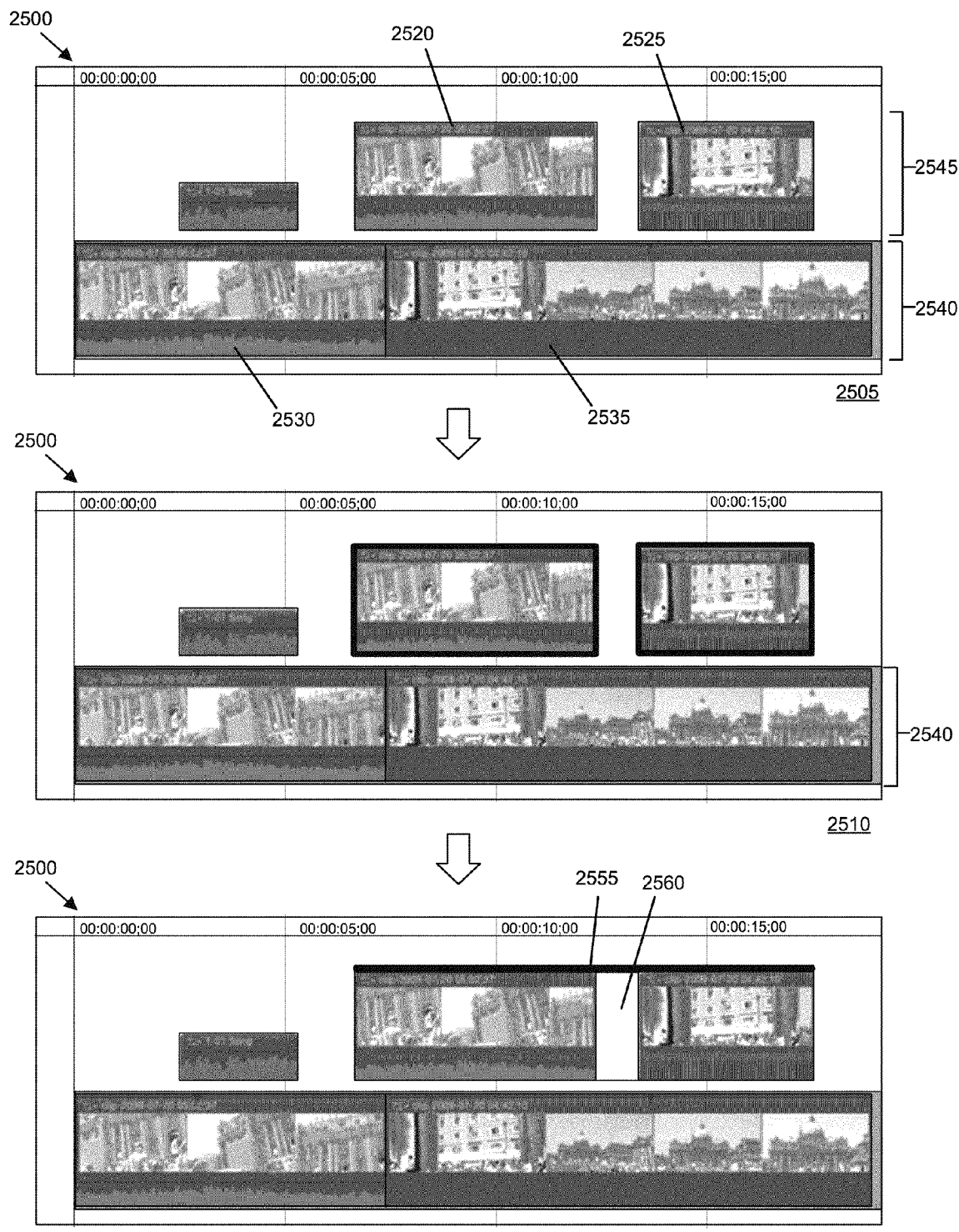
FIG. 25 illustrates creating a secondary compositing lane in a timeline of a media-editing application of some embodiments.

FIG. 25 illustrates creating a secondary compositing lane in a timeline 2500 of a media-editing application of some embodiments. Specifically, this figure illustrates the timeline 2500 in three different stages 2505-2515 to show that several anchored clips can be combined into a secondary compositing lane in the timeline 2500. FIG. 25 illustrates the media clips 2520 and 2525 in the timeline 2500. The timeline 2500 is similar to the timeline 115 described above by reference to FIG. 1.

The timeline 2500 in some embodiments allows the user of the media-editing application to create and use a secondary compositing lane. A secondary compositing lane (also called as a secondary storyline or a connected storyline) is a lane in the timeline 2500 where media clips can be composited and edited the same way as in a central compositing lane that is described above for some embodiments. That is, the secondary compositing lane is capable of performing all the operations that a central compositing lane can perform. For instance, media clips can be brought in, inserted, appended, trimmed, concatenated, taken out, etc. in the secondary compositing lane. Media clips can be anchored to the media clips in the second compositing lane in some embodiments.

The secondary compositing lane, however, is not a central compositing lane. In the timeline 2500, the secondary compositing lane occupies one of anchor lanes for placing anchored media clips. The secondary compositing lane in some embodiments does not span the entire timeline 2500 like a central compositing lane does. The secondary compositing lane spans only a necessary duration. Therefore, the timeline 2500 can include one ore more secondary compositing lanes in a single anchor lane. The timeline 2500 can also include secondary compositing lanes in more than one anchor lanes. The secondary compositing lane can also be anchored to the central compositing lane the same way that an anchored clip can. Also, the secondary compositing lane can be inserted or appended to the central compositing lane.

The media-editing application of different embodiments provides several different ways for the user to create a secondary compositing lane. For instance, the media-editing application allows the user to select several different media clips in the timeline 2500 and invoke a command (e.g., through a menu or hotkey combinations) that creates a secondary compositing lane within an anchor lane using the selected media clips. Also, the media-editing application allows the user to create a secondary compositing lane by snapping one media clip to another media clip while holding down a key. Some embodiments allow the user to create a container first in an anchor lane and add media clips into the container from the timeline or the clip browser.

In the first stage 2505, the timeline 2500 displays the media clips 2520-2535. The media clips 2530 and 2535 are in a central compositing lane 2540 and the media clips 2520 and 2525 are anchored off the media clips in the central compositing lane 2540. The anchored clips 2520 and 2525 are placed in the same anchor lane 2545 that is right above the central compositing lane 2540. As shown, the anchored clips 2520 and 2525 have a gap between them.

In the second stage 2510, the user has selected two media clips 2520 and 2525. As shown, the borders of these two media clips are highlighted to indicate the selection. The user invokes the command to create a secondary compositing lane (e.g., by selecting a menu item in a drop down menu).

In the third stage 2515, the timeline 2500 displays a secondary compositing lane 2540. In some embodiments, the timeline 2500 places a bar 2555 above the secondary compositing lane 2550 to allow the user to visually distinguish the media clips in the secondary compositing lane from other anchored media clips. As shown, the timeline 2500 creates a position clip 2560 to fill the gap that existed between the media clips 2520 and 2525 before the secondary compositing lane 2550 was created.

III. Editing Tools

A. Hotkey Editing

Figure 26:
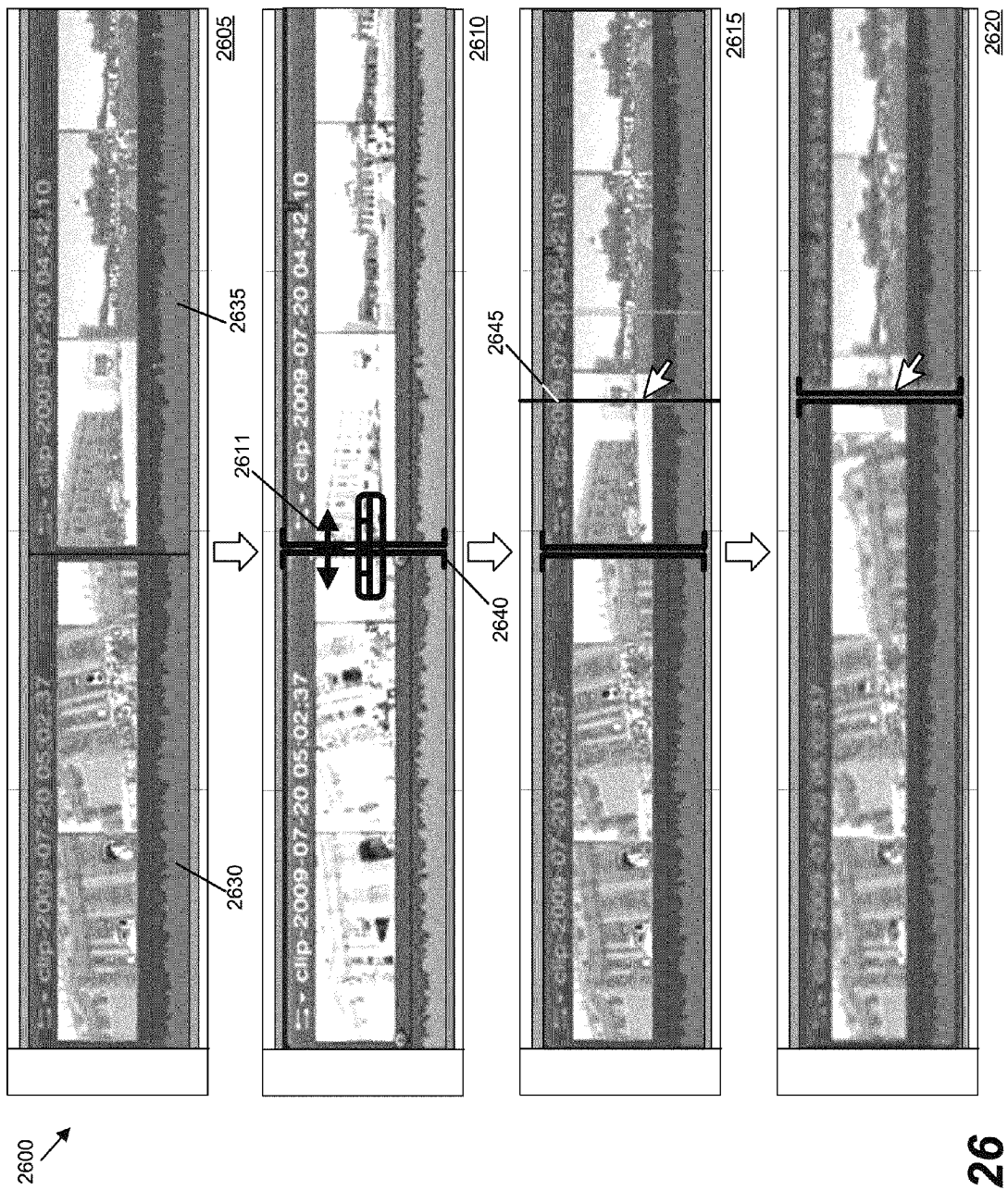
FIG. 26 illustrates an example of editing media clips displayed in a timeline of a media-editing application using hotkey commands.

FIG. 26 illustrates an example of editing media clips displayed in a timeline of a media-editing application using hotkey commands. Specifically, this figure illustrates a timeline 2600 in four different stages 2605-2620 to show the manipulation of an edit point in the media-editing application using a hotkey command. The timeline 2600 is similar to the timeline 115 described above by reference to FIG. 1.

Some embodiments allow a user of the media-editing application to move the position of an edit point in the timeline 2600 by using a hotkey command instead of a cursor controller operation (e.g., dragging the edit point from one point in the timeline to another). In some embodiments, the media-editing application allows the user to select an edit point, specify the kind of edit (e.g., a roll edit, trim edit, etc.) to make, and specify the location to which to move the edit point. The media-editing application then moves the selected edit point to the specified location upon receiving a hotkey command.

The first stage 2605 shows the timeline 2600 before the user performs a movement of the edit point by using a hotkey command. The central compositing lane 2625 of the timeline 2600 displays media clips 2630 and 2635.

The second stage 2610 illustrates the selection of an edit point within the timeline 2600. In some embodiments, the media-editing application allows the user to selects the edit point by hovering a cursor over a particular point within the timeline, by double-clicking on a particular point in the timeline, by a keystroke, etc. In this example, the user of the media-editing application selects the edit point 2640 (e.g., as indicated by the highlighted brackets) by hovering a cursor over neighboring edges of two media clips 2630 and 2635 in the timeline 2600. The media-editing application displays a roll edit symbol 2611 to indicate that a roll edit will be selected when the user clicks on it. The user selects to perform a roll edit (e.g., moving the out-point of the media clip 2630 and the in-point of the media clip 2635 at the same time to trim one media clip and extend the other).

In the third stage 2615, the media-editing application highlights the right edge of the media clip 2630 and the left edge of the media clip 2635 to indicate theses an edit point (i.e., these two edges) is selected currently. The media-editing application also displays in timeline 2600 a skimming playhead 2645 which is similar to the skimming playhead 730 described above by reference to FIG. 7. The user moves the skimming playhead 730 by moving the cursor 2646.

The fourth stage 2620 illustrates that upon the user's selection of a hotkey, the edit point shifts to the location. The user places the cursor at a position further right in the timeline 2600 then the position of the edit point shown in the third stage 2615. The user invokes the hotkey command and the media-editing application moves the edit point (i.e., the selected edges of the media clips 2630 and 2635) to the position of the playhead 2645. As a result, the media-editing application has pushed out the out-point of the media clip 2630 and pulled in the in-point of the media clip 2635 by the same duration.

B. Numeric Editing

Some embodiments of the media-editing application allow a user to edit media clips displayed in a timeline using numeric editing. Numeric editing allows the user of the media-editing application to make numerical inputs regarding the position of a media clip, playhead, or other items in the timeline. In some embodiments, the media-editing application allows a user to perform numeric editing to precisely specify the duration of a media clip, accurately specify the starting and/or ending point of a media clip in the timeline, specify the location of a playhead, etc. This functionality provides accuracy for the user when the user is editing the composite presentation.

Figure 27:
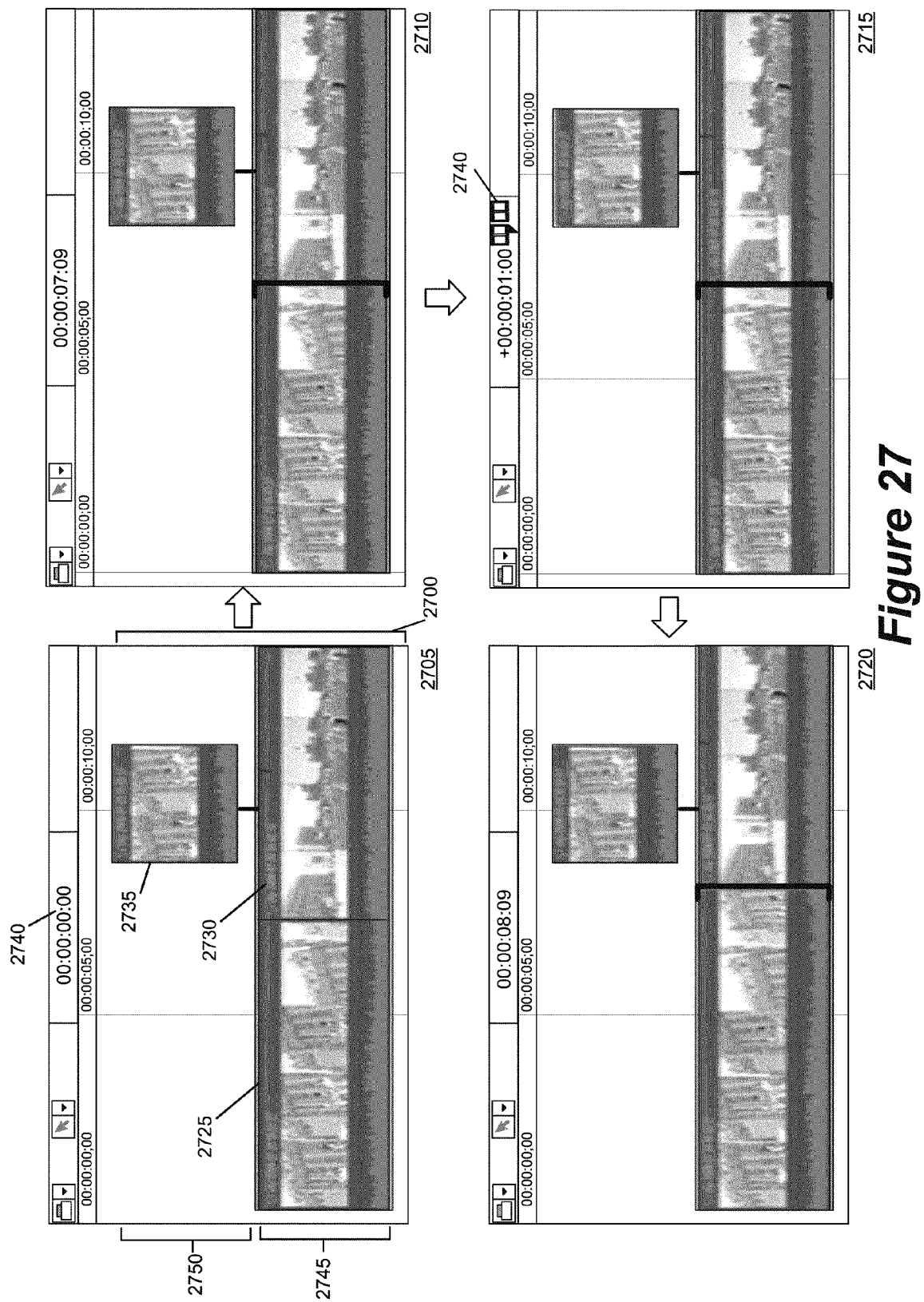
FIG. 27 illustrates an example of the extending of a media clip displayed in a timeline of a media-editing application through numeric editing.

FIG. 27 illustrates an example of the extending of a media clip displayed in a timeline of a media-editing application through numeric editing. Specifically, this figure illustrates a GUI 2701 in four different stages 2705-2720 to show the extending of a media clip through numeric editing. As shown, the GUI 2701 includes a timeline 2700 and an entry field 2740. The timeline 2700 is similar to the timeline 115 described above by reference to FIG. 1.

The media-editing application of some embodiments provides the entry field 2740 to allow a user of the media-editing application to input a numerical value indicating an amount of time (e.g., −1:00, +2:15, −7:30, etc.). Some embodiments allow the user to input the number of frames or a number that indicates a file size, etc. In some embodiments, the user may input a specific time in the timeline to where the user would like to extend the ending point (e.g., to minute 11, to 12:23).

When the in-point or the out-point of a media clip is selected (e.g., by selecting either side edge of the media clip in the timeline 2700), some embodiments allow the user to input the difference in time to which to extend or trim the edge of the media clip (e.g., −4:00, +2:30, +9:02). Some embodiments extend the number of frames of the media clip 2725 using the available media content taken from the source media clip of the media clip 2725. In some embodiments, the media-editing application then ripples the media clips in the timeline 2700 (i.e., when the media clip is extended, the media clips that come after the extended media clip ripple to make room for the duration by which the media clip is extended; when the media clip is trimmed, the media clips that come after the trimmed media clip ripple to close the duration by which the trimmed media clip is trimmed). Some embodiments, however, simply overwrite the media clips that follow the media clip 2725 as the edge of the media clip 2725 is extended beyond its original position.

The first stage 2705 shows the timeline 2700 before the user performs an extension operation using numeric editing. As shown, the central compositing lane 2745 of the timeline 2700 displays a composite presentation of media clips 2725 and 2730. The anchor lane 2750 of the timeline 2700 displays an anchored media clip 2735.

The second stage 2710 illustrates a selection of an edge of a media clip in the timeline 2700. The user of the media-editing application may perform the selection by a cursor controller operation, by a keystroke, by a numerical entry, etc. As shown in this example, the media-editing application displays a bracket at the edge of the media clip 2725 indicates that the user has selected the right edge of the media clip 2725. Upon the user's selection of the edge of the media clip, the entry field 2740 indicates the location of the edge within the timeline (i.e., at 7:09).

The third stage 2715 illustrates an input by the user indicating the amount that the user would like to extend the ending point of the media clip which edge was selected. The user has indicated to extend the location of the media clip's 2725 edge by +1:00.

The fourth stage 2720 illustrates that upon moving the edge of the media clip, the media-editing application extends the edge of the media clip to the location specified by the user's input. As shown by the entry field, the media-editing application extended the edge of the media clip 2725 by +1:00 to 8:09. The media-editing application then ripples the media clips in the timeline 2700. That is, the media clip 2730 that comes after the extended media clip moves to the right to make room for the increased duration of the extended media clip 2720 as shown.

Figure 28:
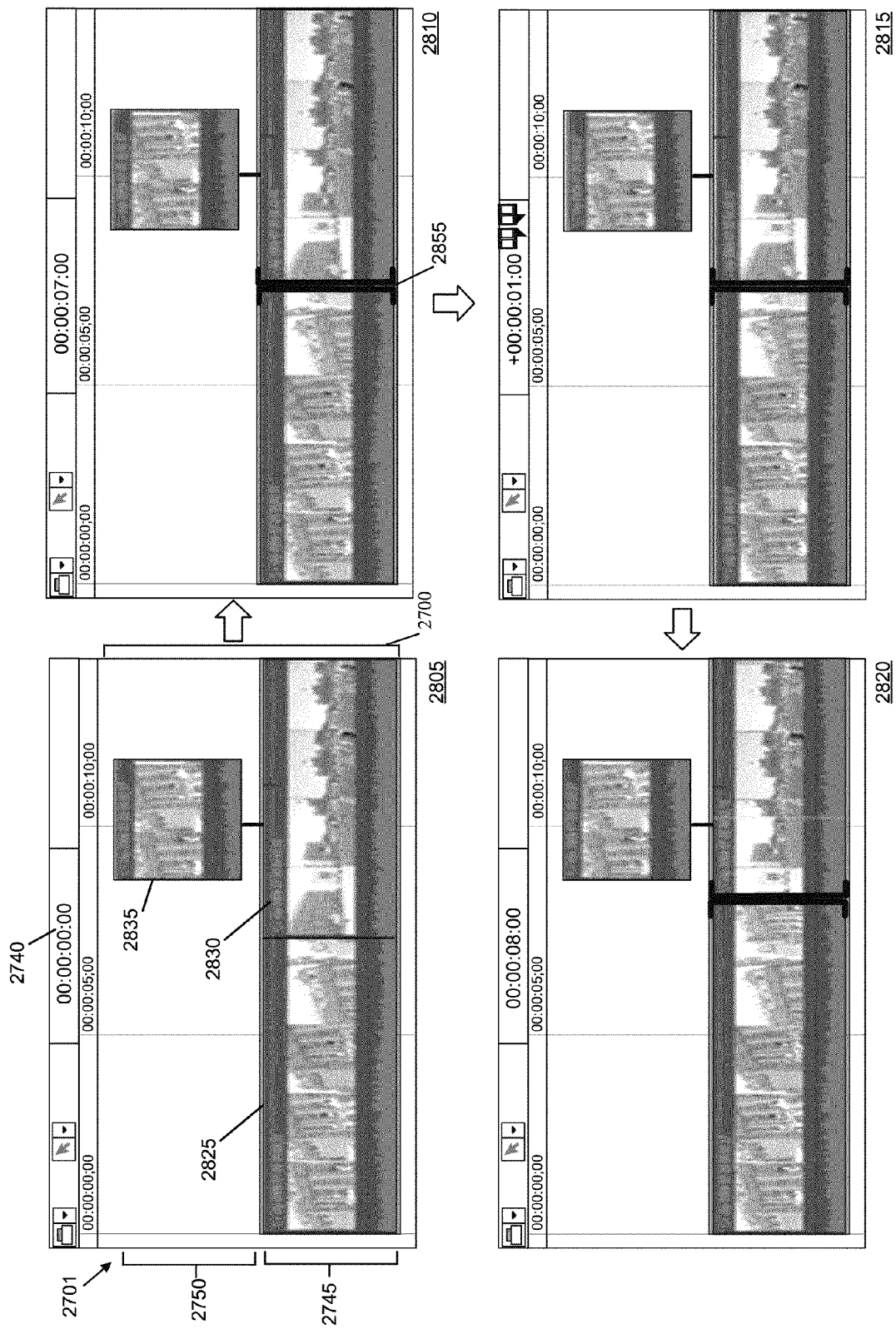
FIG. 28 illustrates another example of the trimming/extending of media clips at an editing point in a timeline using numeric editing.

FIG. 28 illustrates another example of the trimming/extending of media clips at an editing point in a timeline 2700 using numeric editing. Specifically, this figure illustrates the GUI 1701 in four different stages 2805-2820 to show using numeric editing to perform a roll operation (i.e., trimming an edge of one media clip while extending a neighboring edge of another media clip at an edit point).

The first stage 2805 shows the timeline 2700 before the user performs a roll operation using numeric editing. As shown, the central compositing lane 2745 of the timeline 2700 displays media clips 2825 and 2830. The anchor lane 2750 of the timeline 2700 displays media clip 2835.

The second stage 2810 illustrates a selection of an edit point (e.g., a point between two media clips) in the timeline 2700. The user of the media-editing application may perform this selection via a cursor controller operation, a keystroke, a numerical entry, etc. As shown in this example, the brackets enclosing the edges of the media clips 2825 and 2830 indicate that the user has selected the edit point 2855 at the point between the two media clips 2825 and 2830. Upon the user's selection of the edit point 2855 (i.e., the edges of the media clips 2825 and 2830), the entry field 2840 indicates the location of the edit point 2855 within the timeline (i.e., at 07:00).

The third stage 2815 illustrates an input by the user indicating the amount that the user would like to move the edit point in the timeline 2700. The user has indicated to move the edit point 2855 by +1:00. The fourth stage 2820 illustrates that upon receiving the numeric value by which to move the edit point, the media-editing application performs a roll operation. As shown, the media-editing application has extended the outgoing media clip 2825 and trimmed the incoming media clip 2830 by the duration specified by the user's input.

Figure 29:
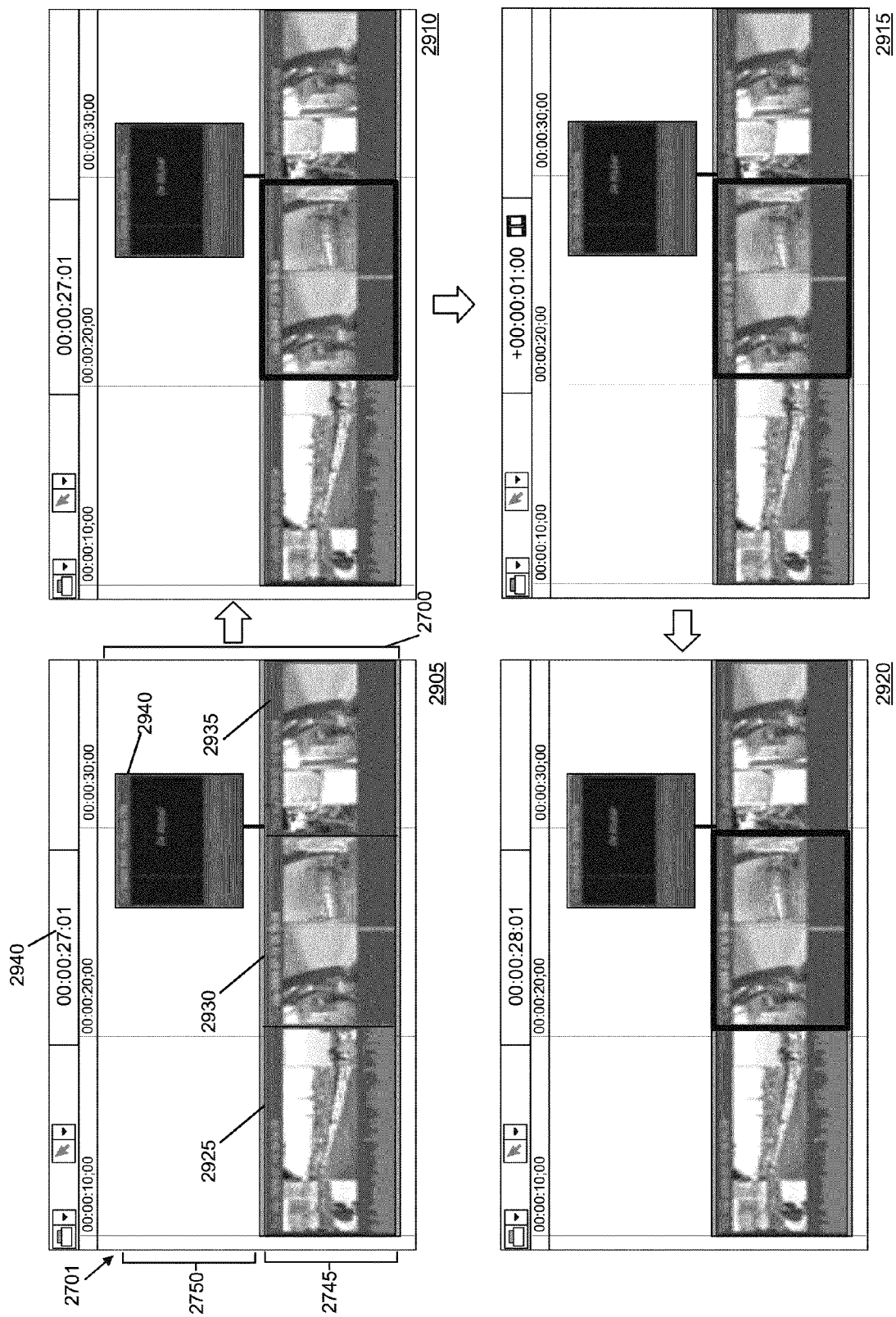
FIG. 29 illustrates an example of the sliding of media clips displayed in the timeline of a media-editing application through numeric editing.

FIG. 29 illustrates an example of the sliding of media clips displayed in the timeline 2700 of a media-editing application through numeric editing. Specifically, this figure illustrates the GUI 2701 in four different stages 2905-2920 the sliding of a media clips 2930 displayed in a timeline 2900 by incrementing the position value of the media clip 2930 displayed in the timeline 2900.

The media-editing application of some embodiments allows a user of the application to slide media clips displayed in a timeline through numeric editing. By sliding a media clip, the media-editing application extends or trims the media clips that come before or after the media clip being slid. That is, when a second media clip that comes after the first media clip and before the third media clip is slid to the right, the media-editing application extends the first media clip and trims the third media clip by the duration by which the slid media clip has moved. Conversely, when the second media clip is slid to the left in the timeline 2700, the media-editing application trims the first media clip and extends the third media clip. The overall duration of the three media clips do not change as long as the second media clip does not go beyond the in-point of the first media clip or out-point of the third media clip.

As described above, each media clip displayed in the timeline 2700 has a position within the timeline that may be represented by a numerical value. The media-editing application allows the user to move the position of a media clip in the timeline by incrementing or decrementing the numerical value representing the position of the media clip.

The first stage 2905 shows the timeline 2900 before the user performs a slide operation through the numeric editing of the positional value of a media clip. As shown, the central compositing lane 2745 of the timeline 2900 displays a composite presentation of media clips 2925-2935. The anchor lane 2750 of the timeline 2900 displays an anchored media clip 2940.

The second stage 2910 illustrates the selection of a media clip displayed in the timeline 2900. In some embodiments, the user of the media-editing application selects a media clip through a cursor controller operation (e.g., clicking on a media clip), through a keystroke, through a numerical selection (e.g., inputting a value that is occupied by a media clip or inputting a range of values), etc. As mentioned above, the user may select a range within the timeline 2900 (e.g., a portion of one or more media clips) instead of one or more entire media clips. As shown, the thick border around the media clip 2930 indicates the user's selection of the media clip 2930.

The third stage 2915 illustrates an input by the user indicating the amount that the user would like to shift the position of the selected media clip in the timeline 2900. The user inputs a numeric entry of +1:00. The media-editing application increments the position of the media clip 2930 by a minute in the timeline 2701. That is, the media-editing application moves the media clip 2930 by a minute to the right.

The fourth stage 2920 illustrates that upon completion of the slide operation, the media clip 2930 displayed in the timeline 2900 is shifted by the amount indicated by the numeric entry. As shown in this example, the media clip 2925 is extended by one minute at the clips end and the media clip 2935 is trimmed by one minute at the clips beginning.

Figure 30:
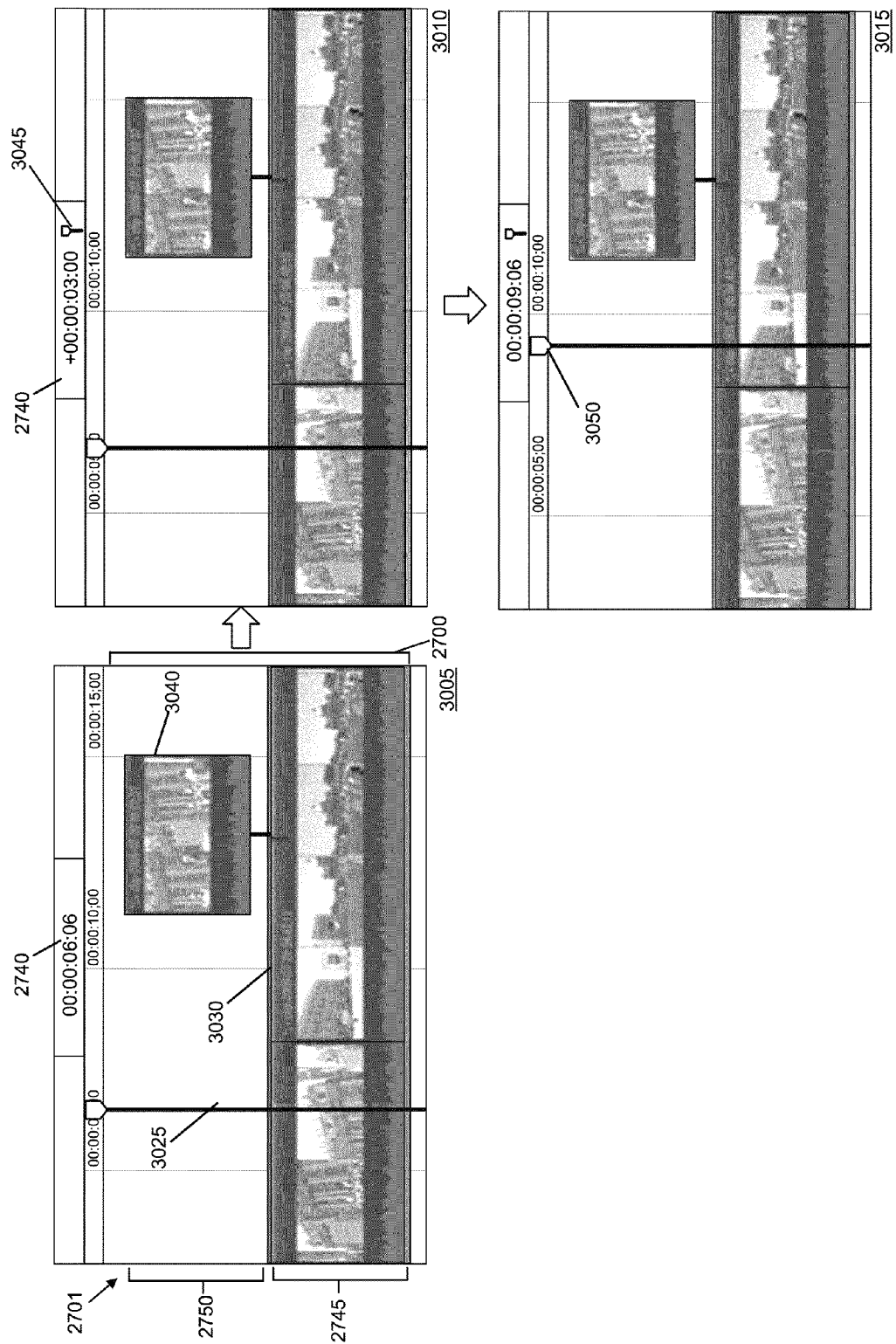
FIG. 30 illustrates an example of the moving of a playhead through numeric editing.

FIG. 30 illustrates an example of the moving of a playhead through numeric editing. Specifically, this figure illustrates the GUI 2701 in three different stages 3005-3015 to show the movement of a playhead 3050 through numeric editing. The playhead 3050 is similar to the primary playhead 725 described above by reference to FIG. 7.

In some embodiments, the media-editing application allows the user to change the position of the primary playhead 3025 through numeric editing. The media-editing application provides several different ways to change the position of the primary playhead. For instance, the media-editing application allows numeric editing of the position of the primary playhead when none of the edit points, media clips, or ranges of media clips are selected for editing. Other embodiments allow the user to select the primary playhead (e.g., by a click operation) and then to enter a numeric value to the entry field 2740 to move the position of the playhead.

The first stage 3005 shows the timeline 2700 before the user performs a movement of the playhead using numeric editing. As shown, the central compositing lane 3020 of the timeline 2700 displays media clips 3025-3030. The anchor lane 3035 of the timeline 2700 displays a media clip 3040. The primary playhead 3025 is currently placed on the media clip 3025.

The second stage 3010 illustrates an input by the user indicating the amount that the user would like to shift the position of the playhead 3025 within the timeline 2700. In some embodiments, the media-editing application highlights the primary playhead symbol 3045 displayed in the entry field 2740 to indicate that it is the primary playhead of which the position is affected by the numeric value to be entered in the field. The media-editing application highlights the symbol when the user selects the symbol or when the user selects (e.g., by a click operation the primary playhead 3025. In this example, the user does not select anything in the timeline 2700 and simply performs a numeric entry (e.g., +3:00) in the entry field 3045.

The third stage 3015 illustrates the movement of the playhead upon the user's numeric entry in the entry field. As shown, the primary playhead 3050 shifts to the right by the amount input by the user in the second stage 3010 (i.e., by +1:00).

Figure 31:
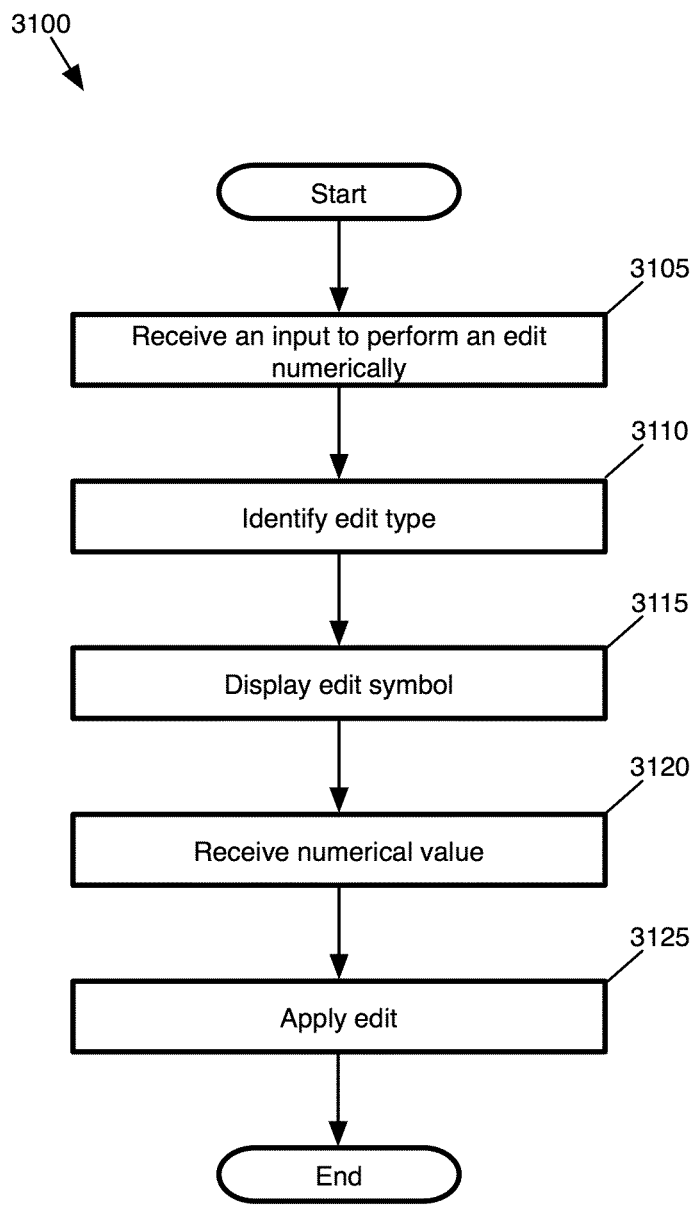
FIG. 31 conceptually illustrates a process of some embodiments for performing an edit on an item in the timeline based on numerical input values.

FIG. 31 conceptually illustrates a process 3100 of some embodiments for performing an edit on an item (e.g., a media clip, a playhead, a transition tool, etc.) in the timeline based on numerical input values. The process begins by receiving (at 3105) an input to perform an edit numerically. The input may be received by numerous different ways. For instance, the process may receive input through keystrokes (e.g., user's hitting a plus sign or a minus sign) in some embodiments. Other embodiments may receive the input through a selection of a menu item, etc.

The process then identifies (at 3110) edit type. In some embodiments, the process identifies the type of edit to perform based on a selected item in the timeline. For instance, when a media clip is selected, the process identifies that the edit to perform is a slide edit. When an edge of a media clip is selected, the process identifies that the edit to perform is a trim edit or an extend edit. When both edges of a media clip are selected, the process identifies that the edit to perform is a slip edit. When two neighboring edges of two media clips are selected, the process identifies that the edit to perform is a roll edit. When no edges of media clips or no media clips are selected, the process identifies that a playhead is to be moved based on the numerical value. The different types of edits are described above.

Next, process 3100 optionally displays an edit symbol. In some embodiments, the process displays the edit symbol by an area of the media-editing application into which the application receives numerical values. The edit symbol indicates the type of edit to be performed by the process. The process then receives the numerical value entered by the user. In some embodiments, the value is in number of video frames. In some embodiments, the value is an amount of time.

Process 3100 then applies the identified edit. Based on the received numerical value, the process performs the identified edit to one or more media clips or moves the playhead. For instance, when the received input is a minus sign and the right edge of a media clip is selected, the process trims the end of the media clip by an amount of media specified by the received numerical value. When the input is a plus sign and no media clips or edges are selected, the process moves the playhead to the right by an amount of time or a number of frames specified by the received numerical value.

C. Editing in One Type of Media Content

In some cases, a user of a media-editing application may only want to append the audio content or the video content of a media clip to a timeline. The user may not want the audio content of a particular media clip, but the audio of another media clip to go along with the video content of the particular media clip, and vice versa. For example, the user of the media-editing application may want the video content of people playing soccer to go along with classical music in the background instead of the sound of people running and kicking the ball around. In this case, the user of the media-editing application may prefer to retrieve only the video content of the soccer media clip instead of both the video and audio contents of the media clip.

Figure 32:
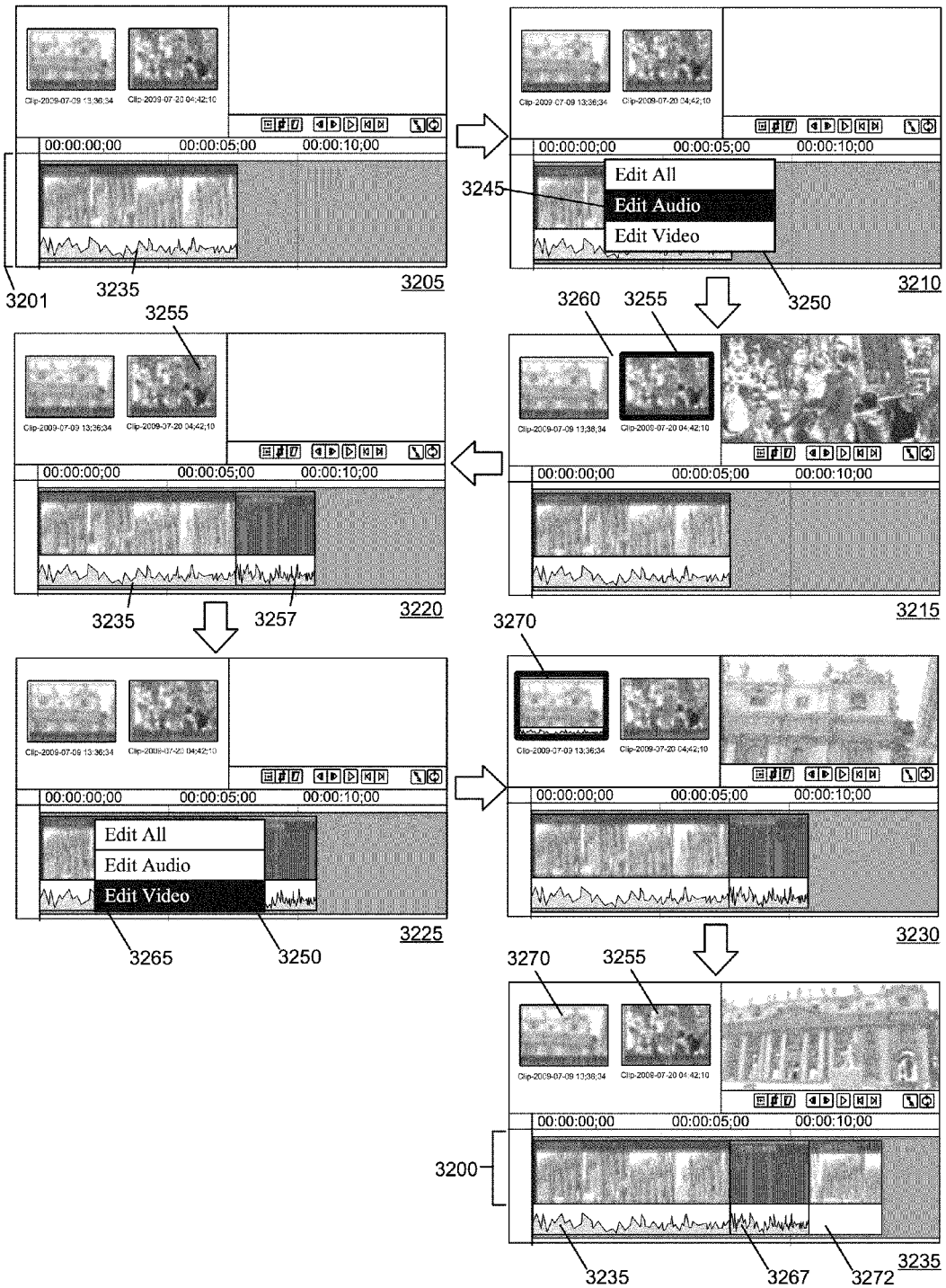
FIG. 32 illustrates an example of adding only one type of media content of a media clip to a timeline of a media-editing application.

FIG. 32 illustrates an example of adding only one type of media content of a media clip to a timeline 3201 of a media-editing application. Specifically, this figure illustrates a GUI 3200 in seven different stages 3205-3235 to show adding one type of media content of media clips to the timeline 3201. The GUI 3200 is similar to the GUI 100 described above by reference to FIG. 1 in that the GUI 3200 includes a clip browser 3260 and the timeline 3201 which are similar to the clip browser 110 and the timeline 115, respectively.

In some embodiments, the media-editing application allows the user to selectively take one type of media content from a media clip when adding the media clip to the timeline 3201. In some such embodiments, the media-editing application provides several options each of which specifies the type of media content that the media-editing application will add to the timeline 3201 when a media clip is added to the timeline 3201.

The first stage 3205 shows the timeline 3201 before the user performs an audio content or a video content concatenation operation to the media clip 3235 in the timeline 3201. As shown, the central compositing lane 3240 only displays media clip 3235. The media clip 3235 in this example includes both video and audio. As mentioned above, the video content of media clip 3235 is visually represented by the video portion (e.g., thumbnails) of the media clip 3235 and the audio content of the media clip 3235 is represented by the audio portion (e.g., the audio waveform) shown in the clip 3235.

The second stage 3210 illustrates the initiation of the audio content concatenation operation through the selection of a selectable item. As shown, a selection of the selectable item 3245 is made through a pull-down menu 3250 where the items of the pull-down menu are selectable. Different embodiments may allow the user to make this selection differently (e.g., through a keystroke, a pop-up menu, etc.). Upon the user's selection of the selectable item 3245, the media-editing application will retrieve only the audio content of selected media clips to append to the timeline 3201.

The third stage 3215 illustrates the selection of a media clip (e.g., from a clip browser) that includes audio content that the user wants to add to the composite presentation. The user of the media-editing application may perform the selection via a cursor controller operation (e.g., a click), via a keystroke, via selection from a pull-down menu, etc. In this example, the user has selected from the clip browser 3260 a media clip 3255 that includes audio content the user wants to add to the timeline 3201 (as indicated by the highlighted border around the media clip 3255). Different embodiments may indicate this selection differently (e.g., through an animated effect, through a checkbox, etc.)

The fourth stage 3220 illustrates the concatenation of the audio content of a media clip to the timeline 3201. The user of the media-editing application may concatenate the audio content of a media clip by dragging the selected media clip 3255 towards the central compositing lane 3290 of the timeline 3201. In some embodiments, the audio content concatenation operation is complete upon the selection of the media clip (instead of having the user perform an extra dragging operation). In some such embodiments, the media-editing application retrieves the audio content of the media clip and appends the audio clip to the end of the timeline 3201. In some cases, a user may indicate where in the timeline to append the audio content of the media clip (e.g., via dragging and dropping the media clip onto a particular point on the timeline 3201, via a keystroke, etc.). As shown, the central compositing lane 3240 now displays both the media clip 3235 along with the appended audio content 3257 of media clip 3255.

The fifth stage 3225 illustrates the initiation of the video content concatenation operation through the selection of a selectable item. Similar to the second stage 3210, the user of the media-editing application selects the selectable item 3265 through the pull-down menu 3250. Upon the user's selection of the selectable item 3245, the media-editing application retrieves only the video content of selected media clips to append to the timeline 3201.

The sixth stage 3230 illustrates the selection of a media clip that includes video content that the user wants to add to the composite presentation. The user of the media-editing application may perform the selection via a cursor controller operation (e.g., a click), via a keystroke, by selecting through a pull-down menu, etc. In this example, the highlighted border indicates the selection of the media clip 3270 in the clip browser 3260.

The seventh stage 3230 illustrates the concatenation of the video content of a media clip to the timeline 3201. In some embodiments, the user of the media-editing application concatenates the video content of a media clip by selecting a media clip from a clip browser and then dragging the media clip towards the timeline display. In this example, the highlighted border indicates the selection of the media clip 3270 from the clip browser 3260. As mentioned above, the user may select the media clip 3270 by entering a keystroke, by selecting through a pull-down menu, by selecting through a cursor controller operation, etc.

As mentioned above, some embodiments complete the video content concatenation operation upon the selection of the media clip. In some embodiments, a user indicates where in the timeline to append the video content of the media clip (e.g., via dragging and dropping the media clip onto a particular point on the timeline 3201). The video content concatenation operation is complete when the media-editing application retrieves the video content of the media clip and appends the video clip to the end of the timeline 3201. As shown, the video content 3272 of the media clip is retrieved from the media clip 3270 and appended to the timeline 3201.

In the seventh stage 3232, both the audio and video content concatenation operations are complete. The central compositing lane 3240 now displays the media clip 3235, the appended audio content of media clip 3255 (from the third stage 3215), and the appended video content of the media clip 3270.

This example illustrates the selective addition of different types of media content in the context of an appending operation (i.e., appending a media clip to the end of the sequence of the media clips composited in the timeline 3201). However, this selective addition of different type of media content can be applied to other editing operations performed by the media-editing application. For instance, the media-editing application in some embodiments can insert or anchor a selected type of media content of a media clip. The media-editing application can also replace a media clip in the timeline 3201 with a selected type of media content of another media clip.

D. Two-Up View

Figure 33:
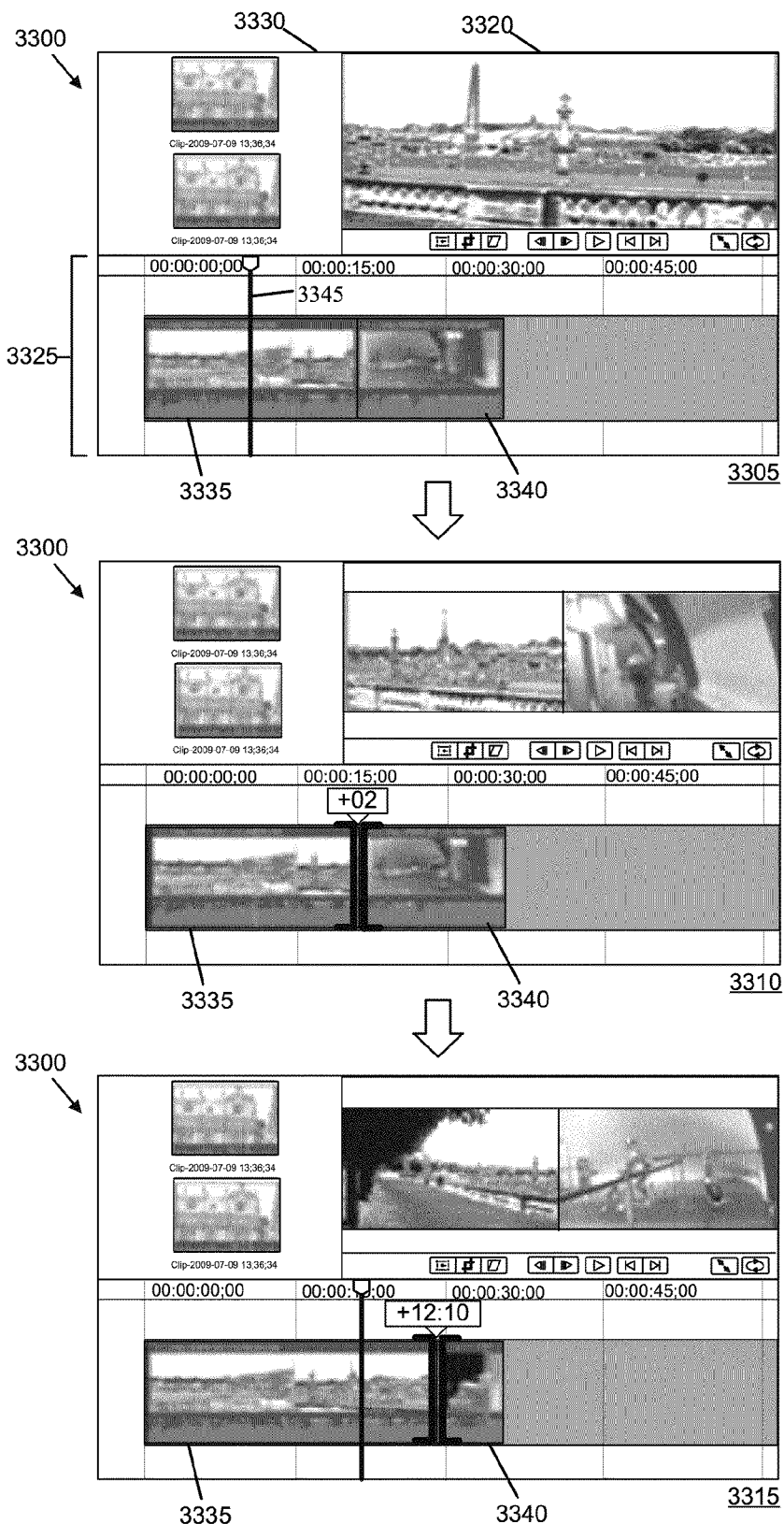
FIG. 33 conceptually illustrates a GUI of a media-editing application that displays two frames from both sides of an edit point when a media presentation is edited using the media-editing application.

FIG. 33 conceptually illustrates a GUI 3300 of a media-editing application that displays two frames from both sides of an edit point when a media presentation is edited using the media-editing application. Specifically, this figure illustrates the GUI 3300 in three different stages 3305-3315 to show that the media-editing application displays in a viewer 3320 two frames from both sides of an edit point as the media clips in a timeline 3325 are being edited by manipulating edit points. The GUI 3300 is similar to the GUI 100 described above by reference to FIG. 1 in that the GUI 3300 includes a clip browser 3330, the viewer 3320, and the timeline 3325 which are similar to the clip browser 110, the timeline 115, and the viewer 120, respectively.

In some embodiments, the media-editing application displays two frames in the viewer 3320 to provide more details to the user while the user is editing the media clips in the timeline 3325. For instance, when the media-editing application performs a roll edit according to the user inputs (e.g., user's dragging the adjacent edges of two adjacent media clips at the same time), the media-editing application displays the current last frame of the outgoing media clip and the current first frame of the incoming media clip. Instead of displaying two frames in the same viewer, some embodiments provide another viewer like the viewer 3320 so that the two frames can be displayed in two different viewers at the same time.

The media-editing application in some embodiments displays two frames in the viewer 3320 for other types of editing as well. Some of different types of editing include a ripple edit, a slide edit, a slip edit, etc. A ripple edit is trimming or extending a media clip and the downstream media clips are affected. That is, the media clips that come after the edited media clip in the timeline 3325 are pulled in or pushed out in the lane. For a ripple edit, the media-editing application of some embodiments displays two frames from both sides of the edit point. A slide edit is moving a media clip along the lane that the media clip is located while preserving the clip's duration. For a sliding edit, the media-editing application displays a frame that comes before the first frame of the clip moved and a frame that comes after the last frame of the clip in the viewer 3320 as the clip is being moved. A slip edit is taking a different portion of media content from the source media file while preserving the duration of the media clip and the location of the media clip within the media presentation. For a slip edit, the media-editing application displays the current first frame of the media clip and the current last frame of the media clip in the viewer 3320. These three types of editing are described further below in this application.

In the first stage 3305, the timeline 3325 includes a skimming playhead 3345 which is similar to the skimming playhead 730 described above by reference to FIG. 7. The timeline 3325 also displays two media clips 3335 and 3340. The skimming playhead 3345 intersects with the media clip 3335. Accordingly, the viewer 3320 displays a frame of the media clip 3335. The point along the timeline 3325 which the skimming playhead intersects with the clip 3335 represents the point in time at which the frame is located within the media presentation.

In the second stage 3310, the media-editing application highlights the right edge of the media clip 3335 and the left edge of the media clip 3340 displayed in the timeline 3310 as the application receives the user selection of those two edges (e.g., by a combination of a keyboard input and clicking operations). The media-editing application also displays in the viewer 3320 the current last frame of the media clip 3335 and the current first frame of the media clip 3340 as shown. The media-editing application will update the frames being displayed in the viewer 3320 as the user drags the selected edges to the right to perform a roll edit.

In the third stage 3315, the media-editing application displays the selected edges of the media clips 3335 and 3340 at a position along the timeline 3325 as the edges are dragged to the right of the timeline by the user. The media-editing application displays in the viewer 3320 the current last frame of the media clip 3335 and the current first frame of the media clip 3340. These two frames are different than the frames shown in the second stage 3310 because the edit point (i.e., the selected edges) has moved to the right. As a result, the outgoing media clip 3335 is extended further to the right and the beginning portion of the media clip 3340 is trimmed out.

Figure 34:
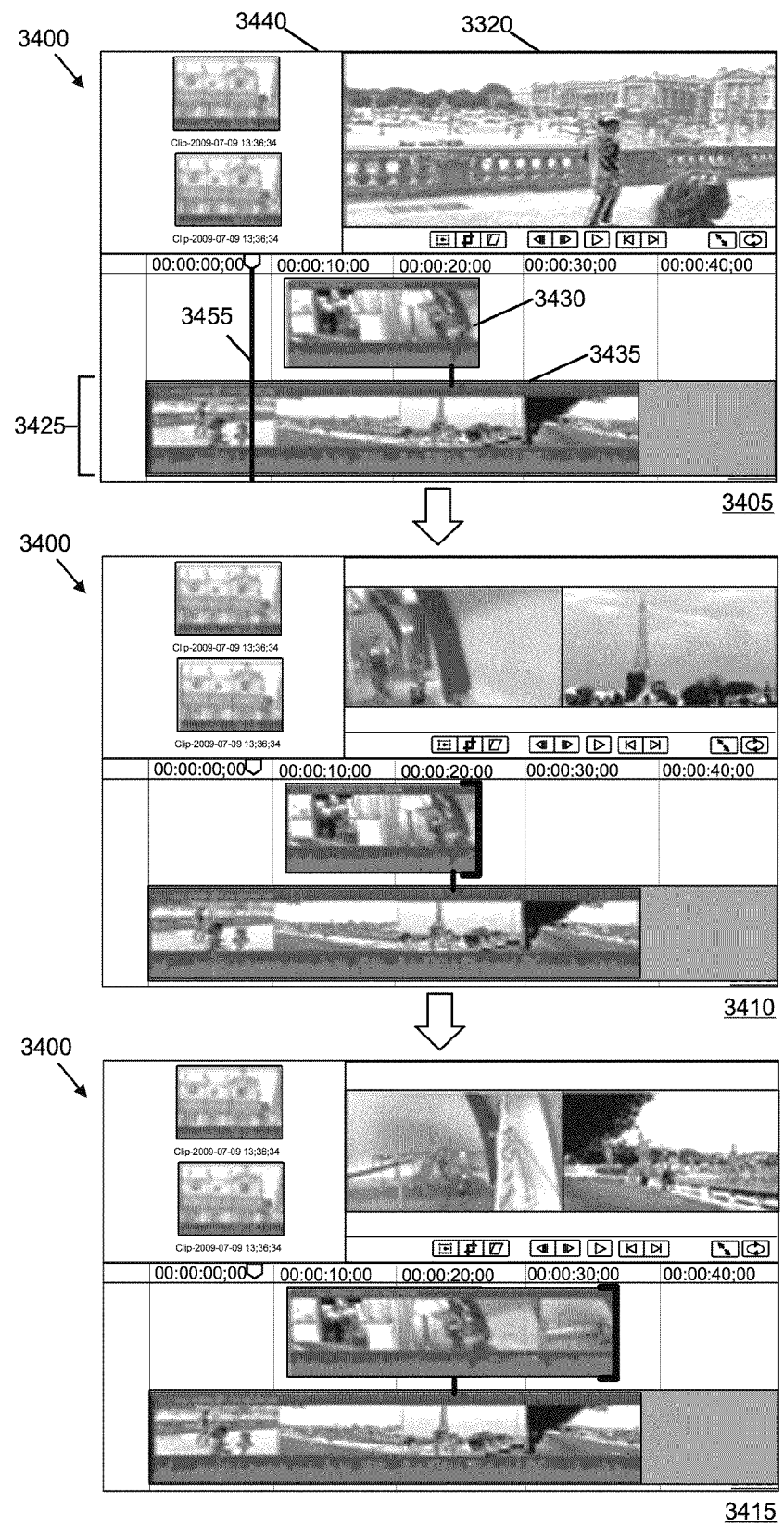
FIG. 34 conceptually illustrates a GUI of a media-editing application that displays two frames from both sides of an edit point when a media presentation is edited using the media-editing application.

FIG. 34 conceptually illustrates a GUI 3400 of a media-editing application that displays two frames from both sides of an edit point when a media presentation is edited using the media-editing application. Specifically, this figure illustrates the GUI 3400 in three different stages 3405-3415 to show that the media-editing application displays two frames in a viewer 3420, one from an anchored clip 3430 and another from a media clip 3435 in a central compositing lane 3425, as the anchored clip 3430 is being edited. The GUI 3400 is similar to the GUI 100 described above by reference to FIG. 1 in that the GUI 3400 includes a clip browser 3440, the viewer 3420, and a timeline 3445 which are similar to the clip browser 110, the timeline 115, and the viewer 120, respectively.

In some embodiments, the media-editing application displays two frames in the viewer 3420 to provide more details of editing to the user as an anchored clip displayed in the timeline 3445 is being edited. For instance, the media-editing application trims or extends an anchored clip by pulling in or pushing out the out-point of the anchored clip according to the user inputs (e.g., user's dragging the right side edge of the anchored media clip to the left or the right) in some cases. In such cases, the media-editing application displays the current last frame of the anchored clip and the frame of the media presentation that comes after the current last frame of the anchored clip being edited. Likewise, the media-editing application trims or extends an anchored clip by pulling in or pushing out the in-point of the anchored clip according to the user inputs (e.g., user's dragging the left side edge of the anchored media clip to the right or the left) in some cases. In such cases, the media-editing application displays in the viewer 3420 the current first frame of the anchored clip and the frame of the media presentation that comes before the current first frame of the anchored clip being edited.

In some cases, the media-editing application moves an anchored clip along the timeline 3445 according to the user inputs (e.g., user's selection of the anchored clip and dragging to the right or the left). In such cases, the media-editing application displays a frame in the viewer 3420 that comes before the first frame of the anchored clip and a frame that comes after the last frame of the anchored clip as the anchored clip is being moved. In some cases, the media-editing application performs a slip edit to an anchored clip. In such cases, the media-editing application displays the current first frame of the anchored clip and the current last frame of the anchored clip in the viewer 3320 as the edit is being performed.

In the first stage 3405, the timeline 3445 includes a skimming playhead 3455 which is similar to the skimming playhead 730 described above by reference to FIG. 7. The timeline 3445 also displays two media clips 3435 and 3430. The skimming playhead 3455 intersects with the media clip 3435 at the point along the timeline 3445 in a horizontal range that the media clip 3435 alone spans. Accordingly, the viewer 3420 displays a frame of the media clip 3435. The point along the timeline 3445 which the skimming playhead intersects with the clip 3435 represents the point in time at which the frame is located within the media presentation.

In the second stage 3410, the media-editing application highlights the right edge of the anchored media clip 3430 displayed in the timeline 3445 as the media-editing application receives the user selection of the edge (e.g., by a clicking operation). The media-editing application also displays in the viewer 3420 the current last frame of the anchored media clip 3430 and a frame of the media clip 3435 as shown. The frame of the media clip 3435 is the frame of the media presentation that comes after the last frame of the anchored media clip 3430. The media-editing application will update the frames being displayed in the viewer 3420 as the user drags the selected edge to the right to pull out the out-point of the anchored media clip 3430.

In the third stage 3415, the media-editing application displays the selected edge of the anchored media clip 3330 at a position along the timeline 3445 as the edge is dragged to the right by the user. The media-editing application displays in the viewer 3420 the current last frame of the anchored media clip 3430 and the frame of the media presentation that comes after the current last frame of the anchored media clip 3430. These two frames are different than the frames shown in the second stage 3410 because the selected edge of the anchored clip 3430 has moved to the right and therefore the last frame of the anchored clip 3430 has been changed to another frame and the position of the right edge has moved further to the right.

Figure 35:
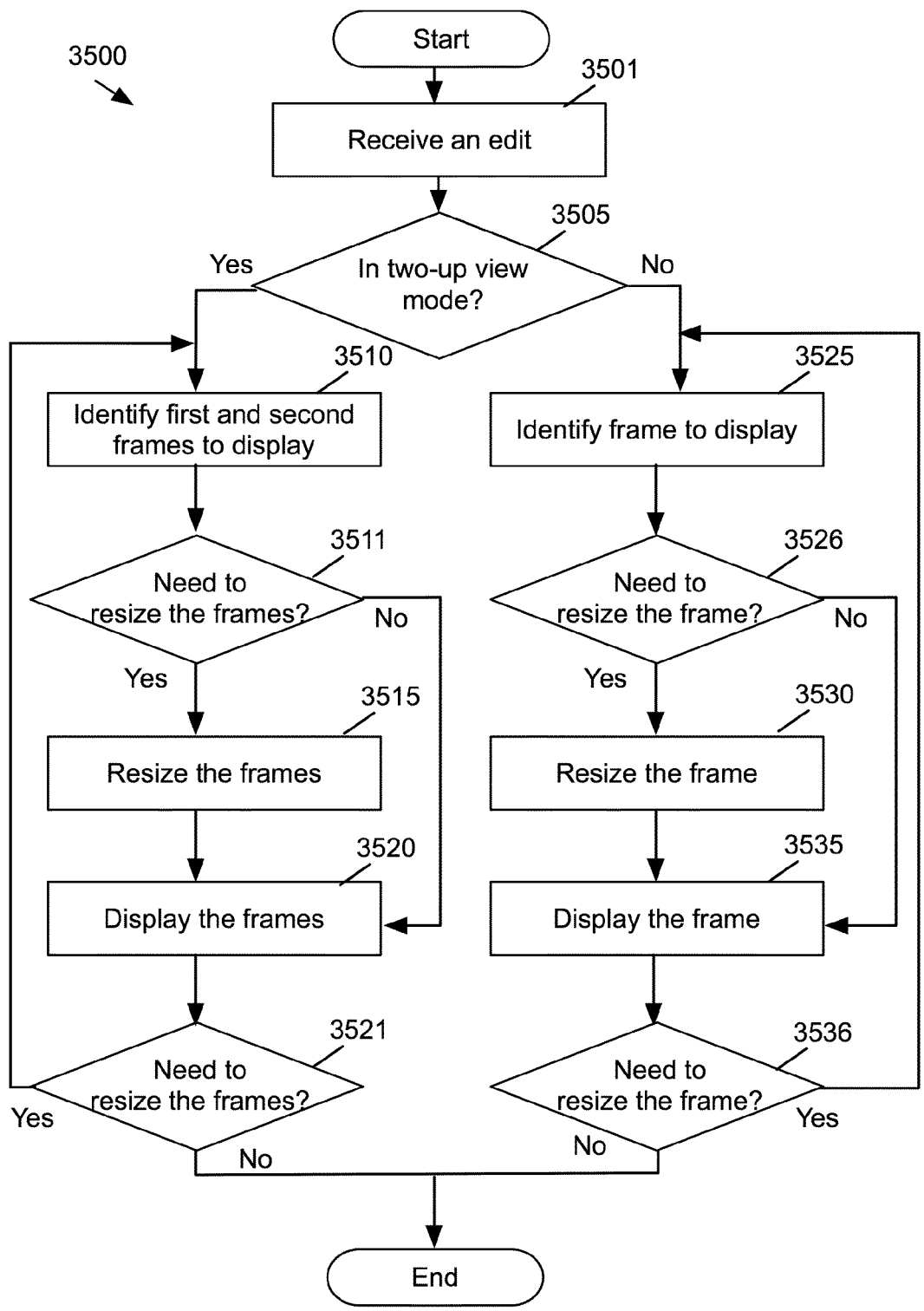
FIG. 35 conceptually illustrates a process of some embodiments for displaying frames in the preview display area of a media-editing application.

FIG. 35 conceptually illustrates a process 3500 of some embodiments for displaying frames in the preview display area of a media-editing application. The process is performed by the media-editing application in some embodiments. The process begins by receiving (at 3501) an edit (e.g., a ripple edit, a slide edit, a slip edit, etc.) to perform. Several examples of these different types of edit are described above. The process then determines (at 3505) whether the media-editing application is in a two-up view mode. As described above, the media-editing application in a two-up view mode displays in a preview display area two frames of both sides of an edit point.

When the process determines (at 3505) that the media-editing application is not in the two-up view mode, the process proceeds to 3525, which will be described further below. Otherwise, the process identifies (at 3510) the first and second frames (i.e., frames from both sides of an edit point) to display in the preview display area. The process identifies different frames as the frames to display based on the type of edit. For instance, the process identifies the current last frame of outgoing clip and the current first frame of incoming clip for a ripple edit as the edit point is being moved along the timeline for a ripple edit. For a sliding edit, the process identifies a frame that comes before the first frame of the clip moved and a frame that comes after the last frame of the clip as the clip is being moved. For a slip edit, the process identifies the current first frame of the media clip and the current last frame of the media clip. One of ordinary skill will recognize which two frames to identify as the frames to display for other types of edits. For instance, when an anchored clip is extended from the end, the process identifies that the last frame of the anchored clip and the next frame of the media clip in the spine as the frames to display as described above by reference to FIG. 34.

Next, the process determines (at 3511) whether the first and the second frames need resizing. In some embodiments, the dimensional information (e.g., height, length, aspect ratio, etc.) for the preview area varies as the user changes the preview area (e.g., by moving borders of the preview area). The process obtains the dimensional information of the preview display area and determines whether the first and second frames can fit into the preview display area. When the process determines (at 3511) that the two frames need resizing, the process resizes (at 3515) the two frames. In some embodiments, the process retains the aspect ratios of the first and second frames, which may be different from each other in some cases. The process in some embodiments finds largest possible sizes of the two frames for the frames to be placed in the preview display area. The process then displays (at 3520) the first and second frames in the preview display area.

Process 3500 determines (at 3521) whether the user is still editing. That is, the process determines whether the user is still moving the edit point such that different pair of frames should be displayed in the preview area. When the process determines (at 3521) that the user is still editing, the process loops back to 3510 to identify the next pair of frames to display. In some cases, one of the frames in the next pair may be one of the frames in the pair that is currently displayed in the preview area. The process ends when the process determines (at 3521) that the user is not editing.

When the process determines (at 3505) that the media-editing application is not in the two-up view mode, the process identifies (at 3525) a frame to display in the preview display area. The process identifies different frame as the frame to display based on the type of edit. For instance, the process identifies the current last frame of outgoing clip as the edit point is being moved along the timeline for a ripple edit. For a sliding edit, the process identifies either a frame that comes before the first frame of the clip moved or a frame that comes after the last frame of the clip as the clip is being moved as the frame to display. For a slip edit, the process identifies either the current first frame of the media clip and the current last frame of the media clip as the frame to display. One of ordinary skill will recognize which two frames to identify as the frames to display for other types of edits. For instance, when an anchored clip is extended from the end, the process identifies that the last frame of the anchored clip as the frame to display.

Next, the process determines (at 3526) whether the identified frame needs resizing. The process obtains the dimensional information of the preview display area and determines whether the identified can fit into the preview display area. When the process determines (at 3526) that the frame needs resizing, the process resizes (at 3530) the frame. In some embodiments, the process retains the aspect ratio of the frame and reduces or enlarges the height and length of the frame. The process then displays (at 3535) the identified frame in the preview display area.

The process then determines (at 3536) whether the user is still editing. When the process determines that the user is still editing the process loops back to 3525 to identify the next frame to display in the preview area. Otherwise, the process ends.

IV. Grouping Media Clips

Figure 36:
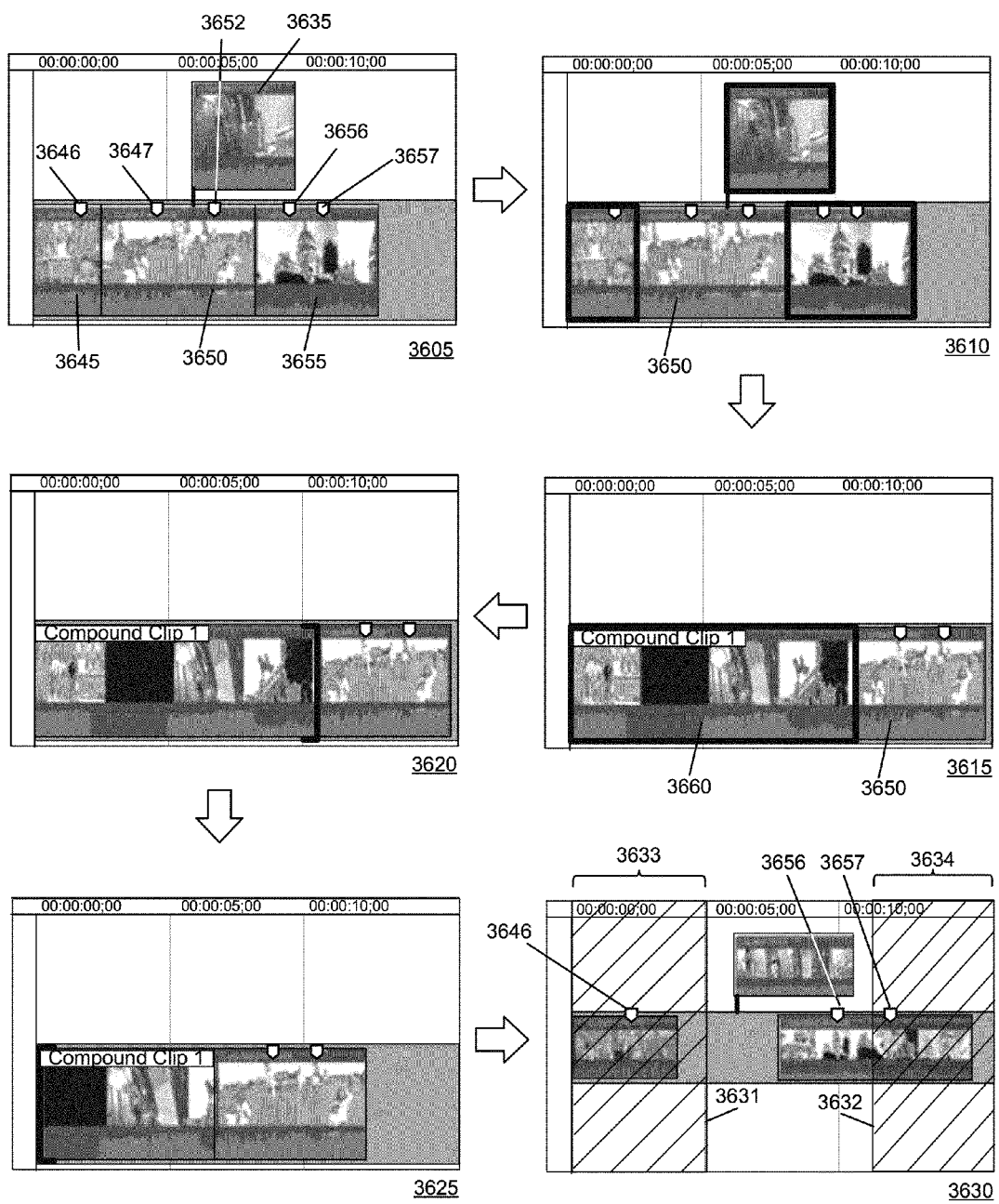
FIG. 36 conceptually illustrates grouping several media clips displayed in a timeline of a media-editing application into a single manipulative media clip in the timeline.

FIG. 36 conceptually illustrates grouping several media clips displayed in a timeline 3600 of a media-editing application into a single manipulative media clip in the timeline 3600. Specifically, this figures illustrates in six different stages 3605-3630 to show that the media-editing application combines three media clips 3635, 3645, and 3655 into a single media clip in the timeline 3600. The timeline 3600 is similar to the timeline 115 described above by reference to FIG. 1.

The media-editing application of some embodiments allows a user of the application to group the media clips displayed in the timeline 3600 into a single representation (e.g., a clip representation). The timeline 3600 often displays numerous clips at various instances in time and at various levels in the compositing hierarchy. For instance, to reduce the number of media clips in the timeline 3600, the media-editing application of some embodiments allows the user to select several media clips and collapse them into a one media clip representation. In this manner, the media-editing application reduces the congestion in the timeline 3600.

In some embodiments, the media-editing application also allows the user to create a compound clip from several media clips in the clip browser (not shown). Some embodiments allow user to select a set of media clips in the clip browser and invoke a command (e.g., by selecting a drop-down menu item) to group the set into a compound clip. Some embodiments allow user to select two or more different media clips of different media types (e.g., a video clip and a media clip and invoke a command (e.g., by selecting a drop-down menu item) to synchronize the different media types. These embodiments create a compound clip that includes the different media clips of the different media types.

The media-editing application also allows the user to capture a particular section of a composite media presentation. This capture simplifies the copying of the particular section and its placement in other parts of the composite media presentation. For instance, a user can group several audio clips to replicate the sound associated with opening a door. The user can then copy this group and place this copy at any point in time within the composite media presentation that shows the opening of a door. The media-editing application also allows the user to break up a compound clip back to the individual media clips that were combined into the compound clip.

These groups are referred to as "compound clips" in this application. Compound clips can be viewed as containers that can include several media clips of the same type in some embodiments, or that can include several media clips of several different types (e.g., audio clip, video clip, audio and video clip, text clip, image/picture clip, effect, transitions, etc.) in other embodiments.

The media-editing application allows the user to select any combination of contiguous or noncontiguous clips, compound clips, clips in a central compositing lane, anchored clips, or clips in a secondary compositing lane. Some embodiments also allow the user to create a compound clip by first creating an empty compound clip and then adding other media clips to the compound clip. The media clips within a compound dip can be edited by opening the compound clip within the timeline 3600, editing one or more media clips within it, and then closing the compound clip.

In some embodiments, the media-editing application allows the user to drag and place at any location in the timeline 3600, just like any other media clip in the timeline 3600. For instance, the user can drag a compound clip in and out of a central compositing lane or have it anchored to another media dip. Also, the media-editing application allows the user to edit a compound clip like any other media clip. For instance, the user can trim or extend a compound clip.

In the first stage 3605, the timeline 3600 displays media clips 3635-3655. The media clips 3645, 3650, and 3655 have several markers 3646, 3651, 3656, and 3657. Markers are visible points on media clips that can be used the commenting, synchronizing, editing, etc. that the media-editing application of some embodiments allows the user to place on the media clips. In the second stage 3610, the user selects (e.g., by click operations) the media clips 3635, 3645, and 3655 to combine into a compound clip. As shown, the three media clips are not contagious. The media clips 3645 and 3655 have the media clip 3650 between them. The media clip 3635 is anchored to the media clip 3650 and to neither of the media clips 3645 and 3655.

In the third stage 3615, the timeline 3600 displays a compound clip 3660 that the media-editing application created by combining the three selected media clips 3635, 3640, and 3645. The timeline 3600 has placed the compound clip 3660 between the media clips 3640 and 3615 because the media clip 3635, the first of the three clips that went into the compound clip 3660, was placed there before being combined into the compound clip. In some embodiments, the media-editing application uses different representations for displaying a compound, clip so that the compound clip is visually distinguishable from other non-compound clips. For instance, the compound, media clip includes in its representation a text describing that the clip is a compound clip. Other embodiments use other visual indications. For instance, the media-editing application may use different colors for borderline or place an icon in the representation of the compound media clip.

In the fourth stage 3620, the media-editing application trims the end portion of the compound clip 3660 by pulling in the out-point of the compound media clip 3660 as the user drags the right edge of the compound clip 3660. In the fifth stage 3625, the media-editing application trims the start of the compound clip 3660 by pulling in the in-point of the compound media clip 3660 as the user drags the left edge of the compound clip 3660.

In the fifth stage 3620, the media-editing applications opens the compound clip 3660 in the timeline 3600 to allow the user to edit the media clips inside the compound clip 3660. The media-editing, application provides different ways for the user to open the compound clip 3660. For example, the user can double-click the compound clip 3660.

As shown, the timeline 3660 displays only the media clips that were combined into the compound clip 3660. In addition, the timeline 3660 displays two vertical lines 3631 and 3632 and two gray areas 3633 and 3634. The lines 3631 and 3632 represents the in and out-points of the compound media clip 3660, respectively. The two gray areas 3633 and 3634 represent the available media content to which the in and out-points of the compound clips can be extended. The timeline 3660 also displays the markers 3646, 3656, and 3657 that the media clips inside the compound clip 3660 had before being combined into the compound clip. The media-editing application also allows the user to edit (e.g., move, append, delete, anchor, etc.) the media clips when the inside a compound clip is displayed.

Figure 37:
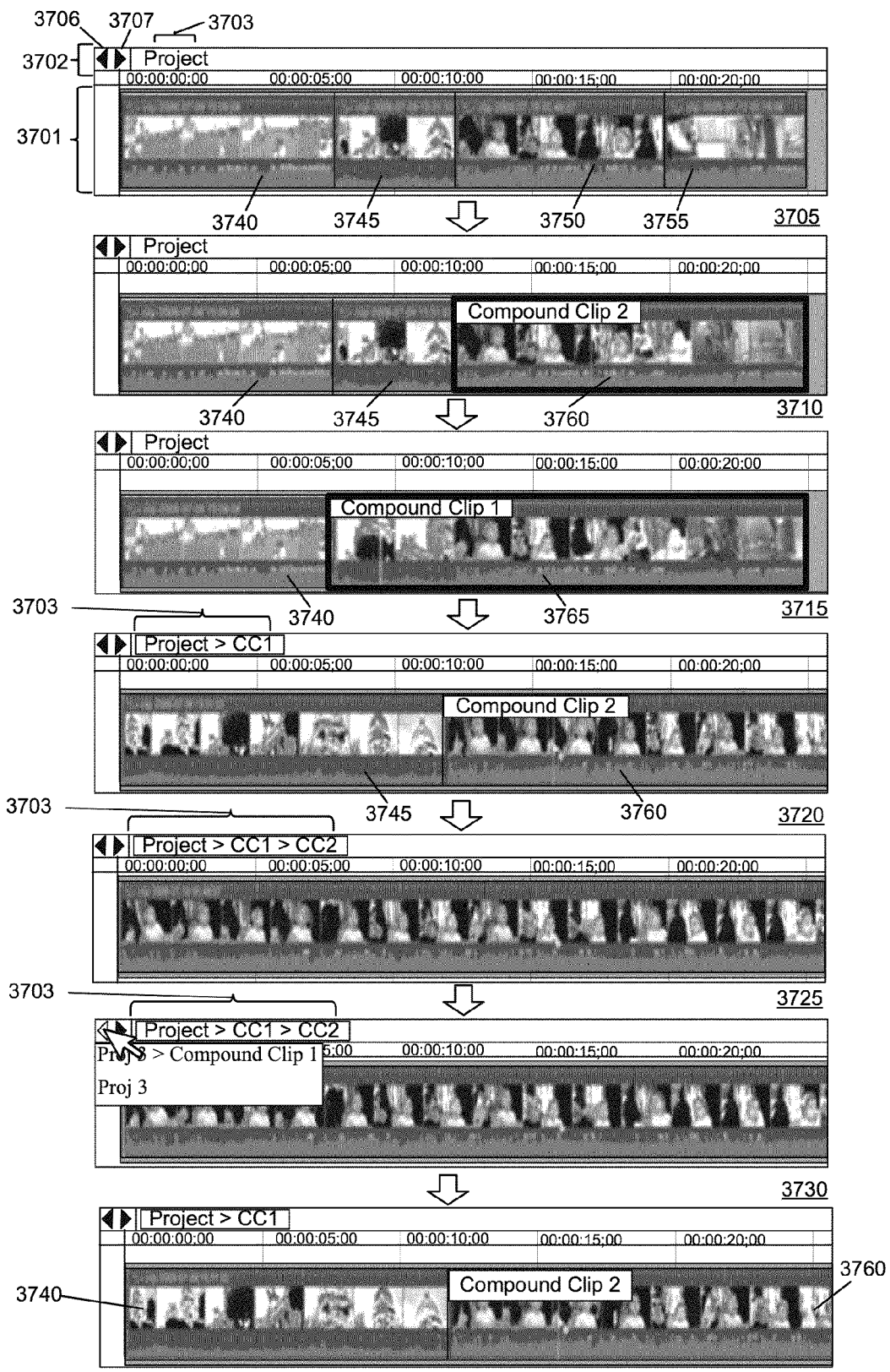
FIG. 37 illustrates navigating hierarchical levels of a compound clip displayed in a timeline of a media-editing application.

FIG. 37 illustrates navigating hierarchical levels of a compound clip displayed in a timeline 3701 of a media-editing application. Specifically, this figure illustrates a GUI 3700 of the media-editing application in seven different stages 3705-3735 to show that the media-editing application allows a user of the application to create a compound clip that includes another compound clip and navigate the hierarchical levels of the compound clip. The GUI 3700 includes a menu bar 3702 and the timeline 3701.

The timeline 3701 is similar to the timeline 115 described above by reference to FIG. 1. The menu bar 3702 provides several grouped menu commands, options, and other informational items for the media-editing application. For instance, the menu bar 3702 in some embodiments includes a back button 3706, a forward button 3707, and a hierarchy display area 3703.

As described above, the media-editing application of some embodiments allows the user to create a compound clip that contains one or more media clips including another compound clip. A compound clip thus can have several levels of hierarchy. For instance, a first compound clip may include a second compound clip, which itself includes a third compound clip. The first compound clip includes at least three levels of hierarchy.

Some embodiments allow the user to open up a compound clip in the timeline 3701 and edit the media clips within the compound clip. When a compound clip is opened for editing, the timeline 3701 in some embodiments displays only the media clips that the compound clip contains and no other media clips that constitute the same media presentation. Thus, the timeline 3701 displays a new "page" that shows the inside of the compound clip only when the compound clip is opened up. As such, the timeline 3701 will show different hierarchical levels of a compound clip as different pages showing different groups of media clips that correspond to the different hierarchical levels.

Some embodiments also provide a visual indication to show which level of the hierarchy the timeline 3701 currently shows. For instance, the media-editing application provides the hierarchy display area 3703 which displays a name of the compound clip when a compound clip is opened. This will aid the user to recognize that the timeline 3701 is displaying inside the compound clip. The hierarchy display area 3703 in some embodiments displays a name of the media project to show that the timeline 3701 is displaying the top level of the hierarchy (i.e., the media project). Other embodiments may display this hierarchical information differently. For instance, some embodiments may use a combination of color code and numeric values to show how far from the top level (i.e., the project level) is a hierarchical level that the timeline 3701 is currently displaying.

The media-editing application of some embodiments also provides tools to enable the user to navigate different pages for different hierarchical levels of a compound clip. For instance, the media-editing application may provide the back button 3706 and the forward button 3707 to move up or down the hierarchical levels of the compound clip. Some embodiments highlight these buttons when there are different hierarchies available to go up or down. Moreover, some embodiments display a drop-down list of hierarchies to go up or down when a user clicks and holds the back button 3706 or the forward button 3707.

In the first stage 3705, the timeline 3701 displays media clips 3740-3755. The user selects (e.g., by clicking operations) the media clips 3750 and 3755 to combine into a compound clip. The user then invokes a command to combine the selected clips into a compound clip, for example, by selecting a menu item provided by the media-editing application. The media-editing application combines them. The hierarchy display area 3703 a name of the media project to show that the timeline 3701 is displaying the top level of the hierarchy (i.e., the media project) as shown.

In the second stage 3710, the timeline displays the media clips 3740 and 3745 and a compound clip 3760 resulted from combining the media clips 3750-3755. The hierarchy display area 3703 still displays the name of the media project because the timeline 3701 still displays the media clips at the project level. Accordingly, the media-editing application highlights neither of the back or forward buttons 3706 and 3707. The user selects the media clip 3745 and the compound clip 3760 to combine into a compound clip and invokes a command to combine them.

In the third stage 3715, the timeline displays the media clips 3740 and a compound clip 3765 which resulted from combining the media clip 3745 and the compound clip 3760. The hierarchy display area 3703 still displays the name of the media project because the timeline 3701 still displays the media clips at the project level. Accordingly, the media-editing application highlights neither of the back or forward buttons 3706 and 3707. The user invokes a command (e.g., by selecting a menu item from a menu provided by the media-editing application) to open up the compound clip.

In the fourth stage 3720, the timeline 3701 opens up the compound clip 3765 and displays the media clip 3745 and the compound clip 3760 that constitute the compound media clip 3765. As shown, the hierarchy display area 3703 displays a name of the compound clip 3765 next to the project name to indicate that the timeline 3701 is displaying the inside of the compound clip 3765. Also, some embodiments highlight the name of the compound clip 3765 to add additional visual indication that the timeline 3701 has opened up the compound clip 3765. The user then invokes a command to open up the compound clip 3760.

In the fifth stage 3725, the timeline 3701 displays the media clips 3750 and 3755 (not shown in the figure because went out of visible range) which constitute the compound media clip 3760. As shown, the hierarchy display area 3703 displays a name of the compound clip 3760 next to the project name and the name of the compound clip 3765. By showing all these names, the hierarchy display area 3703 shows that the timeline 3701 is currently showing a level of hierarchy that is two levels away from the top hierarchical level.

In the sixth stage 3730, the user holds down (e.g., by a click operation) the back button 3706. As shown, the media-editing application in some embodiments displays a drop down menu, which the user can select an item corresponding to a higher level in the hierarchy to move up in the hierarchy.

The user may select either the top level or the level that shows the inside of the compound clip 3760 which contains the compound clip 3765. The timeline 3701 is currently showing the level of the compound clip 3765. The user in this example selects to go up to the project level. In the seventh stage 3730, the timeline 3701 displays the top level of the hierarchy, which is the project level. The timeline 3701 displays the media clip 3740 and the compound clip 3765.

Figure 38:
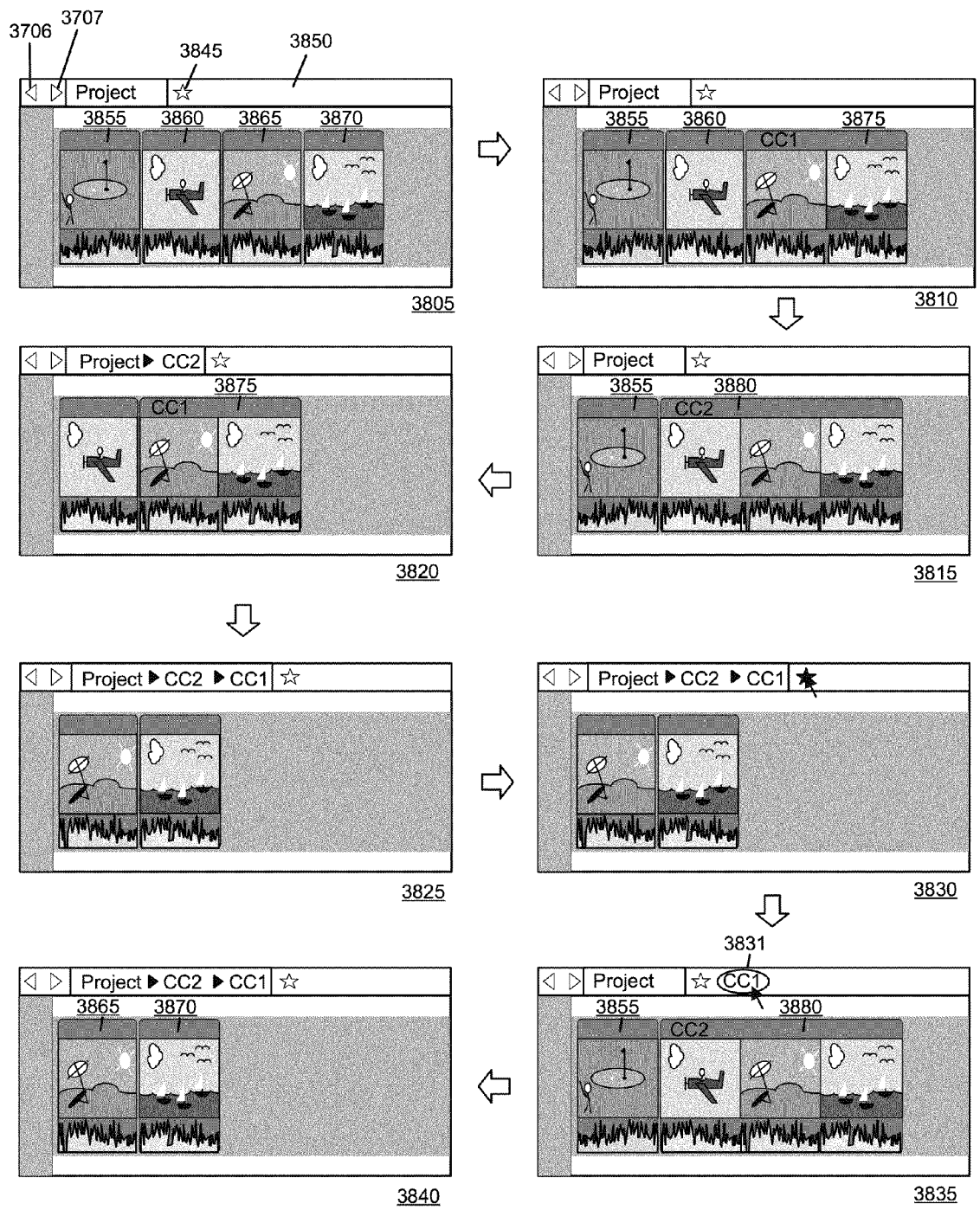
FIG. 38 illustrates bookmarking a compound clip displayed in the timeline of a media-editing application.

FIG. 38 illustrates bookmarking a compound dip displayed in the timeline 3701 of a media-editing application. Specifically, this figure illustrates the GUI 3700 of the media-editing application in eight different stages 3805-3840 to show that the media-editing application allows a user of the application to bookmark a compound clip for directly accessing the compound clip. This figures illustrates that the GUI 3701 additionally includes a bookmark display area 3850.

The media-editing application of some embodiments allows a user of the application to create a bookmark for a compound clip. Through a bookmark, the media-editing application allows a direct access to the bookmarked compound clip. As described above, the timeline 3701 can open up a compound clip and display the media clips inside the compound clip. When the timeline 3701 displays the inside of a compound clip, the media-editing application in some embodiments allows to bookmark the compound clip so that the inside of the compound clip is directly accessible through the bookmark. When the timeline 3701 displays media clips at the project level or the inside of another compound clip, the timeline 3701 can switch to display the inside of the bookmarked compound clip as the user selects (e.g., by a click operation) the bookmark displayed in the bookmark display area 3850.

Different embodiments create bookmarks differently. In some embodiments, the bookmark display area 3850 includes a bookmark adder 3845. The media-editing application creates a bookmark for a compound clip when the user clicks on the bookmark adder 3845 when the timeline 3701 displays the inside of the compound clip. Other embodiments provide key commands and menus for the user to invoke or select an item from in order to create bookmarks.

Different embodiments use different representations for bookmarks. In some embodiments, a bookmark is an icon or a linked text. In other embodiments, a bookmark may be represented as a tab that opens up a page in the timeline 3701 showing the inside of a bookmarked compound clip.

In the first stage 3805, the timeline 3701 displays media clips 3855-3870. The user selects (e.g., by clicking operations) the media clips 3865 and 3870 to combine into a compound clip. The user then invokes a command to combine the selected clips into a compound clip, for example, by selecting a menu item provided by the media-editing application. The media-editing application combines them. The hierarchy display area 3703 a name of the media project to show that the timeline 3701 is displaying the top level of the hierarchy (i.e., the media project) as shown.

In the second stage 3810, the timeline displays the media clips 3855 and 3860 and a compound clip 3875 resulted from combining the media clips 3865-3870. The hierarchy display area 3703 still displays the name of the media project because the timeline 3701 still displays the media clips at the project level. Accordingly, the media-editing application highlights neither of the back or forward buttons 3706 and 3707. The user selects the media clip 3860 and the compound clip 3875 to combine into a compound clip and invokes a command to combine them.

In the third stage 3815, the timeline displays the media clips 3855 and a compound clip 3880 which resulted from combining the media clip 3860 and the compound clip 3875. The hierarchy display area 3703 still displays the name of the media project because the timeline 3701 still displays the media clips at the project level. Accordingly, the media-editing application highlights neither of the back or forward buttons 3706 and 3707. The user invokes a command (e.g., by selecting a menu item from a menu provided by the media-editing application) to open up the compound clip.

In the fourth stage 3820, the timeline 3701 opens up the compound clip 3880 and displays the media clip 3860 and the compound clip 3875 that constitute the compound media clip 3765. As shown, the hierarchy display area 3703 displays a name of the compound clip 3880 next to the project name to indicate that the timeline 3701 is displaying the inside of the compound clip 3765. The user then invokes a command to open up the compound clip 3760.

In the fifth stage 3825, the timeline 3701 displays the media clips 3865 and 3870 which constitute the compound media clip 3875. As shown, the hierarchy display area 3703 displays a name of the compound clip 3760 next to the project name and the name of the compound clip 3880. By showing all these names, the hierarchy display area 3703 shows that the timeline 3701 is currently showing a level of hierarchy that is two levels away from the top hierarchical level.

In the sixth stage 3830, the user clicks on the bookmark adder 3845 to add a bookmark for the compound clip 3875. The media-editing application adds a bookmark 3831 to the bookmark display area 3850. The user also navigates the timeline 3701 to have it display the project level using the back button 3706.

In the seventh stage 3835, the timeline 3701 displays the top level of the hierarchy, which is the project level. That is, the timeline 3701 displays the media clip 3855 and the compound clip 3880. The user clicks the bookmark 3831 to have the timeline 3701 display the inside of the compound clip 3875. In the eight stage 3840, the timeline 3701 displays the media clip 3865 and 3870 which constitute the compound clip 3880.

Figure 39:
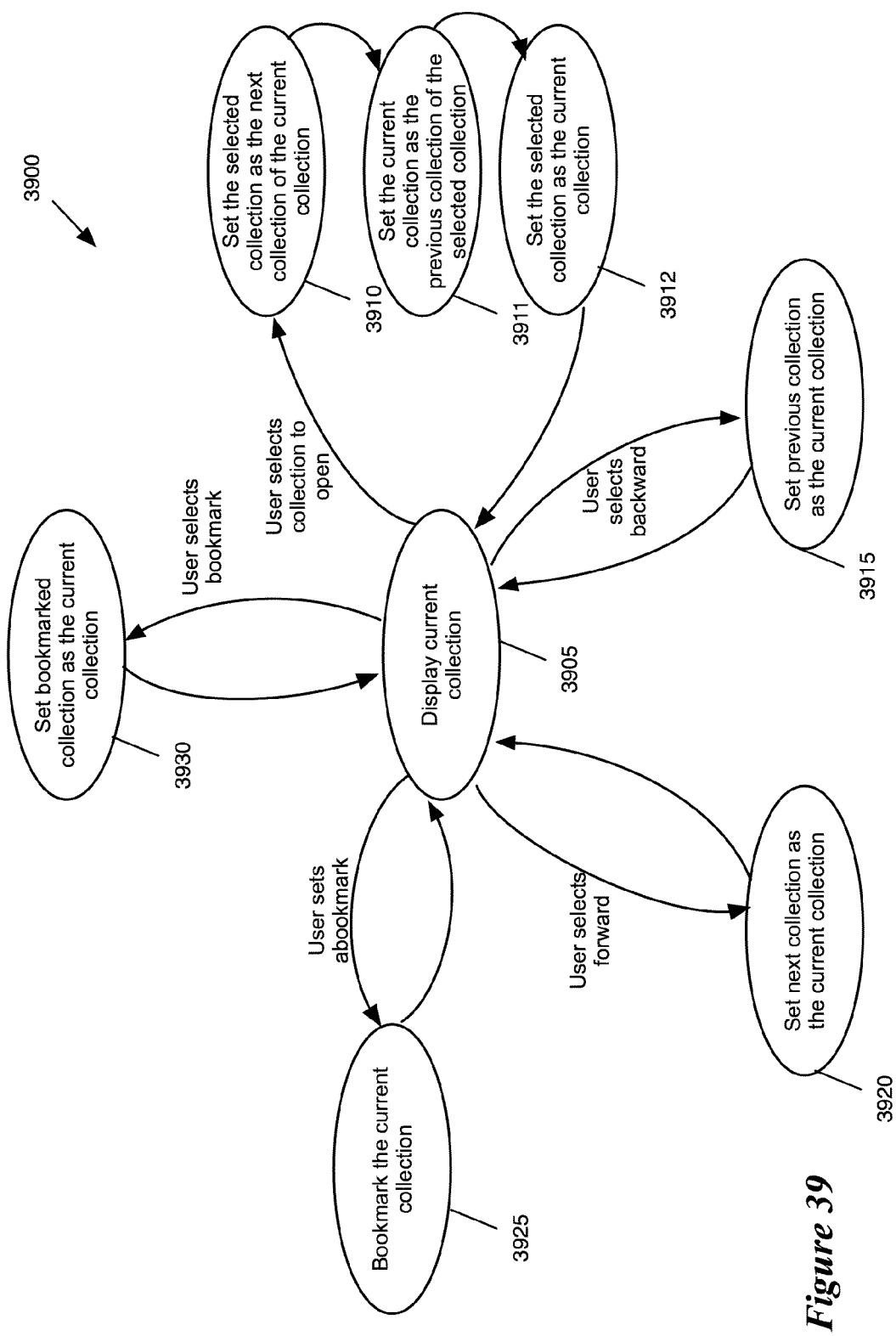
FIG. 39 conceptually illustrates a state diagram for a media-editing application of some embodiments.

FIG. 39 conceptually illustrates a state diagram 3900 for a media-editing application of some embodiments. Specifically, state diagram 3900 refers to the displaying a collection in the timeline due to various user actions. As will be described further below, a collection is a data structure that can represent different types of clips such as a media clip, a compound clip, and a connected storyline. As described above, the inside of a clip can be opened and displayed in the timeline. As shown, when the application is not receiving any user actions, the application is in the state 3905, in which the application displays the current collection. In some embodiments, when a project (or a media presentation) is opened in a timeline, the collection displayed in the timeline is the primary collection, which is the top level collection of the project. The primary collection of a project or a media presentation will be described further below. One of ordinary skill in the art will recognize that the application might be performing many other actions while in the state 3905 with reference to this figure (e.g., importing a media file into the clip library).

When a user selects a collection (e.g., a media clip, a compound media clip, etc.) to open in the timeline (e.g., by clicking on the clip in the timeline or in the clip browser), the application transitions to 3910 to begin set history of the collections displayed in the timeline. Specifically, in some embodiments, the application first transitions to 3910 to set the selected collection as the next collection of the currently displayed collection. The application then transitions to 3911 to set the currently displayed collection as the previous collection of the selected collection. Next, the application transitions to 3912 and sets the selected collection as the current collection to open.

The application returns to the state 3905 to display the collection that is newly set as the current collection to open. Different embodiments use different data structures to implement the history of the collections. For instance, in some embodiments, the application uses a stack of collection IDs to set the history of the collections. That is, the application changes the current collection from one collection to another collection whose IDs are in the stack by pointing to a different collection ID in the stack than the collection ID to which is currently being pointed. Other embodiments may use a linked list to connect collection IDs such that the application can go backward and forward within the list to find a collection to display in the timeline.

When the user selects to go backward in history (e.g., by selecting a backward button), the application transitions to 3915 to set the previous collection of the current collection as the new current collection to display in the timeline. The application then returns to the state 3905 to display the new current collection.

When the user selects to go forward in history (e.g., by selecting a forward button), the application transitions to 3920 to set the next collection of the current collection as the new current collection to display in the timeline. The application then returns to the state 3905 to display the new current collection.

When the user sets a bookmark the current collection (e.g., by selecting a create bookmark UI item when the current collection is displayed in the timeline), the application places a bookmark on the current collection. Different embodiments use different data structures to implement bookmarks. For instance, some embodiments may associate the bookmark data with the collection ID of the currently displayed collection. When the user selects a bookmark, the application looks up the bookmark data to find the collection ID that is associated with the bookmark data and then finds the collection to display.

When the user selects a bookmark (e.g., by selecting on a bookmark UI item such as bookmark 3831 described above by reference to FIG. 38), the application sets the bookmarked collection as the current collection. The application then returns to the state 3905 to display the new current collection.

Figure 40:
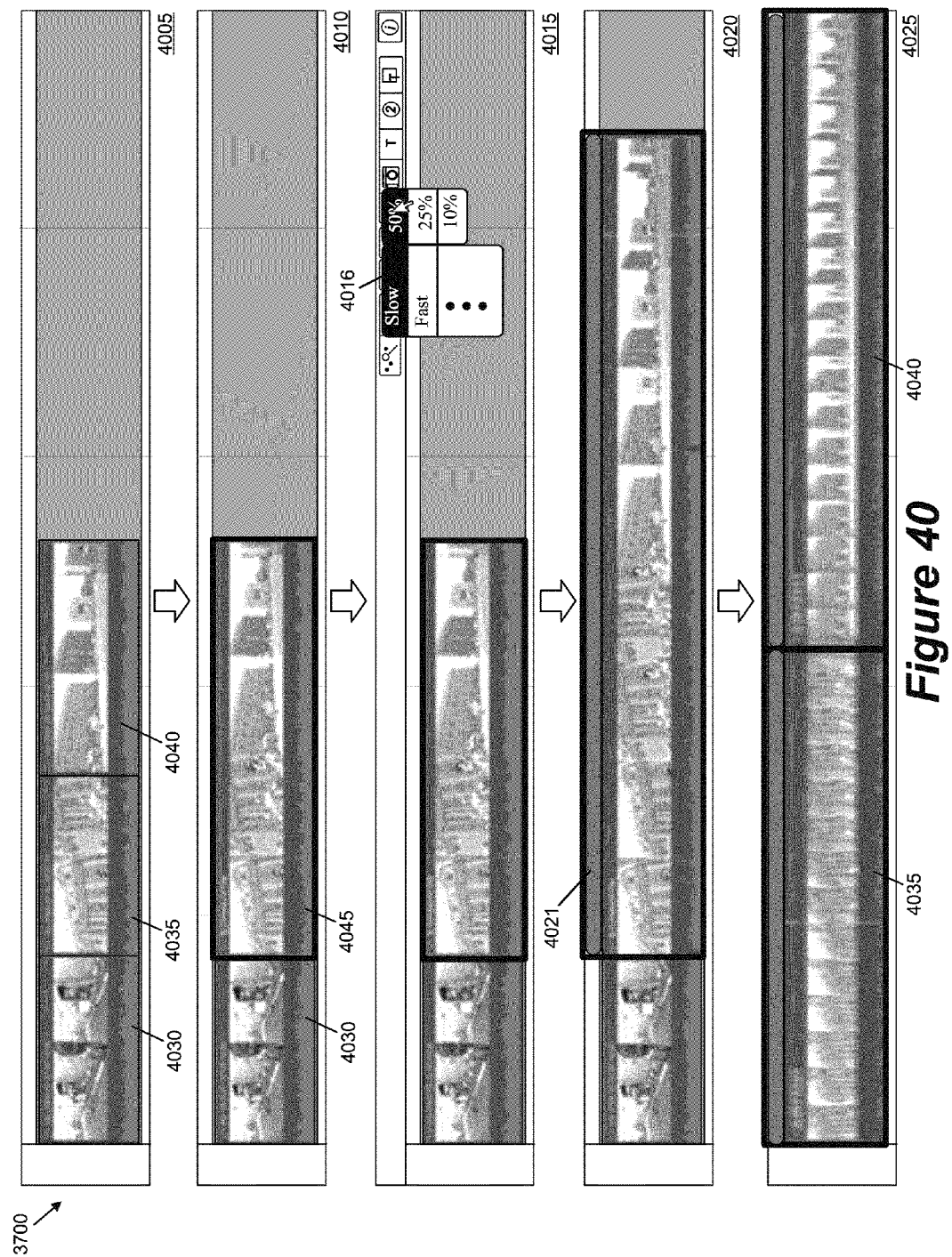
FIG. 40 illustrates retiming a compound clip displayed in the timeline of a media-editing application.

FIG. 40 illustrates reaming a compound clip displayed in the timeline 3701 of as media-editing application. Specifically, this figure illustrates the GUI 3700 of the media-editing application in five different stages 4005-4025 to show that the media-editing application allows a user of the application to retime, a compound clip and the retiming affects the media clips inside the compound clip. This figures illustrates that the GUI 3701 additionally includes a drop-down menu 4016.

In some embodiments, the media-editing application provides a tool to change playback speed of a media clip or a selected range of one or more contiguous media clips. The media-editing application slows down the playback speed of a selected media clip or a range by creating more video frames between the existing frames of the selected media clip or a range. The media-editing application speeds up the playback speed of a selected media clip or a range by removing some of the frames of the selected media clip or a range.

The media-editing application changes the playback speed of a selected media clip or a range upon receiving the user inputs. Different embodiments provide the user with different ways of entering inputs. For instance, the drop-down menu 4016 in some embodiments includes selectable menu items for the user to select (e.g., by a click operation). Through the selectable menu items, the media-editing application specifies the amount by which a selected media clip or a range is to be sped up or slowed down.

In some embodiments, the timeline 3701 displays visual indications for the media clip or a range of which the playback speed has been changed. For instance, some embodiments use an orange color for the slowed down clip or a range, a blue color for the sped up clip or a range, and a green color for the clip or a range of which the playback speed is not changed. The details of changing playback speed a media clip or a range are further described in the U.S. Provisional Patent Application 61/443,692.

As described above, the media-editing application of some embodiments allows the user to edit a compound clip just like any other non-compound media clip. The edit operations that the media-editing application can perform on a compound clip also include changing the playback speed of a compound clip. In some embodiments, the media-editing application changes the playback speed of the media clips inside a compound clip when the compound clip's playback speed has been changed. The media-editing application of other embodiments does not change the playback speed of the media clips inside a compound clip even if the compound clip's playback speed has been changed. In these embodiments, the media-editing application applies the changing of the playback speed to the compound clip only and preserves the playback speed of the media clips inside the compound clip. The media-editing application preserves the playback speed of the media clips inside the compound clip so that the media clips follow their respective playback speed in case when the media-editing application breaks the compound clip back to the individual media clips.

In the first stage 4005, the timeline 3701 displays media clips 4030-4040. The user selects (e.g., by clicking operations) the media clips 4035 and 4040 to combine into a compound clip. The user then invokes a command to combine the selected clips into a compound clip, for example, by selecting a menu item provided by the media-editing application. The media-editing application combines them.

In the second stage 4010, the timeline 3701 displays the media clip 4030 and a compound clip 4045 resulted from combining the media clips 4035-3540. In the third stage 4015, the user selects (e.g., by a click operation) the compound clip 4045 to slow down the playback speed of it. The user selects a menu item that causes the media-editing application to slow down the selected compound clip 4045 by 50 percent as shown. Accordingly, the media-editing application slows down the playback speed of the compound clip 4045 by creating and inserting more frames in between the existing frames of the compound clip 4045.

In the fourth stage 4020, the timeline 3701 displays the media 4030 and the compound clip 4045. Also, the timeline 3701 displays a visual indication 4021 (e.g., a color bar as shown) above the compound clip 4045 to show that the compound clip 4045 has been slowed down. As shown, the media-editing application also visually lengthened the compound clip 4045 to correctly represent the changed duration of the compound clip.

In the fifth stage 4025, the timeline 3701 opens up the compound clip 4030 and displays the media clips 4035 and 4045 which constitute the compound clip 4030 upon receiving the user's inputs (e.g., click operations) to open up the compound clip. As shown, the timeline 3701 displays a visual indication above each of the media clips 4035 and 4040. The media-editing application also visually lengthened each of the compound clip 4035 and 4040 to correctly represent the changed duration of the media clip.

The timeline 3701 in the fifth stage 4025 shows that the playback speed of the media clips that constitute the compound clip 4045 has been changed. However, in some embodiments where the playback speed of the media clips inside the compound clip is not affected, the timeline 3701 would display the media clips 4035 and 4040 without visually lengthening them in order to show the playback speed of these two clips is not changed.

V. Data Structures

In some embodiments, the media-editing application is an application that enables a user to create a composite media presentation from a set of media files. Through a graphical user interface (GUI) of the application, the user specifies the manner in which the media files are composited to create the composite presentation. In addition, through this GUI, the user can command the application to import one or more media files (e.g., from a camera, from an external drive, from an internal drive, etc.). Upon instructions from the user (i.e., through the media-editing application GUI) or as an automatic response to the detection of the media files in an external storage, the application copies the media files to a particular media storage location on a particular storage device. Some embodiments create a particular folder within the folder structure of the storage device for a set of imported media files (i.e., the media files imported at a particular time) and store a copy of the imported files in this particular folder at time of import.

When importing a media file, some embodiments create a media clip data structure for the imported media that links to the media file, any transcoded versions of the media file, and any analysis data about the media file. This media clip is the entity that is added to a media presentation in some embodiments in order to include the media file (or a portion of the media file) in the composite presentation. Some embodiments store this information in an asset data structure that specifically references the media and analysis files, and then additionally create a clip data structure that references the asset. In addition, the asset data structure may include metadata such as a UUID for the media file generated by the camera that captured the media, file format information, various video properties (e.g., frame rate, colorspace, pixel transform, dimensions, etc.), and various audio properties (e.g., channel count, track count, sample rate, etc.) of the media.

The references stored in the media clip (or asset) refer to the versions of the media file stored in the application's file storage. Some embodiments, for each set of imported media files, create separate folders for the original media and any type of transcoded media. In some embodiments, the transcoded media include both high-resolution and low-resolution encodes of the original media file that may be created on import or post-import.

In some embodiments, these references to the files are pointers to the locations of the files on the storage device. In some embodiments, the media-editing application initially sets the reference to the original media such that the data structure references the media file that is to be imported (e.g., the file on a camera) as the original media, then modifies this reference once the media file is copied to the application's file storage so that the data structure now references the media in the file storage. In some such embodiments, the application displays the media clips for the user to edit before the file is actually copied. This enables a user to begin creating a presentation using the media clip while the clip refers to a file stored on a camera, and then continue using the same clip once the file is copied with no interruption to the editing workflow.

Much like the folders for different versions of media files, some embodiments create separate folders within a folder for a set of imported files for each type of analysis file (e.g., a folder for person detection files, a folder for color balance files, a folder for shake detection files, etc.). In addition, some embodiments store additional clip data in the media clip, as opposed to a separate file. As one example, some embodiments store shake detection as a tag about the media file or a specific portion of the media file.

Figure 41:
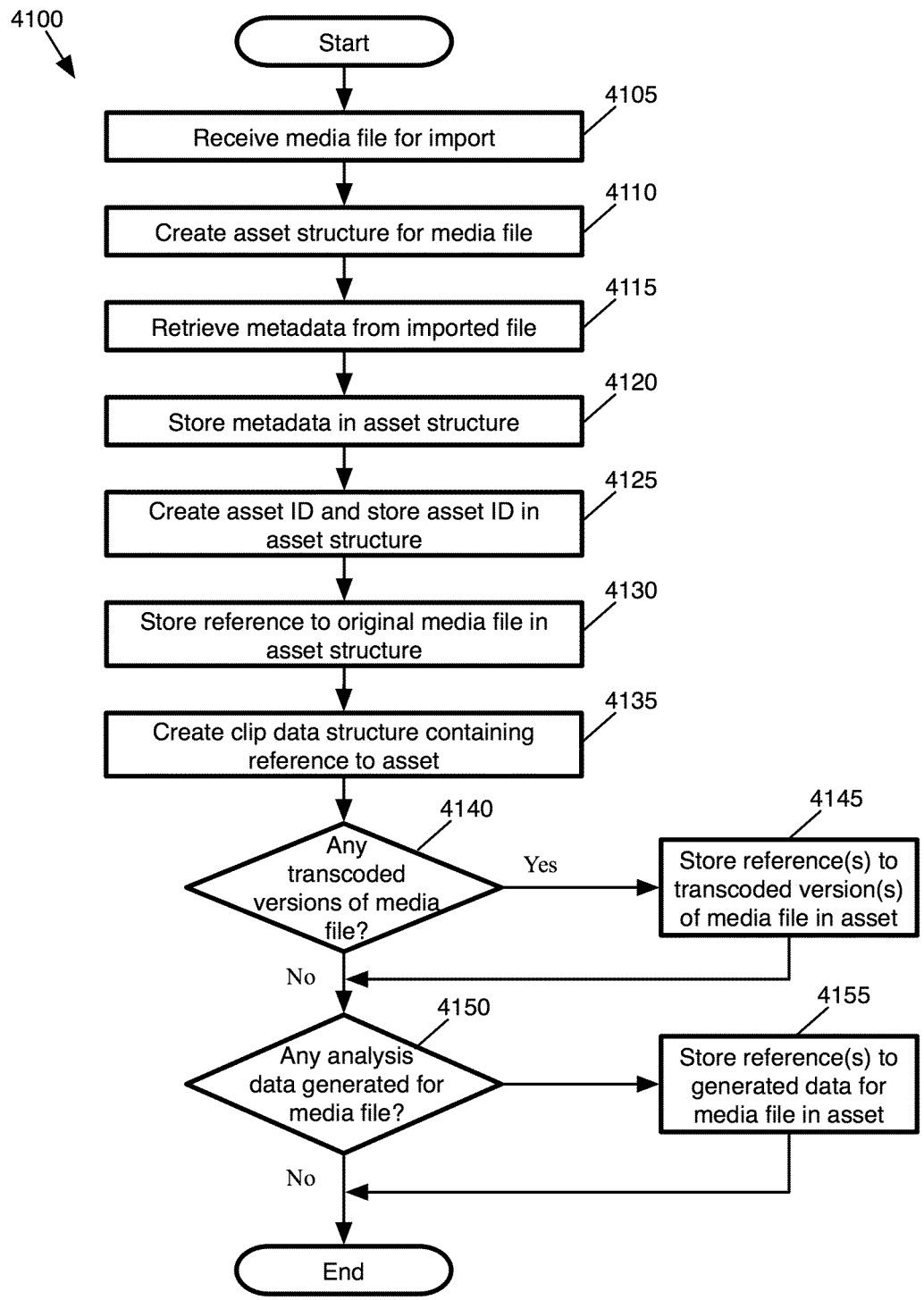
FIG. 41 conceptually illustrates a process of some embodiments for creating an asset data structure and a clip data structure referencing that asset.
Figure 42:
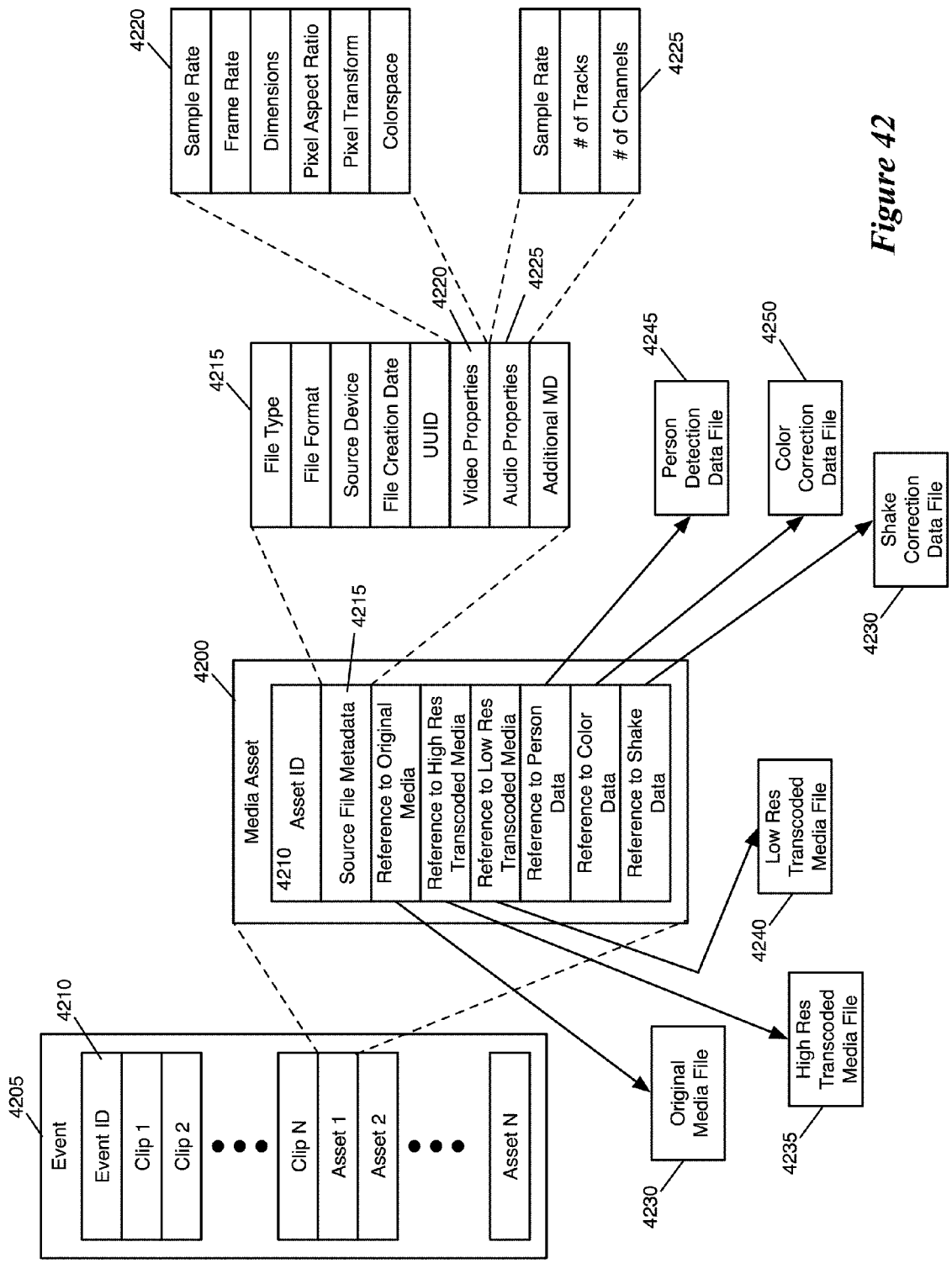
FIG. 42 conceptually illustrates an asset data structure for a video asset, as well as an event data structure for an event that contains the video asset.
Figure 44:
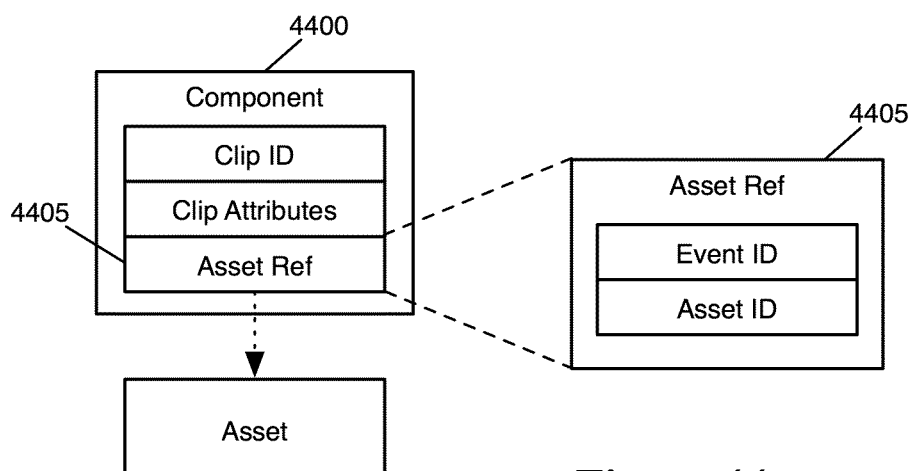
FIG. 44 conceptually illustrates a clip data structure that contains a single asset.

FIG. 41 conceptually illustrates a process 4100 of some embodiments for creating an asset data structure and a clip data structure referencing that asset. In some embodiments, process 4100 is performed as part of the import process of the media-editing application. The process 4100 will be described in part by reference to FIGS. 42 and 44. FIG. 42 conceptually illustrates an asset data structure 4200 for a video asset, as well as an event data structure 4205 for an event that contains the video asset. FIG. 44 conceptually illustrates a simplified clip data structure 4400 that contains a single asset.

As shown, the process begins by receiving (at 4105) a media file to import. The media file may be an audio file, a video file, or other type of media file. In the example shown in FIG. 42, the media file is a video file with audio channels (e.g., a ".mov" file).

Next, the process creates (at 4110) an asset data structure for the media file. At this point in the process, the asset data structure is an empty structure. Some embodiments define the data structure in a CoreData (SQLite) database file, an XML file (e.g., an XML file for an event), etc. As mentioned, FIG. 42 illustrates an asset data structure 4200 for the media asset. The asset data structure 4200 is fully populated, and this data will be described further below.

In some embodiments, the asset data structure is created within an event data structure. If the event data structure does not yet exist, then the media-editing application also creates this data structure to contain the asset. As shown in FIG. 42, the asset data structure 4200 is one asset within the event data structure 4205. The event data structure 4205 includes an event ID 4210, the list of assets, and a list of clips. The event data structure may include additional fields in some embodiments, such as the event name, event date (which may be derived from asset information), etc. The event data structure 4205 may be a CoreData (SQLite) database file that includes the assets and clips as objects defined with the file, an XML file that includes the assets and clips as objects defined with the file, etc.

The process next retrieves (at 4115) metadata from the imported file, and then stores (at 4120) this metadata in the asset structure. The metadata is information about the source file and its stored media in some embodiments. In some embodiments, this metadata is used to generate the asset ID, described below. The asset data structure 4200, as shown, includes source file metadata 4215. As shown, the source file metadata includes the file type (e.g., audio, video, movie, still image, etc.), the file format (e.g., ".mov", ".avi", etc.), the source device (i.e., the device that created the media, such as the particular type of camera on which a movie file was captured), the file creation date (e.g., the date a video was captured, rather than the date of import), a UUID (a unique identifier generated by a media creation device such as a camera), a set of video properties 4220, a set of audio properties 4225, and additional metadata. Different types (or manufacturers) of cameras create different UUIDs differently. These may be hashes of various data in some embodiments, such as a camera ID, record time (e.g., the time a user of the camera started recording, the duration of the video), etc., so long as no UUIDs will always be unique.

The video properties 4220 of some embodiments include such properties as a sample rate, a frame rate (i.e., the number of video images the video file contains per second, often 24, 25, or 30), the dimensions of the image (i.e., the number of pixels horizontally and number of rows of pixels), the pixel aspect ratio (i.e., the shape of the pixels, which may be square (HD video) or rectangular (e.g., NTSC video has a ratio of 10:11)), the pixel transform, and the colorspace in which pixel values of the image are defined (e.g., ITU-R BT.709 for HD, ITU-R BT.601 for SD, etc.). The audio properties 4225 of some embodiments include a sample rate (i.e., the number of audio samples per second, often 48 kHz), the number of audio tracks stored in the underlying media file, and the number of audio channels stored in the underlying media file. In some embodiments, the asset may additionally store override data that modifies one or more of the video or audio properties. For instance, a user might enter that a media file is actually 1080p, even though the file's metadata, stored in the asset, indicates that the video is 1080i. When presented to the user, or used within the application, the override will be used and the media file will be treated as 1080p.

Returning to FIG. 41, the process 4100 then creates (at 4125) an asset ID and stores the asset ID in the asset structure. The asset ID, in some embodiments, is a function of various properties of the underlying media file. For instance, some embodiments generate the asset ID as a hash of properties such as a file identifier, video properties, audio properties, and media range. The creation of the asset ID will be described in further detail by reference to FIG. 43. As shown in FIG. 42, the asset ID 4210 is stored in the video asset 4200.

With the asset created, the process 4100 then begins populating the asset with references to various data. The process stores (at 4130) a reference to the original media file in the asset structure. As described above, this reference initially refers to the media file on the device from which the application is importing the file (e.g., the camera), and then once the file is copied to the application's folder structure, the reference is modified to refer to the copied media file.

Next, the process 4100 creates (at 4135) a clip data structure containing a reference to the asset. In some embodiments, a clip is created for each asset. As will be described below, clip data structures (e.g., clip objects) can also contain other clips, and some embodiments use the same data structure for single asset clips, compound clips containing multiple assets and/or nested clips, and project sequences. The clip data structure, like the asset, is contained in the event data structure in some embodiments. Some embodiments create a series of nested clip objects for an imported clip, as described in further detail below. The lowest clip object in the nested hierarchy references the asset.

Next, the process determines (at 4140) whether any transcoded versions of the media are generated by the media-editing application. As described in subsections A and B above, some embodiments generate one or more transcoded versions of imported media files in formats that are better suited for editing. This may be an automatic process based on the imported file properties, or based on user selection of whether to transcode the media. When one or more transcoded versions of the media are created, the process stores (at 4145) references to any such transcoded versions of the media file in the asset data structure.

The process also determines (at 4150) whether any analysis data is generated for the media by the media-editing application. As described above, some embodiments generate data about the video and/or audio data of a media file. This data may be generated automatically or based on user selection of particular analysis operations. When one or more analysis data files are created, the process stores (at 4155) references to any such analysis data files in the asset data structures. The process 4100 then ends.

The media asset 4200 of FIG. 42 includes references to three versions of the underlying media file: a copy of the original media file 4230, a high resolution transcoded media file 4235, and a low resolution transcoded media file 4240. In addition, the media asset includes references to a person detection file 4245, a color correction data file 4250, and a shake correction data file 4255. These data files are described in further detail in the subsections above. In some embodiments, the references stored in the asset data structures are pointers to the locations of the video on a physical storage device (e.g., the boot disk of the device on which the media-editing application operates). In the case of media asset 4200, the underlying file stores both audio and video. In some media formats, different files are used to store video and audio for a single shot (and there may be multiple audio files recorded by different audio recorders in some cases). In this case, some embodiments create separate assets for each file. In some embodiments, each media file gets its own asset data structure.

Figure 43:
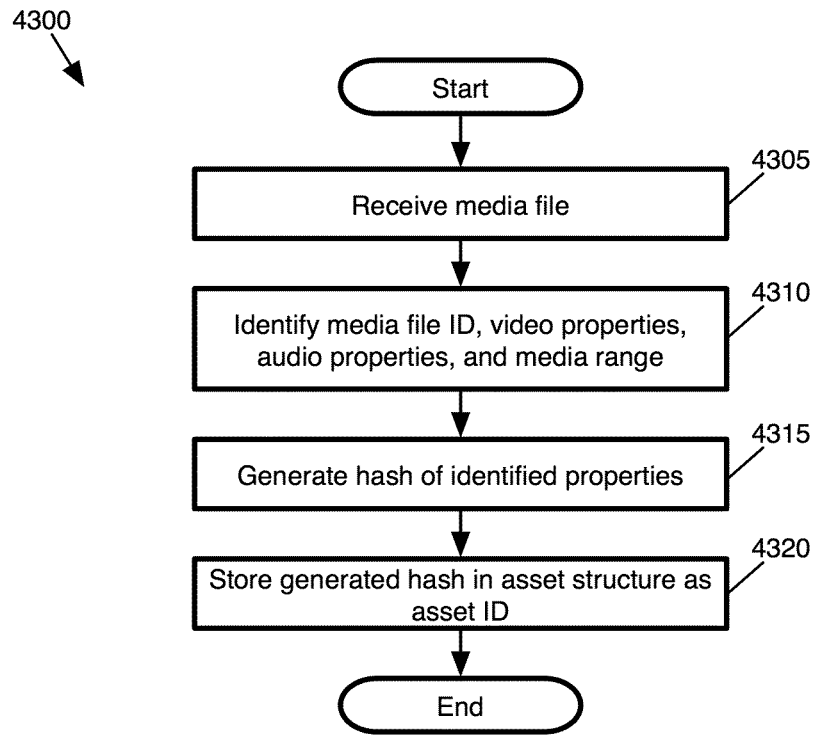
FIG. 43 conceptually illustrates a process of some embodiments for generating an asset ID and storing the ID in the data structure.

As mentioned in the discussion of FIG. 42, the asset ID for a particular asset may be generated using various properties of the asset's underlying media file. FIG. 43 conceptually illustrates a process 4300 of some embodiments for generating the asset ID and storing the ID in the data structure. In some embodiments, process 4300 is performed at operation 4125 of process 4100.

As shown, the process 4300 begins (at 4305) by receiving a media file (e.g., a video file, audio file, movie file, etc.). The process then identifies (at 4310) the media file ID, video properties, audio properties, and media range of the media file. As shown in FIG. 42, these may be stored as metadata of the source media file. The media file ID, in some embodiments, is a UUID generated by a camera that shot the media file, as described above. In some cases, the file may not have a UUID (e.g., if the device that captured the file does not generate UUIDs), and some embodiments will instead use the file name. The video properties used in some embodiments are the dimensions, colorspace, field dominance, sample duration, frame duration, pixel transform, and pixel aspect ratio, though different video properties may be used in different embodiments. The sample duration may be different from frame duration if, for example, the video is field rendered, in which case the frame duration is twice the sample duration. The frame duration, in some embodiments, is the inverse of the frame rate (e.g., if the frame rate is 30 fps, then the frame duration is 1/30 of a second). The audio properties used in some embodiments are the number of tracks, number of channels, and sample rate (i.e., the same as shown in audio properties 4225). Some embodiments include additional properties, such as the file creation date (i.e., the date and/or time at which the media was captured (e.g., filmed, photographed, recorded, etc.)).

The media range indicates the range of the original media file reference by the particular asset. Some embodiments use timecode values of the media file to define the media range. Thus, if a file is split apart (e.g., a user might take a thirty minute video and split it into a twelve minute video, a seven minute video, and an eleven minute video, as well as retain the original), the different timecodes will differentiate the assets. The media range can also be used if one of the assets goes missing, as an asset with identical properties and a range including the media range of the missing assets can be used to restore the missing asset.

The process then generates (at 4315) a hash of the identified properties of the media file. Different embodiments use different hash algorithms (e.g., MD5, etc.). The process then stores (at 4320) this generated hash in the asset structure as the asset ID. While the process 4300 describes one method of computing an asset ID, one of ordinary skill will recognize that asset IDs can be computed using many different properties and many different computation algorithms.

As mentioned above, some embodiments use a clip structure that references one or more assets when importing a media file. FIG. 44 illustrates a component clip data structure 4400 of some embodiments that references an asset. In some embodiments, the component clip 4400 is the lowest level of a set of nested clip objects, that are all members of the same class. The details of clip objects of some embodiments will be described below by reference to FIG. 45.

The component clip 4400 includes a clip ID, clip attributes (described in more detail below), and an asset reference 4405. The asset reference 4405 of some embodiments stores an event ID and an asset ID, and uniquely identifies a particular asset data structure, as indicated by the dashed arrow referring to an asset. The arrow is shown as dashed because the asset reference is not a direct reference to the asset, but rather is used to locate the asset when needed. When the media-editing application of some embodiments needs to identify a particular asset, the application uses the event ID to locate the event that contains the asset, and then the asset ID to locate the particular desired asset.

Figure 45:
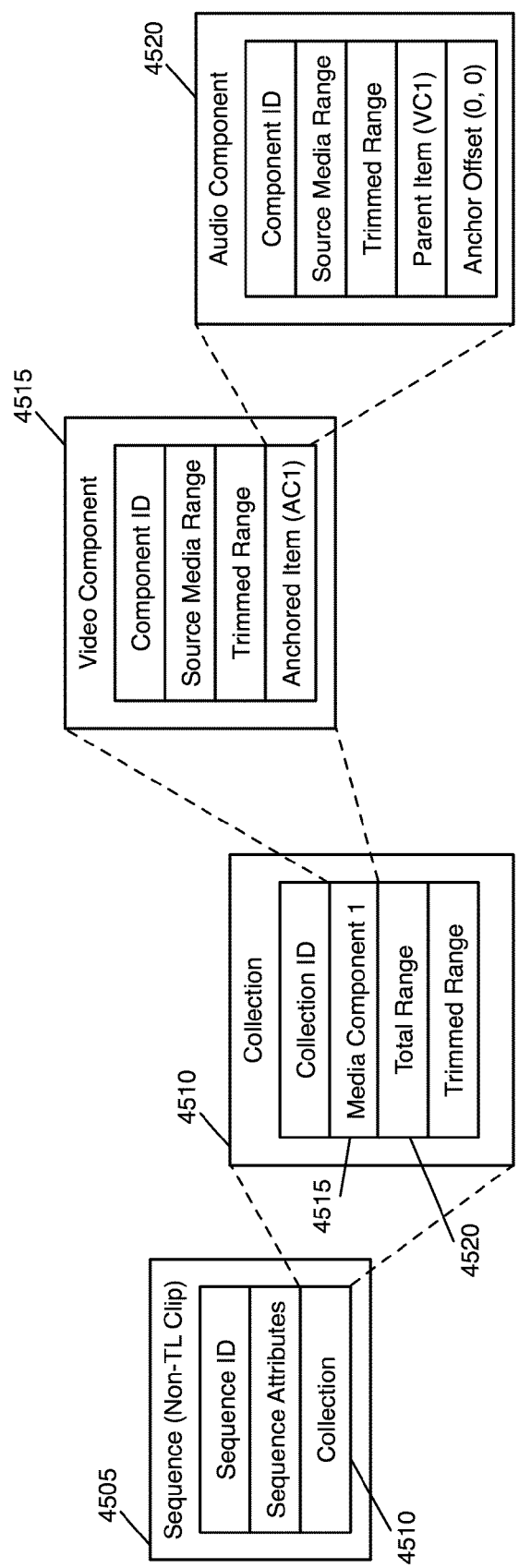
FIG. 45 conceptually illustrates a nested sequence of clip objects created by the media-editing application of some embodiments for an imported media file.

FIG. 45 conceptually illustrates a nested sequence of clip objects created by the media-editing application of some embodiments for an imported media file. In some embodiments, each of the clip objects shown in this figure is a member of the same class, though the object may be of different sub-classes. The media file whose clip structure is illustrated in FIG. 45 is a movie file that stores both audio and video information.

The figure illustrates a sequence 4505, a collection 4510, and two components 4515 and 4520. As mentioned, these three types of objects are all subclasses of clip objects (or anchored objects) in some embodiments. Some embodiments create a sequence within an event object for each imported media clip. The sequence 4505 stores a sequence ID, a set of sequence attributes, and the collection object 4510. The sequence ID is a unique identifier for the sequence object. The sequence attributes, in some embodiments, include video properties for the sequence, such as the resolution, frame rate, etc. The attributes may be set by a user in some embodiments, or set automatically based on the underlying media.

The collection object 4510 is an ordered array of clip objects. In the case of a clip imported into an event, as is the case with object 4510, the collection stores one or more component clips in the array. Often, the collection only stores the video component clip in the array, as shown here; any additional components (generally one or more audio components) are then anchored to that video component. In addition, the collection object 4510 stores a collection ID, a total range, and a trimmed range. The collection ID is a unique identifier for the collection object. The total range of a clip object indicates the maximum range for the object based on the objects it contains, while the trimmed range indicates the actual range of the object in its parent object according to user edits. In some embodiments, the collection object stores a value for the total range because the total range is a variable assigned to all types of clip objects, but this range is not actually used by the application. Instead, the application dynamically calculates the total range based on the objects contained by the collection (as opposed to updating the range value every time a clip is added to the collection). Some embodiments, on the other hand, do update the total range in the collection object. These ranges will be described in further detail below by reference to FIG. 46. The array of the collection object includes two media components 4515 and 4520. Collection objects, in some embodiments, can include component clip objects as well additional collections.

In the above paragraph and elsewhere in this section, a first object (e.g., the collection object 4510) is described as containing a second object (e.g., media component 4515 in the collection object's array). In some embodiments, a first object contains a second object by storing a reference to the object (e.g., a pointer). This reference is a strong pointer in some embodiments.

The media components shown include a video component 4515 and an audio component 4520. These are the same data structures as the component clip 4400, in some embodiments, and thus store the clip attributes and the asset reference shown in that figure. Each of the components stores a component ID (i.e., the clip ID of FIG. 44), a source media range (i.e., total range) and a trimmed range. For a component clip that refers to a media asset, the total range is the duration of the source media. The trimmed range is generally a subset of the total range (i.e., does include time outside the total range). However, in some embodiments, the application may use a range extender to extend the trimmed range past the total range (e.g., when needed for part of a transition, or if aligned audio runs slightly longer than video). Some embodiments will generate video images using, e.g., the first and last images of the video file, to fill in the needed extra range. When a clip is initially imported into the application, the total range and trimmed range will generally be equal as the user will not have edited the clip at all yet.

The video component 4515 also includes an anchored item set that contains the audio component 4520. As described above by reference to the timeline 115 in the user interface 100 of FIG. 1, clips can be anchored to other clips in some embodiments. When a particular clip is moved in a timeline, any clips anchored to the particular clip are moved along with it. Each clip can have numerous clips anchored to it, and can be anchored to a single clip. In the case of a media clip with audio and video components, some embodiments anchor the audio component to the video component. Thus the video component object 4515 contains the audio component in its set of anchored items (and could include numerous such items if there were additional audio components), while the audio component object 4520 includes a parent item reference to the video component to which it is anchored. In addition, the child (anchored) object stores an anchor offset that indicates two values. The first value is the position in the parent object to which the child object is anchored, and the second value is the offset within the child object of the anchor. In the case of an imported media file, the audio and video components will start at the same time, and thus both anchor offset values are zero. However, this can be modified if, for example, there is a slight offset in the recordings of the two components and the user has to adjust the audio relative to the video. The child object modifies both the first and second values when an anchor is moved relative to the anchored clip and the clip to which the anchored clip is anchored as described above by reference to FIG. 24.

Figure 46:
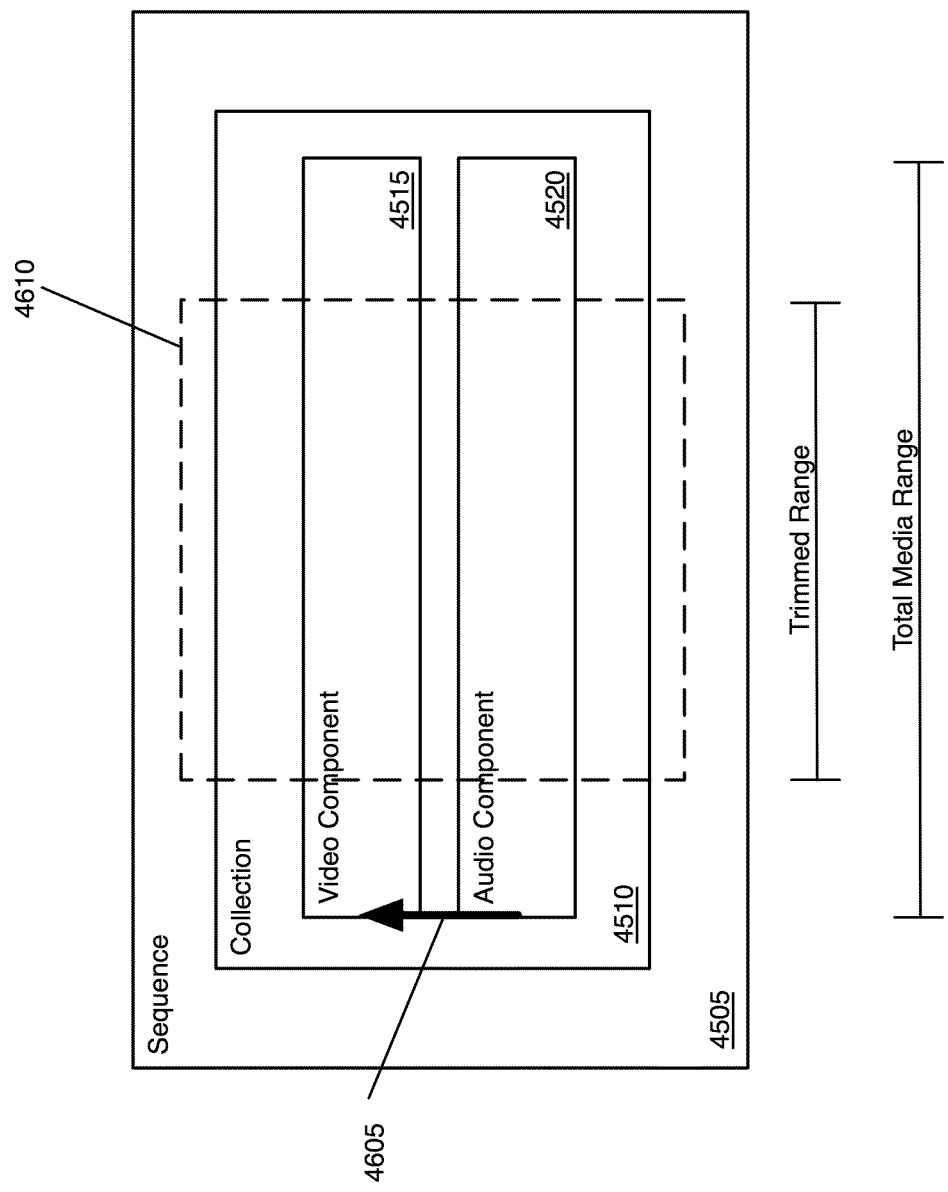
FIG. 46 conceptually illustrates objects nested in a conceptual timeline.

FIG. 46 conceptually illustrates the objects 4505-4520 nested in a conceptual timeline. The figure shows video and audio components 4515 and 4520 inside the collection 4510, which is nested inside the sequence 4505. The audio component 4520 is anchored to the video component 4515; specifically, as shown by the thick arrow 4605, the start of the audio component is anchored to the start of the video component.

The figure also includes a dashed box 4610 that illustrates that a user has trimmed the clips so that portions at the beginning and end of the clip are not part of the sequence were it to be rendered. Thus, the total media range of the components is the full length of the media to which they refer, whereas the trimmed range is a subset of this range based on the user edits. In some embodiments, all clip objects store a total range and trimmed range. The collection 4510, in this case, will have the same total range and trimmed range as the components. However, if the components were offset, or if the collection included additional objects, it would have larger trimmed and total ranges. For sequence objects, the total range and trimmed ranges are always equal in some embodiments. In the illustrated case, the sequence 4505 has a range equal to the trimmed range of the collection 4510. As the user edits the objects in the sequence, both the trimmed and total ranges of the sequence change. In some embodiments, these ranges are based on units of time, number of frames, and/or number of audio samples.

As described above by reference to FIG. 2, the media-editing application of some embodiments provides a volume control for a user of the application to control the volume of a media clip displayed in the timeline. Using the volume control, the user manipulates the audio component 4520. Also, as described above by reference to FIG. 3, the media-editing application of some embodiments allows a user of the application to visually or logically decompose the audio portion of a media clip from the media clip that has both audio and media content in the timeline. At stage 315 in FIG. 3, the audio portion and video portion of the media clip representation in the timeline are separated by a gap. The underlying data structure for a clip of which the video and audio portions are visually separated within the media clip representation in the timeline would look like the collection 4610. However, when the audio content (i.e., audio component) is separated out as a separate media clip, the separate media clip will look like the collection 4610 without the video component 4515. That is, when the audio and video portions are separated, the media clip will have a data structure that has both video and audio components like 4515 and 4520. However, when the video content and the audio content are separated as different media clips, each of the clips will have a different collection as its data structure.

In some embodiments, the media-editing application allows the user to selectively take one type of media content from a media clip when adding the media clip to the timeline as described above by reference to FIG. 32. When the media-editing application is in a mode to add only the audio component of a media clip to the timeline from the clip browser, the collection that will represent the added the media clip will have only audio component like the component 4520. Similarly, when the media-editing application is in a mode to add only the video component of a media clip to the timeline from the clip browser, the collection that will represent the added media clip will have only video component like the component 4515.

Figure 47:
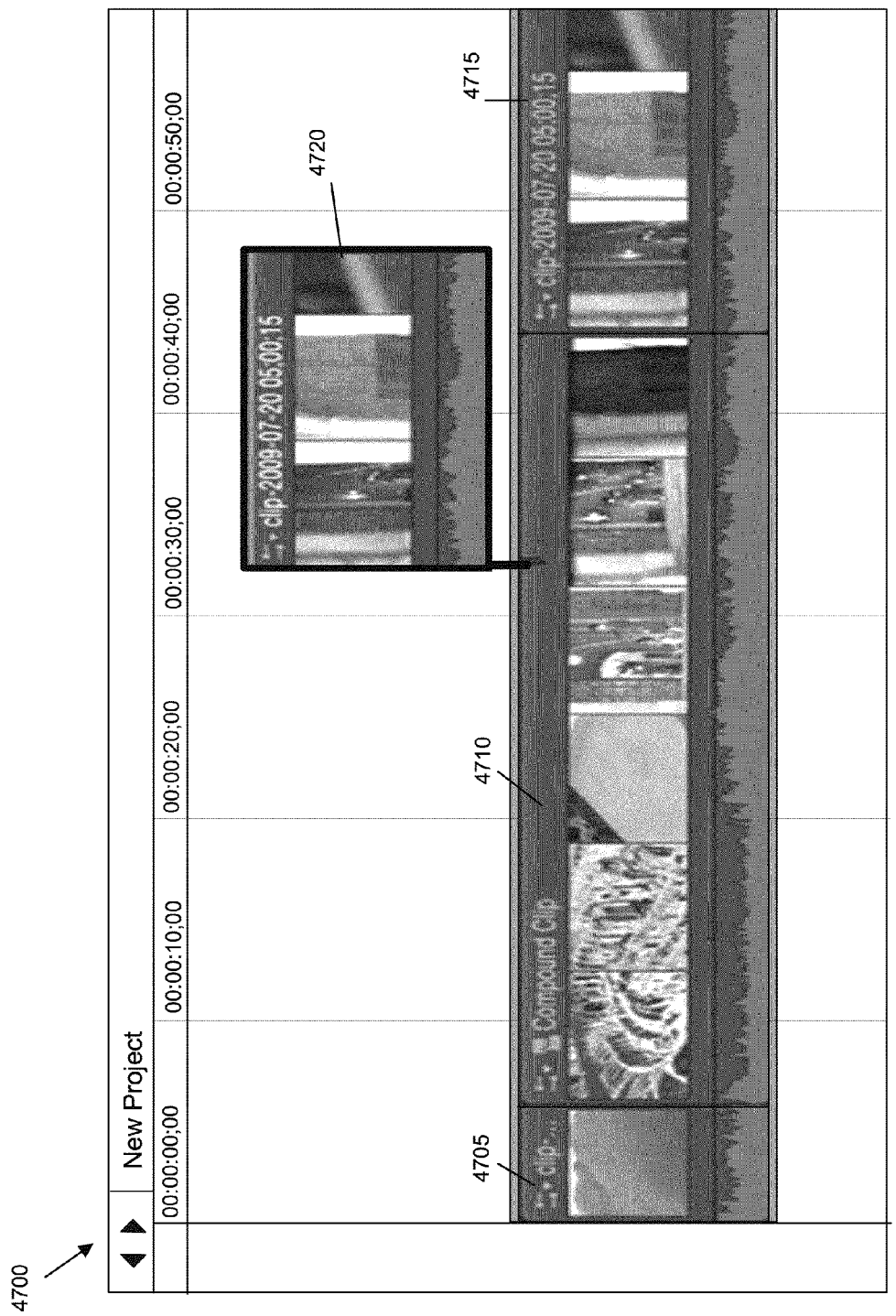
FIG. 47 illustrates a timeline of some embodiments.

FIG. 47 illustrates a timeline 4700 with a project title "New Project" that includes four clips 4705-4720. The clips 4705-4715 are in the primary compositing lane of the project's sequence, while the clip 4720 is anchored to clip 4710 at approximately 26 seconds into clip 4710. The clip 4710 is a compound clip that itself includes two clips.

Figure 48:
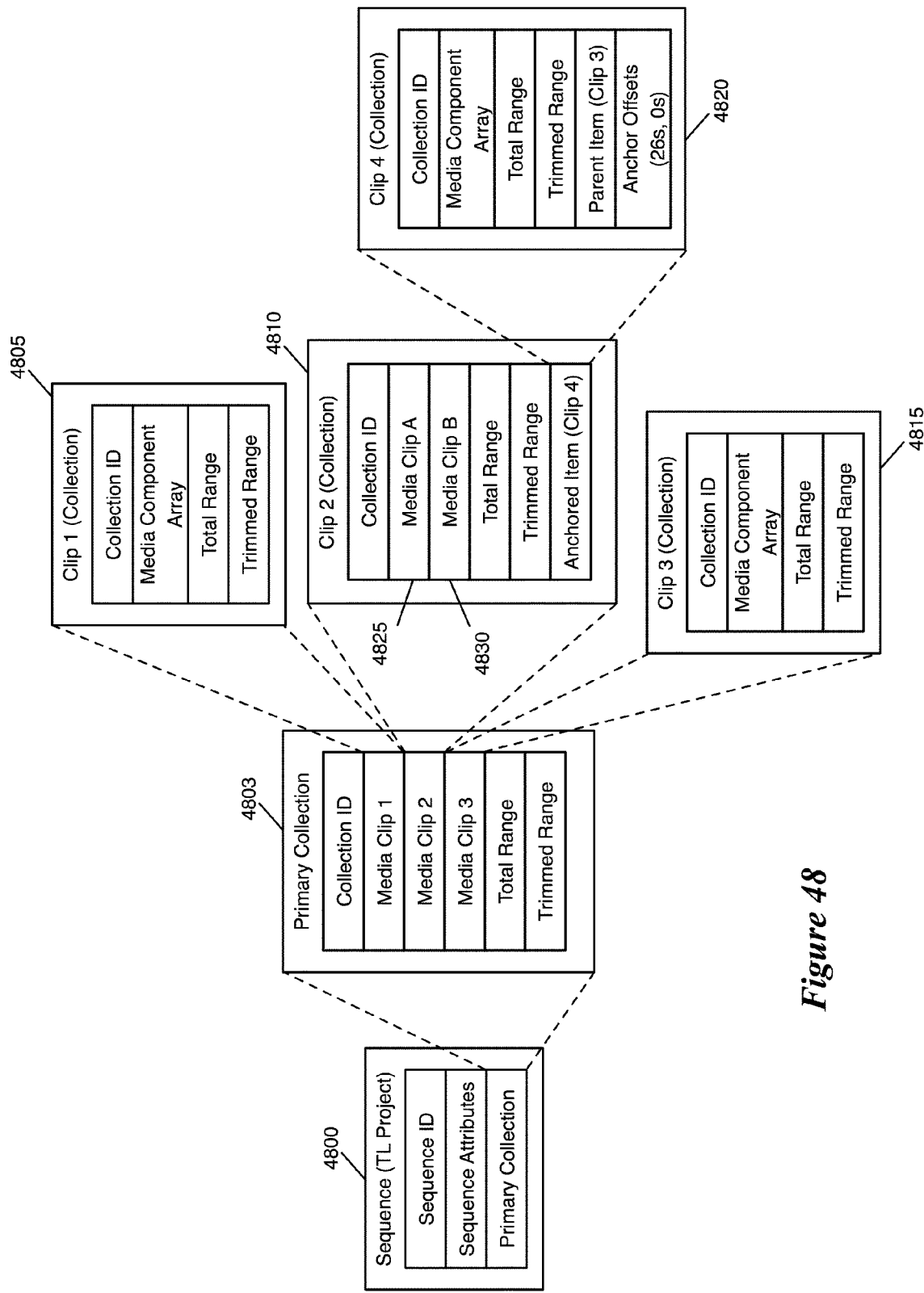
FIG. 48 conceptually illustrates a subset of the data structures for the sequence illustrated in FIG. 47.

FIG. 48 conceptually illustrates a subset of the data structures for the sequence illustrated in FIG. 47. In some embodiments, the data structures of FIG. 48 are all contained within a project data structure that contains a single sequence. In some embodiments, the project data structure for a project in the timeline is a sub-class of a class that also includes event data structures. Unlike the project data structures, the event data structures can contain multiple sequences, and in fact contain a sequence (such as sequence 4605) for each clip in the event.

FIG. 48 illustrates a sequence 4800 that includes a primary collection data structure 4803, which itself is an array of three collections 4805-4815 that correspond to the clips 4705-4715. In addition, the fourth clip 4720 is stored as a data structure within the collection 4810. For simplicity, the component objects are not shown in this figure. The sequence 4800 includes a sequence ID, sequence attributes, and the primary collection 4803. The sequence attributes for a project in the timeline are set by a user when creating the project, in some embodiments.

The primary collection 4803 includes the collection ID, total and trimmed range, and the array of media clips. In some embodiments, the array is ordered based on the location in the timeline and only includes media clips in the primary lane of the collection. The application assumes that there is no gap between these items, and thus no timing data is needed between the items. As shown, each of these clips is represented as a collection. When a clip stored in an event (e.g., the clip shown in FIG. 45) is added to a project in a timeline, some embodiments remove the sequence container data structure (e.g., structure 4505) and copy the rest of the structure (i.e., the collection and its components) into the data structure for the object in the timeline. A connected storyline, of which an example is described above by reference to FIG. 24, has a data structure similar to the primary collection 4803 in some embodiments. A reference to a connected storyline, however, will be listed in the media component array of the primary collection 4803 as an anchored clip.

Clips 4805, 4815, and 4820 are individual clips that have been added to the timeline from the clip browser, and thus do not themselves include collections. Similar to the collection 4510, these objects include an ID, total and trimmed ranges, and an array of media components (e.g., a video component and one or more audio components). The clip 4810 is a compound clip and therefore includes multiple clips in addition to the collection ID and ranges. Specifically, the clip 4810 includes two media clips 4825 and 4830. Within the collection, the clips are both in the primary lane of the collection, and thus one follows the next. These clip objects are not shown in this figure, but each of the clips is similar to clip 4805 in that the clips include an array of media components. In addition, the clip object 4810 includes a set of anchored items (in this case only the one item, clip 4820). Some embodiments include a set of anchored items for each collection, which are empty for the other objects shown in this figure. The anchor offset stored in clip 4820 indicates that it is anchored 26 seconds into clip 2, and that the anchor is at the start of clip 4820. These times refer to the trimmed ranges of the clips in some embodiments.

Figure 49:
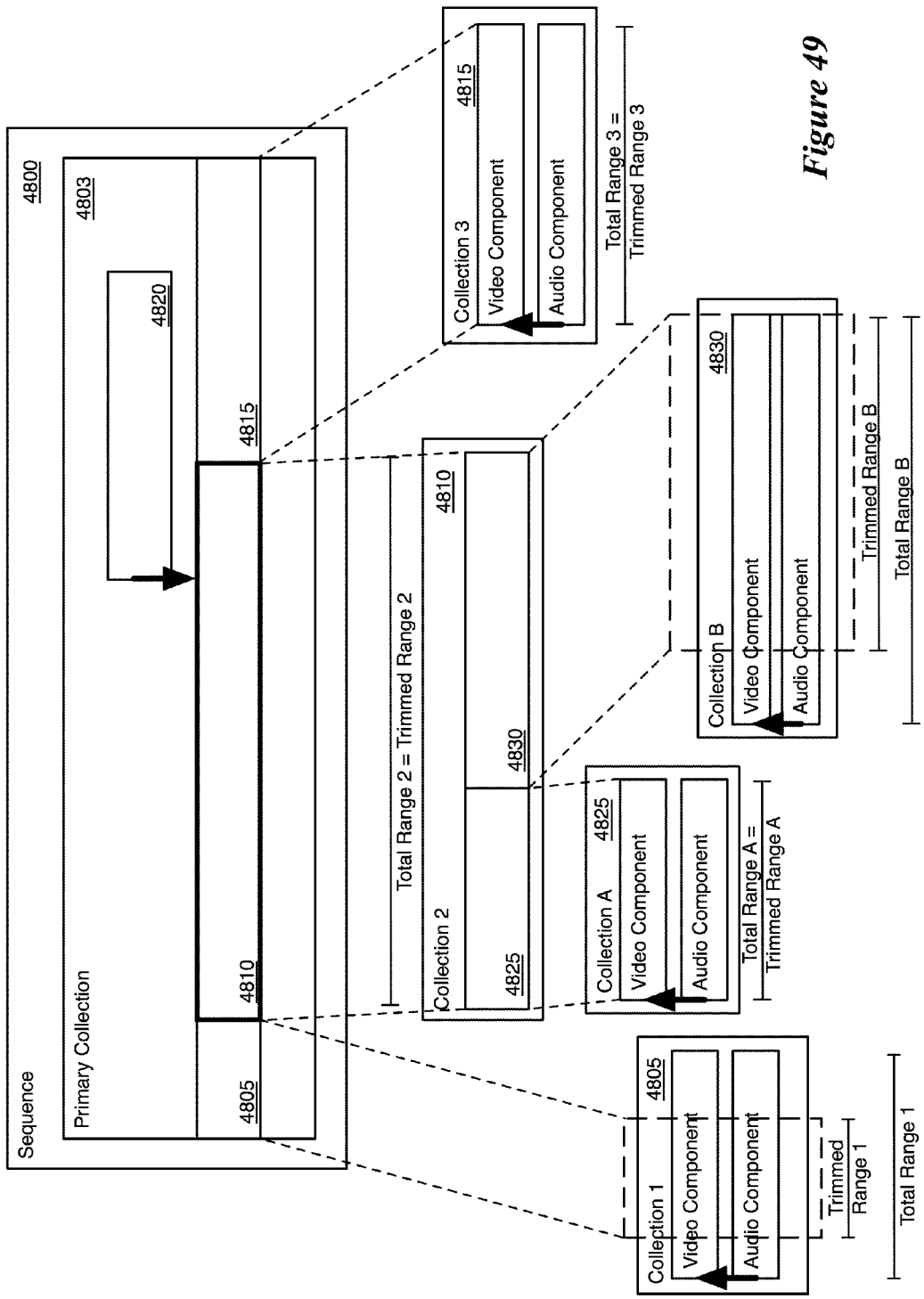
FIG. 49 conceptually illustrates objects nested in a conceptual timeline.

FIG. 49 conceptually illustrates the objects 4800-4530 nested in a conceptual timeline. As shown, collection objects 4825 and 4830 are nested inside the collection 4810, which is nested inside the primary collection object 4803 along with the collection objects 4805, 4815, and 4820. The collection object 4803 is itself nested inside a sequence object.

The figure illustrates the anchoring relationships between the various clips as well as the durations (ranges) of the clips. As with the clip objects shown in FIG. 46, each of the lowest level collections 4805, 4815, 4825, and 4830 each have an audio component anchored to a video component. While not shown, collection 4820 could also have the same video/audio setup, or could be just a video component (or just an audio component). While each of the objects shown has a single audio component, one of ordinary skill will recognize that some embodiments will have multiple audio components (e.g., if a camera records several audio tracks as separate files and imports the files with a video file as part of a single clip).

The figure also illustrates the anchoring of clip 4820 to clip 4810. In some cases, multiple clips will be anchored to the same primary lane clip, and the multiple anchored clips may overlap in time. In this case, multiple secondary lanes may be used. Some embodiments assign lane numbers to each clip object that indicates the clip object's lane within a collection.

All of the primary lane objects are assigned a lane number of zero in some embodiments, with lanes above the primary lane getting increasing numbers and lanes below the primary lane getting decreasing (negative) numbers. For instance, a separate audio clip might be anchored to a clip in the primary lane and displayed below the primary lane. In this case, within the primary collection 4803, the anchored clip 4820 has a lane number of 1. The lane numbers indicate compositing order for video in some embodiments. Whereas two audio files can be combined fairly easily (mixed), two video files cannot be displayed at the same time. Thus, some embodiments composite higher lane number clips on top of lower lane number clips. If no compositing effect is defined between two clips at the same time, then the clip in the higher lane will be displayed. However, various compositing modes and effects may be used to combine the pictures (e.g., compositing modes such as subtract, darken, multiply, etc. that combine pixel information of two images, as well as effects such as scaling the top image to get a picture-in-picture, applying a color mask to the top image, etc.).

The items in a lower-level nested collection will also have lane numbers that refer to their lane order within that collection. For example, the collection object 4810 has two clips 4825 and 4830, that each have a lane number of zero. However, this collection object could have anchored clips in multiple lanes. For the purpose of compositing at time of rendering, the items within the collection 4810 would be composited initially according to the ordering within the collection, then the output of that would be composited within the primary collection according to the ordering of the primary collection. Similarly, for each of the lowest-level collections (e.g., collection 4805), the video components are all lane zero and the audio components are lane −1.

FIG. 49 also illustrates the ranges (e.g., durations) of the various clip objects. For the lowest level collections and their components (e.g., collections 4805, 4815, 4825, 4830, and 4820), the trimmed range and the total range are determined in a manner similar to that shown in FIG. 46 for the collection object 4510. In this case, collections 4815 and 4855 are not trimmed at all, whereas collection 4805 is trimmed on both sides and the start of collection 4830 is trimmed.

For collection 4810, the total range is the sum of the trimmed ranges of its primary lane clips, which in this case are collections 4825 and 4830. Thus, the variable Total Range 2=Trimmed Range A+Trimmed Range B. In this case, the collection 4810 is not separately trimmed, such that its trimmed range equals its total range. This means that, although there is more media within clip 4830, while editing the primary collection 4803 the media-editing application will not allow a user to increase the duration of clip 4810 beyond that of Total Range 2. However, a user could open up the clip 4810 in the timeline and apply trim edits to either of clip 4825 and 4830. Modifications to the trimmed range of these clips will affect the total range of the clip 4810. In addition, within the primary collection 4803, a user can modify the trimmed range of clip 4810 to shorten the clip. Trimming from the beginning would result in less of the media of collection 4825 being used in the component presentation, while trimming from the end would result in less of the media of collection 4830 being used in the composite presentation.

The above figures illustrated various aspects of different subclasses of clip objects (e.g., sequences, collections, and components). One of ordinary skill will recognize that clip objects of some embodiments may have additional properties not shown in these figures. For instance, both collections and components may have an effect stack in some embodiments, which stores a stack of effects that are applied to the media in the clip when the application renders the clip. The application applies these affects to the media in an order designated by the effects stack, which can be modified by the user during editing. The effects may include audio effects that perform a transform on the audio or video effects that apply a function to the pixel values of the video images, in some embodiments. In fact, some embodiments store separate video and audio effects stacks.

In addition, one of ordinary skill in the art will recognize that some embodiments may have additional different subclasses of clip objects. For instance, some embodiments store generators, transitions, audition stacks, markers, and keywords as clip objects. A generator, in some embodiments, is an effect used in a composite presentation that creates its own video images rather than modifying existing images (e.g., clouds and other computer-generated effects that may rely on random processes). Some embodiments also use generators gap elements (e.g., a position clip described above by reference to FIGS. 19 and 20) in collections in specific circumstances. If, for example, a user were to select clip objects 4805 and 4820 and create a compound clip from these objects, a gap element would be inserted into the collection object for the compound clip to take up the missing space of clip object 4810, which the user did not add to the collection. The clip object 4820 would then be anchored to this gap element. In some embodiments, these clips are not actually generators, but are special clips that produce neither audio nor video but add duration to a collection. As the generators create their own video images, they have a duration and this duration adds to the range of the collection containing the generator.

Transition objects, on the other hand, are used for transitions between two other clip objects. These objects have a range of 0, and do not add to the range of the container clip object. A transition object is stored in the array of its containing collection with an index between the indices of the two items between which it transitions. The transition object has a head and a tail that indicate the start and end of the transition between the clips.

Audition stack objects, or variants, store a list of possible clips for a particular index in a collection or for a particular anchor. That is, the audition stack object stores a set of clips, one of which is designated as active at any time. The properties of the stack object take on the properties of the active clip, such as the ranges, video properties (e.g., frame rate, resolution, etc.), audio properties, etc. Thus, when a user switches the active clip in the stack, some attributes of the stack may change. In addition, some of the objects in the stack may be collections that themselves have nested clips, while others might be simpler clip objects. When an audition stack object is anchored to another clip, some embodiments store the first portion of the anchor offset in the audition object (i.e., the offset within the parent clip), but store different offsets within the child clip for the different clips in the audition.

Marker objects store markers that a user adds to a specific time location in a collection. In some embodiments, marker objects have a duration of 1 frame, and store metadata indicating the type of marker (e.g., to do marker, analysis marker, etc.) and any notes about the marker that the user adds. Some embodiments anchor marker objects to a particular clip object. When calculating the duration of a collection, marker objects are specifically excluded from this calculation in some embodiments.

Finally, keyword objects store keyword tags about a clip object. Unlike markers, keywords have a range, as some embodiments provide the user the ability to tag a particular range of a clip rather than just associating the keyword with the entire clip. In some embodiments, a keyword object can store multiple keywords that have the same range. Some embodiments anchor keyword objects to the tagged clip object at the start of the range within the tagged object. Like markers, some embodiments specifically exclude keyword objects from the duration calculation for a collection.

Figure 50:
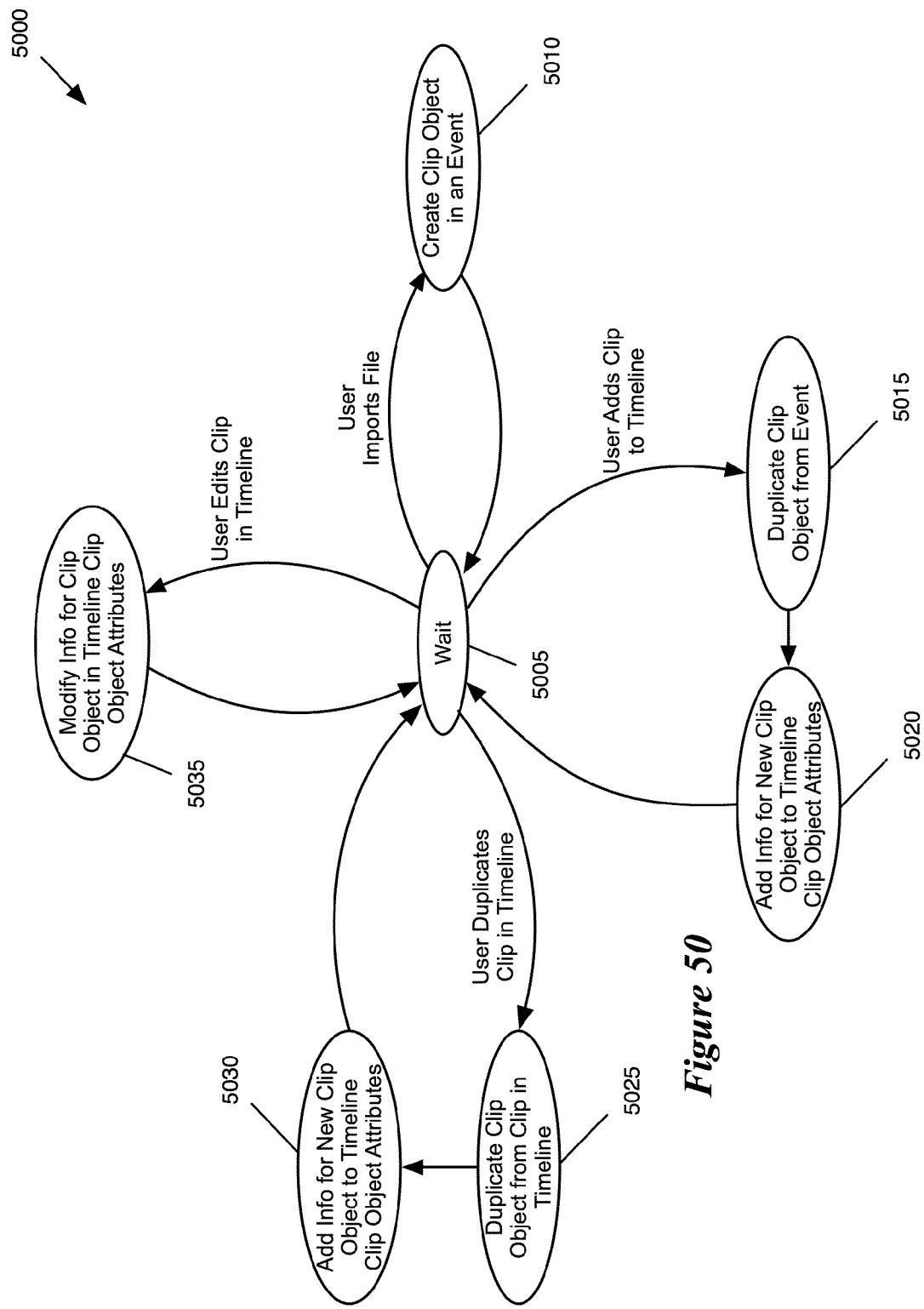
FIG. 50 conceptually illustrates a state diagram for a media-editing application of some embodiments.

FIG. 50 conceptually illustrates a state diagram 5000 for a media-editing application of some embodiments. Specifically, state diagram 5000 refers to the creation and modification of clip data due to various user actions. As shown, when the application is not receiving any such actions, the application is in the wait state 5005.

When a user imports a file, the application transitions to 5010 to create a clip object in an event for the imported file. The event may also need to be created, depending on whether the user is importing the file to an existing event. The clip object, as shown above, refers to an asset that refers to the file. The application then returns to the wait state 5005.

When the user adds a clip to the timeline (e.g., by dragging the clip from the browser to the timeline), the application transitions to 5015 and duplicates the clip object from the event to create a new clip object that is part of the project currently edited in the timeline. The clip data is partly the same (i.e., the same asset reference), but may also refer to only a portion of the asset (i.e., may have in and out points). In addition, the application transitions to 5020 to add information for the new clip object to the timeline clip object attributes. That is, the timeline is also represented by a clip object in some embodiments (e.g., may be a project, compound clip, etc.) and this data structure will be modified to refer to the new clip and store the position of the new clip. The application then returns to the wait state 5005.

When the user duplicates a clip in the timeline (as opposed to adding a clip from the browser), the application transitions to 5025 to duplicate the clip object from the clip in the timeline. This is a similar process as described above at state 5015. In addition, the information about the new clip is added to the timeline clip object at state 5030. Furthermore, at both state 5030 and state 5020, clip information in the timeline clip object may need to be modified to account for movement of other clips.

When the user edits a clip in the timeline (e.g., moves the clip), the application transitions to 5035 to modify the information for the edited clip object in the timeline clip object attributes. this may involve modifying its horizontal (time) and/or hierarchical position if the clip is moved. In addition, if the clip is trimmed, the information in the edited clip may need to be changed (i.e., its in and out points in the source media).

VI. Software Architecture

Figure 51:
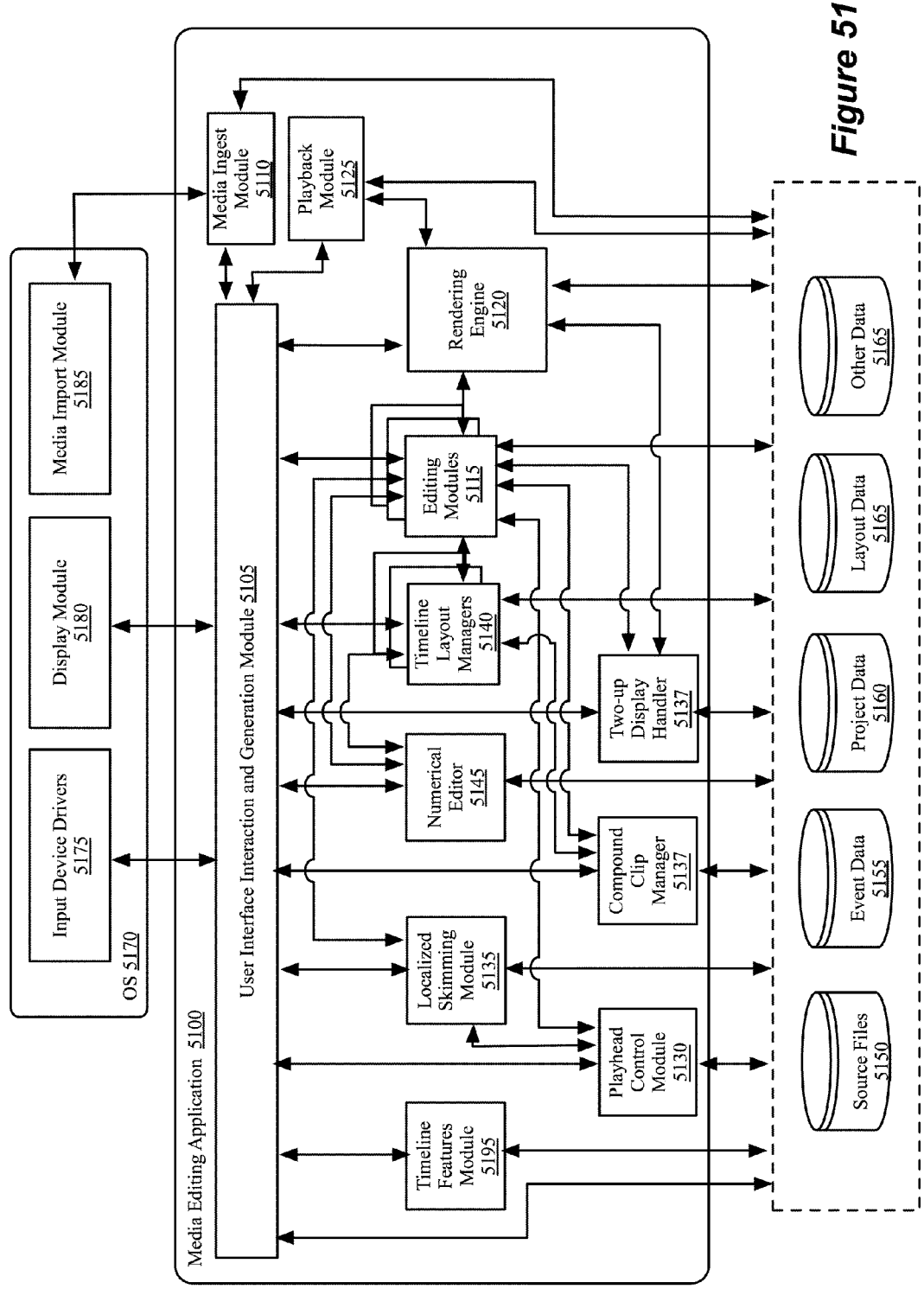
FIG. 51 conceptually illustrates the software architecture of a media editing application of some embodiments FIG. 52 conceptually illustrates an electronic system with which some embodiments of the invention are implemented.

In some embodiments, the processes described above are implemented as software running on a particular machine, such as a computer or a handheld device, or stored in a machine readable medium. FIG. 51 conceptually illustrates the software architecture of a media editing application 5100 of some embodiments. In some embodiments, the media editing application is a stand-alone application or is integrated into another application, while in other embodiments the application might be implemented within an operating system. Furthermore, in some embodiments, the application is provided as part of a server-based solution. In some such embodiments, the application is provided via a thin client. That is, the application runs on a server while a user interacts with the application via a separate machine remote from the server. In other such embodiments, the application is provided via a thick client. That is, the application is distributed from the server to the client machine and runs on the client machine.

The media editing application 5100 includes a user interface (UI) interaction and generation module 5105, a media ingest module 5110, editing modules 5115, rendering engine 5120, playback module 5125, timeline features module 5195, playhead control module 5130, localized skimming module 5135, numerical editor 5145, two-up display handler 5136, and compound clip manager 5137.

The figure also illustrates stored data associated with the media-editing application: source files 5150, events data 5155, project data 5160, layout data 5190, and render files 5165. In some embodiments, the source files 5150 store media files (e.g., video files, audio files, combined video and audio files, etc.) imported into the application. The source files 5150 of some embodiments also store transcoded versions of the imported files as well as analysis data (e.g., people detection data, shake detection data, color balance data, etc.). The events data 5155 stores the events information used by some embodiments to populate the clip library and clip browser. The events data may be a set of clip object data structures stored as one or more SQLite database files (or other format) in some embodiments. The project data 5160 stores the project information used by some embodiments to specify a composite presentation in the timeline. The project data may also be a set of clip object data structures stored as one or more SQLite database files (or other format) in some embodiments. The layout data 5190 stores layout information (e.g., coordinates, length, width, lane numbers, etc.) of all clips that are displayed in the timeline. In some embodiments, the layout data 5190 is part of the project data 5160. The render files 5165 of some embodiments may include thumbnail-sized images for display in the clip browser or timeline, audio waveform displays for media clips, as well as rendered segments of a timeline sequence for use in playback. In some embodiments, the four sets of data 5150-5165 are stored in one physical storage (e.g., an internal hard drive, external hard drive, etc.). In some embodiments, the data may be split between multiple physical storages. For instance, the source files might be stored on an external hard drive with the events data, project data, and render files on an internal drive. Some embodiments store events data with their associated source files and render files in one set of folders, and the project data with associated render files in a separate set of folders.

FIG. 51 also illustrates an operating system 5170 that includes input device driver(s) 5175, display module 5180, and media import module 5185. In some embodiments, as illustrated, the device drivers 51875, display module 5180, and media import module 5185 are part of the operating system even when the media editing application 5100 is an application separate from the operating system.

The input device drivers 5175 may include drivers for translating signals from a keyboard, mouse, touchpad, tablet, touchscreen, etc. A user interacts with one or more of these input device, which send signals to their corresponding device driver. The device driver then translates the signals into user input data that is provided to the UI interaction and generation module 4305.

The present application describes a graphical user interface that provides users with numerous ways to perform different sets of operations and functionalities. In some embodiments, these operations and functionalities are performed based on different commands that are received from users through different input devices (e.g., keyboard, trackpad, touchpad, mouse, etc.). For example, the present application illustrates the use of a cursor in the graphical user interface to control (e.g., select, move) objects in the graphical user interface. However, in some embodiments, objects in the graphical user interface can also be controlled or manipulated through other controls, such as touch control. In some embodiments, touch control is implemented through an input device that can detect the presence and location of touch on a display of the device. An example of such a device is a touch screen device. In some embodiments, with touch control, a user can directly manipulate objects by interacting with the graphical user interface that is displayed on the display of the touch screen device. For instance, a user can select a particular object in the graphical user interface by simply touching that particular object on the display of the touch screen device. As such, when touch control is utilized, a cursor may not even be provided for enabling selection of an object of a graphical user interface in some embodiments. However, when a cursor is provided in a graphical user interface, touch control can be used to control the cursor in some embodiments.

The display module 5180 translates the output of a user interface for a display device. That is, the display module 5180 receives signals (e.g., from the UI interaction and generation module 5105) describing what should be displayed and translates these signals into pixel information that is sent to the display device. The display device may be an LCD, plasma screen, CRT monitor, touchscreen, etc.

The media import module 5185 receives media files (e.g., audio files, video files, etc.) from storage devices (e.g., external drives, recording devices, etc.) through one or more ports (e.g., a USB port, Firewire port, etc.) of the device on which the application 5100 operates and translates this media data for the media-editing application or stores the data directly onto a storage of the device.

The UI interaction and generation module 5105 of the media editing application 5100 interprets the user input data received from the input device drivers and passes it to various modules, including the media ingest module 5110, the editing modules 5115, the rendering engine 5120, the playback module 5125, the timeline features module 5195, the playhead control module 5130, the localized skimming module 5135, the numerical editor 5145, the two-up display handler 5136, the compound clip manager 5127, and the timeline layout managers 5140. The UI interaction module also manages the display of the UI, and outputs this display information to the display module 5180. This UI display information may be based on information from the editing modules 5125, the playback module 5125, the timeline features module 5195, the playhead control module 5130, the localized skimming module 5135, the numerical editor 5145, the two-up display handler 5136, the compound clip manager 5137 and the data 5150, 5155, 5160, 5190, and 5165.

The media ingest module 5110 manages the import of source media into the media-editing application 5100. Some embodiments, as shown, receive source media from the media import module 5185 of the operating system 5170. The media ingest module 5110 receives instructions through the UI module 5105 as to which files should be imported, then instructs the media import module 5185 to enable this import (e.g., from an external drive, from a camera, etc.). The media ingest module 5110 stores these source files 5150 in specific file folders associated with the application. In some embodiments, the media ingest module 5110 also manages the creation of event data structures upon import of source files and the creation of the clip and asset data structures contained in the events.

The editing modules 5115 include a variety of modules for editing media in the clip browser as well as in the timeline. The editing modules 5115 handle the creation of projects, addition and subtraction of clips from projects, trimming or other editing processes within the timeline (e.g., inserting, deleting, anchoring, appending, etc.), application of effects and transitions, or other editing processes. In some embodiments, the editing modules 5115 create and modify project and clip data structures in both the event data 5155 and the project data 5160. Moreover, the editing modules 5115 works with the timeline layout managers 5140 to manage the layouts of the clips and effects (e.g., transitions) displayed in the timeline.

The rendering engine 5120 handles the rendering of images for the media-editing application. In some embodiments, the rendering engine manages the creation of images for the media-editing application. When an image is requested by a destination within the application (e.g., the playback module 5125) the rendering engine outputs the requested image according to the project or event data. The rendering engine retrieves the project data or event data that identifies how to create the requested image and generates a render graph that is a series of nodes indicating either images to retrieve from the source files or operations to perform on the source files. In some embodiments, the rendering engine schedules the retrieval of the necessary images through disk read operations and the decoding of those images.

The playback module 5125 handles the playback of images (e.g., in a preview display area of the user interface. Some embodiments do not include a playback module and the rendering engine directly outputs its images to the UI module 5110 for integration into the GUI, or directly to the display module 5180 for display at a particular portion of the display device.

In some embodiments, the render engine performs various operations to generate an output image. In some embodiments, these operations include blend operations, effects (e.g., blur or other pixel value modification operations), color space conversions, resolution transforms, etc. In some embodiments, one or more of these processing operations are actually part of the operating system and are performed by a GPU or CPU of the device on which the application 5100 operates. The output of the rendering engine (a rendered image) may be stored as render files in storage 5165 or sent to a destination for additional processing or output (e.g., playback).

The timeline layout managers 5140 manage the layouts of the clips and effects (e.g., transitions) displayed in the timeline. For instance, the layout managers 5140 update the layout data 5165 as media clips in the timeline changes (e.g., by being edited, moved, deleted, etc.). The timeline layout managers 5140 interact with the editing modules 5115 to receive editing operations performed on the items displayed in the timeline. The timeline layout managers 5140 also interact with the numerical editor 5145 as well to get any editing updates. In some embodiments, each timeline layout manager has a one-to-one relationship with the spine in managing the layouts of the clips that are in the spine or anchored to the clips in the spine. When the timeline displays inside of a compound clip, a new layout manager may be associated with that particular state of timeline to manage the media clips within the compound clip. As described above, the timeline layout managers 5140 may work with the editing modules 5115 in managing the layouts of the clips displayed in the timeline.

The timeline features module 5195 handles various features of the timeline in some embodiments provide. For instance, the timeline features module 5195 manages the separation of audio and video portion of a media clip displayed in the timeline. The timeline features module 5195 also controls the volume of a media clip that has audio content. Moreover, the timeline features module 5195 also handles the customization of the timeline and changes the ratio of the audio and video portions of each media clip in the timeline. These timeline features are described above by reference to FIGS. 2-6. The timeline features module 5195 also communicates with the timeline layout managers 5140 and the editing modules 5115 for handling any changes in the layouts of the clips in the timeline and editing operations performed by using the provided timeline features.

The playhead control module 5130 manages playheads in the timeline in some embodiments. The playhead control module 5130 communicates with the editing modules 5115 to manage editing operations that are performed by using playheads. For instance, the playhead control module 5130 works with the editing modules 5115 for anchoring media clips based on the position of the primary playhead in the timeline. The playheads of some embodiments are described above by reference to FIGS. 7 and 8.

The localized skimming module 5135 performs localized skimming operation described above by reference to FIG. 10. In some embodiments, the localized skimming module 5135 communicates with playhead control module to receive information regarding playhead positions. Also, the localized skimming module 5135 sends requests to rendering engine 5120 produce appropriate frames and images to display based on the position of the playhead and cursor.

The numerical editor 5145 receives numerical inputs through the UI interaction and generation module 5105 regarding the position of a media clip, playhead, or other items in the timeline. The numerical editor 5145 precisely specifies the duration of a media clip, accurately specifies the starting and/or ending point of a media clip in the timeline, and specifies the location of a playhead, etc. Examples of numerical editing are described above by reference to FIGS. 25-30. In some embodiments, the numerical editor 5145 communicates with the timeline layout managers 5140 and the editing modules 5115 to facilitate the editing operations based on the received numerical inputs.

The two-up display handler 5136 in some embodiments communicates with the editing modules 5115 to prepare requests to the rendering engine 5120 for generating two frames on or neighboring the edit point. Examples of displaying two frames of an edit point are described above by reference to FIGS. 33 and 34.

The compound clip manager 5137 manages the creation and manipulation of compound clips. Examples of creating and manipulating compound clips are described above by reference to FIGS. 36-38 and 40. The compound clip manager 5137 in some embodiments communicates with the timeline layout managers 5140 and the editing modules 5115.

While many of the features of media-editing application 5100 have been described as being performed by one module (e.g., the UI interaction and generation module 5105, the media ingest manager 5110, etc.), one of ordinary skill in the art will recognize that the functions described herein might be split up into multiple modules. Similarly, functions described as being performed by multiple different modules might be performed by a single module in some embodiments (e.g., the playback module 5125 might be part of the UI interaction and generation module 5105).

VII. Electronic System

Many of the above-described features and applications are implemented as software processes that are specified as a set of instructions recorded on a computer readable storage medium (also referred to as computer readable medium). When these instructions are executed by one or more computational or processing unit(s) (e.g., one or more processors, cores of processors, or other processing units), they cause the processing unit(s) to perform the actions indicated in the instructions. Examples of computer readable media include, but are not limited to, CD-ROMs, flash drives, random access memory (RAM) chips, hard drives, erasable programmable read only memories (EPROMs), electrically erasable programmable read-only memories (EEPROMs), etc. The computer readable media does not include carrier waves and electronic signals passing wirelessly or over wired connections.

In this specification, the term "software" is meant to include firmware residing in read-only memory or applications stored in magnetic storage which can be read into memory for processing by a processor. Also, in some embodiments, multiple software inventions can be implemented as sub-parts of a larger program while remaining distinct software inventions. In some embodiments, multiple software inventions can also be implemented as separate programs. Finally, any combination of separate programs that together implement a software invention described here is within the scope of the invention. In some embodiments, the software programs, when installed to operate on one or more electronic systems, define one or more specific machine implementations that execute and perform the operations of the software programs.

FIG. 52 conceptually illustrates an electronic system 5200 with which some embodiments of the invention are implemented. The electronic system 5200 may be a computer (e.g., a desktop computer, personal computer, tablet computer, etc.), phone, PDA, or any other sort of electronic device. Such an electronic system includes various types of computer readable media and interfaces for various other types of computer readable media. Electronic system 5200 includes a bus 5205, processing unit(s) 5210, a graphics processing unit (GPU) 5215, a system memory 5220, a network 5225, a read-only memory 5230, a permanent storage device 5235, input devices 5240, and output devices 5245.

The bus 5205 collectively represents all system, peripheral, and chipset buses that communicatively connect the numerous internal devices of the electronic system 5200. For instance, the bus 5205 communicatively connects the processing unit(s) 5210 with the read-only memory 5230, the GPU 5215, the system memory 5220, and the permanent storage device 5235.

From these various memory units, the processing unit(s) 5210 retrieves instructions to execute and data to process in order to execute the processes of the invention. The processing unit(s) may be a single processor or a multi-core processor in different embodiments. Some instructions are passed to and executed by the GPU 5215. The GPU 5215 can offload various computations or complement the image processing provided by the processing unit(s) 5210. In some embodiments, such functionality can be provided using CoreImage's kernel shading language.

The read-only-memory (ROM) 5230 stores static data and instructions that are needed by the processing unit(s) 5210 and other modules of the electronic system. The permanent storage device 5235, on the other hand, is a read-and-write memory device. This device is a non-volatile memory unit that stores instructions and data even when the electronic system 5200 is off. Some embodiments of the invention use a mass-storage device (such as a magnetic or optical disk and its corresponding disk drive) as the permanent storage device 5235.

Other embodiments use a removable storage device (such as a floppy disk, flash memory device, etc., and its corresponding disk drive) as the permanent storage device. Like the permanent storage device 5235, the system memory 5220 is a read-and-write memory device. However, unlike storage device 5235, the system memory 5220 is a volatile read-and-write memory, such as random access memory. The system memory 5220 stores some of the instructions and data that the processor needs at runtime. In some embodiments, the invention's processes are stored in the system memory 5220, the permanent storage device 5235, and/or the read-only memory 5230. For example, the various memory units include instructions for processing multimedia clips in accordance with some embodiments. From these various memory units, the processing unit(s) 5210 retrieves instructions to execute and data to process in order to execute the processes of some embodiments.

The bus 5205 also connects to the input and output devices 5240 and 5245. The input devices 5240 enable the user to communicate information and select commands to the electronic system. The input devices 5240 include alphanumeric keyboards and pointing devices (also called "cursor control devices"), cameras (e.g., webcams), microphones or similar devices for receiving voice commands, etc. The output devices 5245 display images generated by the electronic system or otherwise output data. The output devices 5245 include printers and display devices, such as cathode ray tubes (CRT) or liquid crystal displays (LCD), as well as speakers or similar audio output devices. Some embodiments include devices such as a touchscreen that function as both input and output devices.

Finally, as shown in FIG. 52, bus 5205 also couples electronic system 5200 to a network 5225 through a network adapter (not shown). In this manner, the computer can be a part of a network of computers (such as a local area network ("LAN"), a wide area network ("WAN"), or an Intranet, or a network of networks, such as the Internet. Any or all components of electronic system 5200 may be used in conjunction with the invention.

Some embodiments include electronic components, such as microprocessors, storage and memory that store computer program instructions in a machine-readable or computer-readable medium (alternatively referred to as computer-readable storage media, machine-readable media, or machine-readable storage media). Some examples of such computer-readable media include RAM, ROM, read-only compact discs (CD-ROM), recordable compact discs (CD-R), rewritable compact discs (CD-RW), read-only digital versatile discs (e.g., DVD-ROM, dual-layer DVD-ROM), a variety of recordable/rewritable DVDs (e.g., DVD-RAM, DVD-RW, DVD+RW, etc.), flash memory (e.g., SD cards, mini-SD cards, micro-SD cards, etc.), magnetic and/or solid state hard drives, read-only and recordable Blu-Ray® discs, ultra density optical discs, any other optical or magnetic media, and floppy disks. The computer-readable media may store a computer program that is executable by at least one processing unit and includes sets of instructions for performing various operations. Examples of computer programs or computer code include machine code, such as is produced by a compiler, and files including higher-level code that are executed by a computer, an electronic component, or a microprocessor using an interpreter.

While the above discussion primarily refers to microprocessor or multi-core processors that execute software, some embodiments are performed by one or more integrated circuits, such as application specific integrated circuits (ASICs) or field programmable gate arrays (FPGAs). In some embodiments, such integrated circuits execute instructions that are stored on the circuit itself. In addition, some embodiments execute software stored in programmable logic devices (PLDs), ROM, or RAM devices.

As used in this specification and any claims of this application, the terms "computer", "server", "processor", and "memory" all refer to electronic or other technological devices. These terms exclude people or groups of people. For the purposes of the specification, the terms display or displaying means displaying on an electronic device. As used in this specification and any claims of this application, the terms "computer readable medium," "computer readable media," and "machine readable medium" are entirely restricted to tangible, physical objects that store information in a form that is readable by a computer. These terms exclude any wireless signals, wired download signals, and any other ephemeral signals.

While the invention has been described with reference to numerous specific details, one of ordinary skill in the art will recognize that the invention can be embodied in other specific forms without departing from the spirit of the invention. In addition, a number of the figures (including FIGS. 11, 18, 31, 35, 41, and 43) conceptually illustrate processes. The specific operations of these processes may not be performed in the exact order shown and described. The specific operations may not be performed in one continuous series of operations, and different specific operations may be performed in different embodiments. Furthermore, the process could be implemented using several sub-processes, or as part of a larger macro process. Thus, one of ordinary skill in the art would understand that the invention is not to be limited by the foregoing illustrative details, but rather is to be defined by the appended claims.

We claim:

1. A non-transitory machine readable medium storing a program for creating a composite media presentation from a plurality of media clips which when executed by at least one processing unit presents a graphical user interface (GUI), the GUI comprising:
   a preview display area for displaying the composite media presentation;
   a composite display area for placing media clips to specify the composite media presentation, the composite display area comprising:
      a first playhead for specifying an editing position; and
      a second playhead for specifying a skimming position based on a position of a position indicator in the composite display area, wherein as the second playhead moves in the composite display area, the preview display area displays frames associated with the skimming positions in the composite display area that are traversed by the second playhead,
   wherein when (i) the second playhead intersects a primary clip that is displayed as a part of the composite media presentation and a secondary clip that is not displayed as a part of the composite media presentation and (ii) the position indicator does not specify a position on either of the primary and secondary media clips, the preview display area displays frames of the primary media clip.

2. The non-transitory machine readable medium of claim 1, wherein when the position indicator is not positioned in the composite display area, the preview display area displays frames associated with the first playhead.

3. The non-transitory machine readable medium of claim 1, wherein when the position indicator is not positioned in the composite display area, the second playhead is not displayed in the composite display area.

4. The non-transitory machine readable medium of claim 1, wherein the GUI further comprises a user interface (UI) item for initiating playback of the composite media presentation, wherein selection of the UI item initiates playback from the editing position specified by the first playhead.

5. A non-transitory machine readable medium storing a program for creating a composite media presentation from a plurality of media clips which when executed by at least one processing unit presents a graphical user interface (GUI), the GUI comprising:
   a preview display area for displaying the composite media presentation;
   a composite display area for placing media clips to specify the composite media presentation, the composite display area comprising:
      a first playhead for specifying an editing position;
      a second playhead for specifying a skimming position based on a position of a position indicator in the composite display area, wherein as the second playhead moves in the composite display area, the preview display area displays frames associated with the skimming positions in the composite display area that are traversed by the second playhead, wherein when (i) the second playhead intersects a primary clip that is displayed as a part of the composite media presentation and a secondary clip that is not displayed as a part of the composite media presentation and (ii) the position indicator indicates a position on the secondary clip, the preview display area displays frames of the secondary clip.

6. The non-transitory machine readable medium of claim 5, wherein selection of a position in the composite display area sets the editing position of the first playhead.

7. The non-transitory machine readable medium of claim 5, wherein the GUI further comprises a user interface (UI) item for initiating playback of the composite media presentation, wherein selection of the UI item initiates playback from the editing position specified by the first playhead.

8. The non-transitory machine readable medium of claim 5, wherein when the position indicator is not positioned in the composite display area, the preview display area displays frames associated with the first playhead.

9. A method for providing a graphical user interface (GUI), the GUI comprising:

providing a preview display area for displaying a composite media presentation;

providing a composite display area for placing media clips to specify the composite media presentation, the composite display area comprising:

a first playhead for specifying an editing position; and a second playhead for specifying a skimming position based on a position of a position indicator in the composite display area, wherein as the second playhead moves in the composite display area, the preview display area displays frames associated with the skimming positions in the composite display area that are traversed by the second playhead, wherein when (i) the second playhead intersects a primary clip that is displayed as a part of the composite media presentation and a secondary clip that is not displayed as a part of the composite media presentation and (ii) the position indicator does not specify a position on either of the primary and secondary media clips, the preview display area displays frames of the primary media clip.

10. The method of claim 9, wherein when the position indicator is not positioned in the composite display area, the preview display area displays frames associated with the first playhead.

11. The method of claim 9, wherein when the position indicator is not positioned in the composite display area, the second playhead is not displayed in the composite display area.

12. The method of claim 9 further comprising providing a user interface (UI) item for initiating playback of the composite media presentation, wherein selection of the UI item initiates playback from the editing position specified by the first playhead.

13. A method for providing a graphical user interface (GUI), the GUI comprising:

providing a preview display area for displaying a composite media presentation;

providing a composite display area for placing media clips to specify the composite media presentation, the composite display area comprising:

a first playhead for specifying an editing position;

a second playhead for specifying a skimming position based on a position of a position indicator in the composite display area, wherein as the second playhead moves in the composite display area, the preview display area displays frames associated with the skimming positions in the composite display area that are traversed by the second playhead; and wherein when (i) the second playhead intersects a primary clip that is displayed as a part of the composite media presentation and a secondary clip that is not displayed as a part of the composite media presentation and (ii) the position indicator indicates a position on the secondary clip, the preview display area displays frames of the secondary clip.

14. The method of claim 13, wherein selection of a position in the composite display area sets the editing position of the first playhead.

15. The method of claim 13 further comprising providing a user interface (UI) item for initiating playback of the composite media presentation, wherein selection of the UI item initiates playback from the editing position specified by the first playhead.

16. A non-transitory machine readable medium storing a program for creating a composite media presentation from a plurality of media clips which when executed by at least one processing unit presents a graphical user interface (GUI), the GUI comprising:

a composite display area for placing media clips to specify the composite media presentation;

a preview display area for concurrently displaying two frames of the composite media presentation when an edit is being performed in the composite display area, wherein the preview display area is further for displaying a single frame of the composite media presentation when no edit is being performed.

17. The non-transitory machine readable medium of claim 16, wherein the two frames are a last frame of the composite presentation before an edit point and the first frame of the composite presentation after the edit point, the edit point indicating a boundary of an edit applied to the composite presentation.

18. The non-transitory machine readable medium of claim 16, wherein the two frames of the preview display area are continuously updated as the edit is being performed.

19. The non-transitory machine readable medium of claim 16, wherein the edit is at least one of a ripple edit, a slide edit, and a slip edit.

20. The non-transitory machine readable medium of claim 16, wherein the two displayed frames of the preview display area have different dimensions.

* * * * *